United States Patent
Hiraizumi et al.

(10) Patent No.: US 8,564,876 B2
(45) Date of Patent: Oct. 22, 2013

(54) RAMAN AMPLIFIER AND RAMAN AMPLIFIER ADJUSTMENT METHOD

(75) Inventors: Maki Hiraizumi, Kawasaki (JP); Yoshio Shimano, Kawasaki (JP); Masao Nakata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/562,086

(22) Filed: Jul. 30, 2012

(65) Prior Publication Data

US 2012/0307351 A1 Dec. 6, 2012

Related U.S. Application Data

(60) Continuation of application No. 12/873,795, filed on Sep. 1, 2010, now Pat. No. 8,339,698, which is a division of application No. 12/351,560, filed on Jan. 9, 2009, now abandoned, which is a division of application No. 10/882,266, filed on Jul. 2, 2004, now Pat. No. 7,554,721.

(30) Foreign Application Priority Data

Aug. 1, 2003 (WO) .................. PCT/JP2003/009820
Mar. 25, 2004 (JP) ................................. 2004-089872

(51) Int. Cl.
*H04B 10/29* (2013.01)
*H04B 10/07* (2013.01)
*H01S 3/067* (2006.01)
*H01S 3/10* (2006.01)
*H01S 3/30* (2006.01)
*H01S 3/091* (2006.01)
*H04B 10/291* (2013.01)
*H04B 10/077* (2013.01)

(52) U.S. Cl.
CPC ............. *H01S 3/10015* (2013.01); *H01S 3/302* (2013.01); *H01S 3/06754* (2013.01); *H01S 3/0912* (2013.01); *H04B 10/2916* (2013.01); *H04B 10/0775* (2013.01)
USPC ....................................... 359/334; 359/341.3

(58) Field of Classification Search
CPC H04B 10/2916; H04B 10/0775; H01S 3/302; H01S 3/06754; H01S 3/0912; H01S 3/10015
USPC .................................. 359/334, 341.3, 341.43
See application file for complete search history.

(56) References Cited

U.S. PATENT DOCUMENTS 6,388,801 B1 5/2002 Sugaya et al.
6,441,951 B1 8/2002 Tanaka et al.

(Continued)

FOREIGN PATENT DOCUMENTS

JP 2001-244528 9/2001
JP 2001-7768 1/2002

(Continued)

OTHER PUBLICATIONS

Notice of Allowance issued Feb. 24, 2012 in related co-pending U.S. Appl. No. 12/872,787.

(Continued)

*Primary Examiner* — Mark Hellner
*Assistant Examiner* — Ari M Diacou
(74) *Attorney, Agent, or Firm* — Staas & Halsey LLP

(57) ABSTRACT

A pumping unit supplies pumping light to a fiber connecting medium; a light monitoring unit detects light power of multiple-wavelength light; and a control unit controls the pumping light based on light power detected by the light monitoring unit and connecting medium information indicating optical characteristics in the connecting medium. The connecting medium information includes information indicating a fiber type of the fiber connecting medium, information indicating a length of the fiber connecting medium, an average fiber loss coefficient of the fiber connecting medium and an intra-station loss value.

3 Claims, 47 Drawing Sheets

(56) References Cited

U.S. PATENT DOCUMENTS

| | | |
|---|---|---|
| 6,462,861 B2 | 10/2002 | Ohshima et al. |
| 6,577,437 B2 | 6/2003 | Sugaya et al. |
| 6,639,716 B1 * | 10/2003 | Tomofuji ............... 359/337.12 |
| 6,785,042 B1 | 8/2004 | Onaka et al. |
| 6,839,162 B2 | 1/2005 | Sekiya et al. |
| 6,904,064 B2 | 6/2005 | Sobe et al. |
| 7,061,665 B2 | 6/2006 | Sobe et al. |
| 7,106,499 B2 | 9/2006 | Sekiya |
| 7,110,166 B2 | 9/2006 | Onaka et al. |
| 2002/0041431 A1 * | 4/2002 | Ohshima et al. ............. 359/334 |
| 2002/0044336 A1 | 4/2002 | Tanaka et al. |
| 2002/0149841 A1 | 10/2002 | Ohtani et al. |
| 2002/0159134 A1 | 10/2002 | Ghera et al. |
| 2002/0176154 A1 | 11/2002 | Sugaya et al. |
| 2002/0181078 A1 | 12/2002 | Tanaka et al. |
| 2003/0090780 A1 * | 5/2003 | Sobe et al. .................. 359/334 |
| 2003/0117696 A1 | 6/2003 | Goobar et al. |
| 2003/0223765 A1 | 12/2003 | Yanagisawa et al. |
| 2004/0047628 A1 | 3/2004 | Passier et al. |
| 2004/0090663 A1 | 5/2004 | Kamada et al. |
| 2004/0190123 A1 * | 9/2004 | Nakamura et al. ............ 359/337 |

FOREIGN PATENT DOCUMENTS

| | | |
|---|---|---|
| JP | 2002-040496 | 2/2002 |
| JP | 2002-072262 | 3/2002 |
| JP | 2002-076482 | 3/2002 |
| JP | 2002-296145 | 10/2002 |
| JP | 2003-131273 | 5/2003 |
| JP | 2003-139656 | 5/2003 |
| JP | 2003-140208 | 5/2003 |
| WO | 02/19023 A1 | 3/2002 |
| WO | 02/21204 | 3/2002 |

OTHER PUBLICATIONS

U.S. Appl. No. 12/351,560, filed Jan. 9, 2009, Maki Hiraizumi, Fujitsu Limited.
U.S. Appl. No. 12/873,795, filed Sep. 1, 2010, Maki Hiraizumi, Fujitsu Limited.
U.S. Appl. No. 10/882,266, filed Jul. 2, 2004, Maki Hiraizumi, Fujitsu Limited.
Japanese Office Action dated Dec. 4, 2009 issued in corresponding Japanese Patent Application No. 2004-089672.
International Search Report for PCT/JP03/09820 mailed Nov. 4, 2003.
Office Action mailed Oct. 29, 2009, U.S. Appl. No. 12/351,560.
Notice of Allowance mailed Jun. 2, 2010, U.S. Appl. No. 12/351,560.
Office Action mailed Mar. 28, 2006, U.S. Appl. No. 10/882,266.
Office Action mailed Jun. 7, 2006, U.S. Appl. No. 10/882,266.
Office Action mailed Jul. 14, 2006, U.S. Appl. No. 10/882,266.
Office Action mailed Jan. 19, 2007, U.S. Appl. No. 10/882,266.
Office Action mailed Sep. 13, 2007, U.S. Appl. No. 10/882,266.
Office Action mailed May 8, 2008, U.S. Appl. No. 10/882,266.
Notice of Allowance mailed Oct. 7, 2008, U.S. Appl. No. 10/882,266.
Office Action mailed Jun. 4, 2009, U.S. Appl. No. 10/882,266.
Notice of Allowance mailed Apr. 30, 2012, U.S. Appl. No. 12/873,795.

* cited by examiner

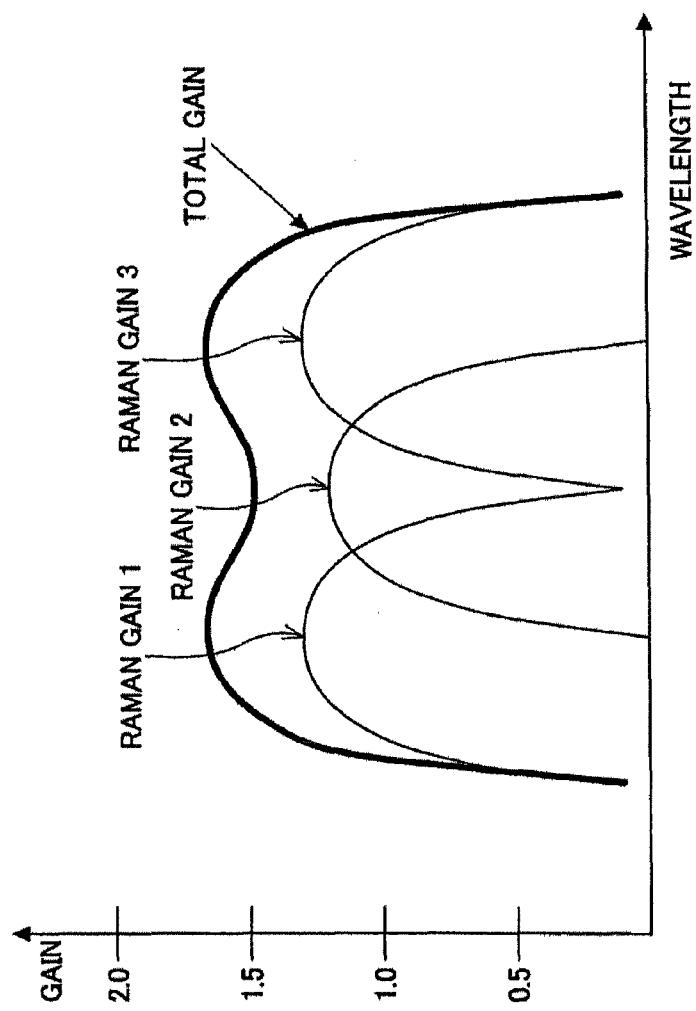

FIG.14

| AVERAGE RAMAN GAIN | PUMPING RATIO BETWEEN RESPECTIVE PUMPING WAVELENGTHS FIBER TYPE A | | | ... | PUMPING RATIO BETWEEN RESPECTIVE PUMPING WAVELENGTHS FIBER TYPE B | | |
|---|---|---|---|---|---|---|---|
| | LD1 | LD2 | LD3 | | LD1 | LD2 | LD3 |
| 0 THRU 2dB | 1 | 0.9 | 1 | | 1 | 0.9 | 1 |
| 2 THRU 4dB | 1 | 0.85 | 1 | | 1 | 0.85 | 0.95 |
| 4 THRU 6dB | 1 | 0.8 | 1 | | 1 | 0.8 | 0.9 |
| 6 THRU dB | 1 | 0.75 | 1 | | 1 | 0.75 | 0.85 |
| 8 THRU 10dB | 1 | 0.7 | 1 | | 1 | 0.7 | 0.8 |
| MORE THAN 10dB | 1 | 0.65 | 1 | | 1 | 0.65 | 0.8 |

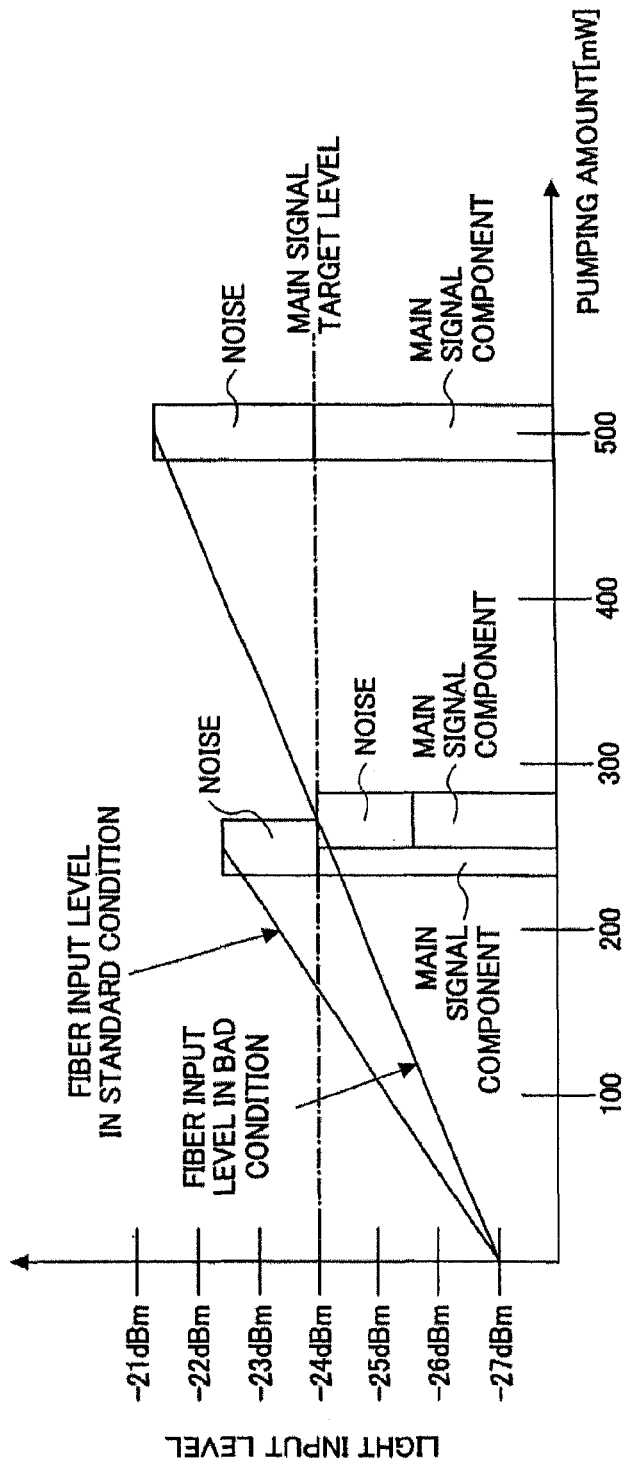

FIG.18A

| PUMPING POWER | ASS NOISE AMOUNT |
|---|---|
| 10(mn) | −35.3dBm |
| 20(mn) | −34.8dBm |
| 30(mn) | −34.3dBm |
| ⋮ | ⋮ |
| 500(mn) | −27.3dBm |

FIG.18B

| ASS NOISE AMOUNT | AVERAGE RAMAN GAIN (dB) | | | |
|---|---|---|---|---|
| | FIBER TYPE A | FIBER TYPE B | ... | FIBER TYPE G |
| −20 THRU −21dBm | 6.5dB | 6.9dB | ... | 7.8dB |
| −21 THRU −22dBm | 6.2dB | 6.7dB | ... | 7.4dB |
| ... | ... | ... | ... | ... |
| −34 THRU −35dBm | 1.7dB | 1.9dB | ... | 2.3dB |
| −35 THRU −36dBm | 1.5dB | 1.7dB | ... | 2.2dB |

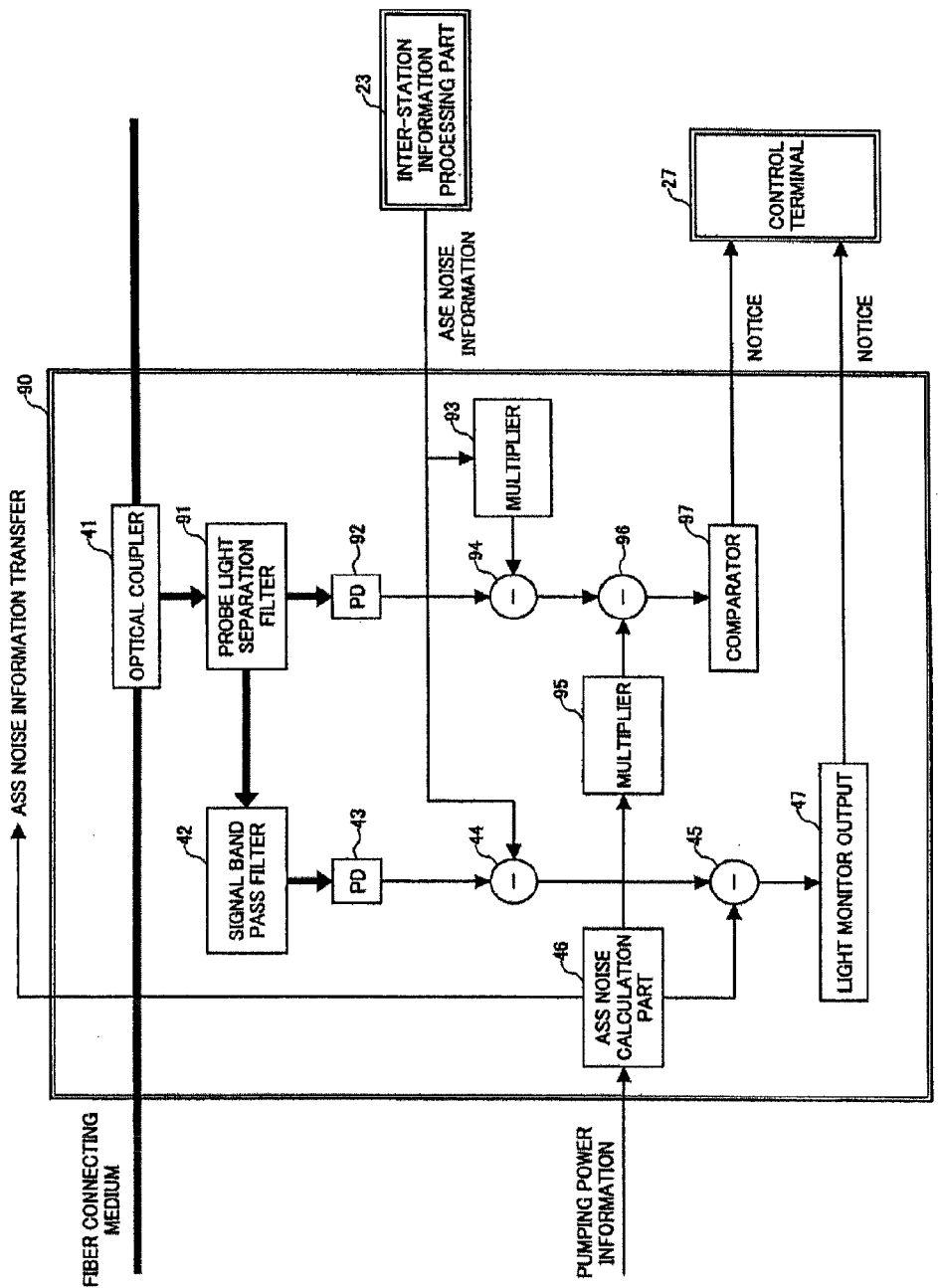

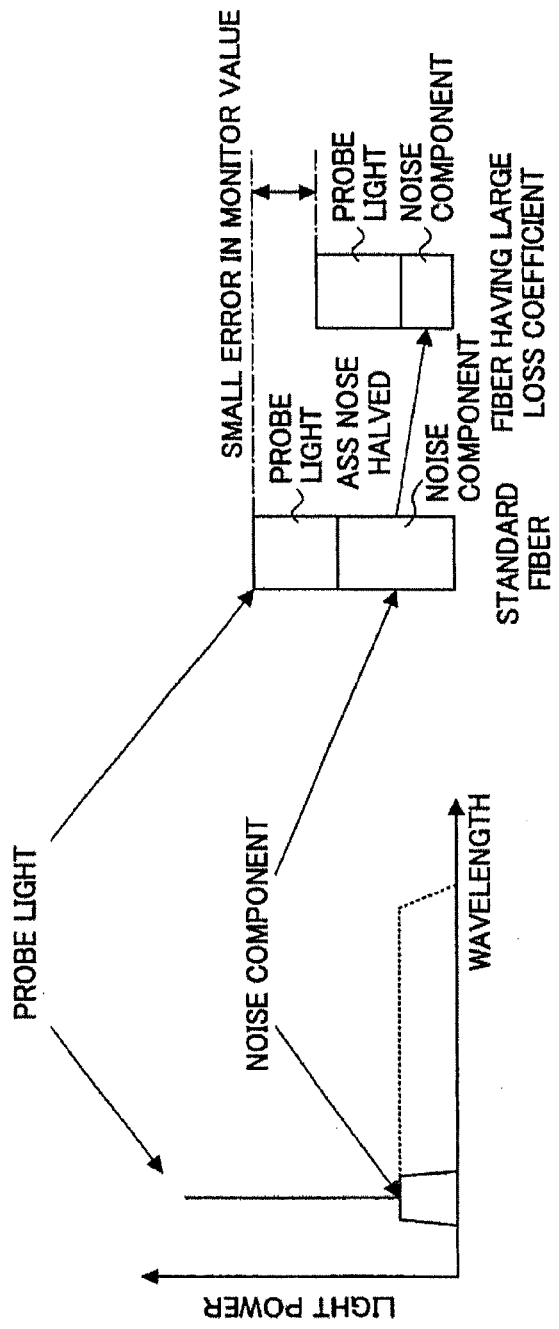

FIG.42A

| ITEM | | NOTES |
|---|---|---|
| FIBER TYPE | | DSF |
| EFFECTIVE CORE CROSS-SECTIONAL AREA[μm²] | 49 | @1590nm |
| EFFECTIVE CORE CROSS-SECTIONAL AREA WAVELENGTH CHARACTERISTICS[μm²/nm] | 0.085 | |
| UPSTREAM EDFA OUTPUT[dBm/ch] | -3.1 | |
| SPAN LOSS[dB] | 27.7 | |
| DRA ON/OFF GAIN[dB] | 11.8 | |

FIG.42B

| LUMP LOSS[dB] | 0.6 |
|---|---|
| LOSS COEFFICIENT[dB/km] | 0.27 |

FIG.42C

| LUMP LOSS[dB] | 0.5 | 1 | 1.5 | 0.5 | 1 | 1.5 | 0.6 | 1.2 | 0.5 | 1 | 1.5 | 0.5 | 1 |
|---|---|---|---|---|---|---|---|---|---|---|---|---|---|
| LOSS COEFFICIENT[dB/km] | 0.21 | 0.21 | 0.21 | 0.25 | 0.25 | 0.25 | 0.27 | 0.27 | 0.29 | 0.29 | 0.29 | 0.33 | 0.33 |
| PUMPING LIGHT POWER[mW] | 302.8 | 339.7 | 381.2 | 355.7 | 399.1 | 447.8 | 369.7 | 447.4 | 405.3 | 454.8 | 510.3 | 454.9 | 510.5 |
| ASS LIGHT GENERATION AMOUNT[dBm] | -22.72 | -23.21 | -23.71 | -22.72 | -23.22 | -23.72 | -22.84 | -23.44 | -22.78 | -23.28 | -23.78 | -22.83 | -23.33 |
| ASS LIGHT ESTIMATION AMOUNT[dBm] | -25.13 | -24.16 | -23.06 | -23.74 | -22.59 | -21.31 | -22.84 | -21.32 | -22.43 | -21.13 | -19.67 | -21.12 | -19.66 |
| α | 1.742779 | 1.242063 | 0.861131 | 1.264189 | 0.866344 | 0.574952 | 1 | 0.61343 | 0.922587 | 0.609442 | 0.388118 | 0.875424 | 0.430071 |

RAMAN AMPLIFIER AND RAMAN AMPLIFIER ADJUSTMENT METHOD

CROSS-REFERENCE TO RELATED APPLICATIONS

This application is a continuation of and claims priority to U.S. application Ser. No. 12/873,795, filed Sep. 1, 2010 now U.S. Pat. No. 8,339,698, which is a divisional of and claims priority to U.S. application Ser. No. 12/351,560, filed Jan. 9, 2009, abandoned, which is a divisional of U.S. application Ser. No. 10/882,266, filed Jul. 2, 2004, now U.S. Pat. No. 7,554,721, which claims priority to PCT/JP2003/009820 filed Aug. 1, 2003 and JP 2004-089872 filed Mar. 25, 2004, the entire contents of all of which are incorporated by reference herein.

BACKGROUND OF THE INVENTION

Field of the Invention

The present invention relates to a Raman amplifier amplifying multiple-wavelength light, a wavelength multiplex transmission apparatus or a wavelength multiplex transmission system employing it, and a Raman amplifier adjustment method for adjusting the Raman amplifier.

2. According to a wide spread of the Internet, an amount of information to be transmitted via the network increases. Therefore, it is an essential issue to achieve increase in a capacity of the network and a long-distance data transmission system.

As a core technology for achieving long-distance data transmission and large-capacity data transmission, a Raman amplifier has been studied to be put into a practical use. The Raman amplifier is an amplifier which utilizes an optical fiber connecting medium as an amplification medium by supplying pumping light thereto.

In the Raman amplifier, as shown in FIG. 1, when pumping light having a wavelength is supplied to an optical fiber, a Raman gain is generated in a wavelength zone corresponding to the pumping light wavelength. There, difference between the pumping wavelength and the wavelength at which the Raman gain has a peak is approximately 100 nm.

In order to obtain the gain throughout a wide wavelength band, it is necessary to provide pumping light in a plurality of different wavelengths. In an example shown in FIG. 1, pumping light 1 through pumping light 3 having mutually different wavelengths are used. When such pumping light in a plurality of wavelengths is supplied to an optical fiber, a Raman gain is generated for pumping light in each wavelength. In the example shown in FIG. 1, Raman gains 1 through 3 are generated by means of the pumping light 1 through pumping light 3. Accordingly, by appropriately controlling power of each pumping light, it is possible to obtain a substantially flat gain throughout a wide wavelength band.

For this purpose, in the Raman amplifier, normally, light power in input multiple-wavelength light is monitored, and the power of each pumping light supplied is adjusted so that the light power thereof may be kept in a predetermined level.

Further, in the Raman amplifier, since ASS (Amplified Spontaneous Scattering) noise is inevitably generated, a function of subtracting the ASS noise component from a received light power value is needed. Thereby, light power of multiple-wavelength light can be detected properly.

Such a Raman amplifier may involve the following problems:

1) The Raman gain depends on optical characteristics of the fiber connecting medium (transmission path) applied. Thereby, due to variation in the optical characteristics in the fiber connecting medium, a desired Raman gain may not be obtained. As a result, a substantially flat gain may not be obtained, as shown in FIG. 3, for example. For example, even when the pumping light power is adjusted for obtaining a substantially flat gain assuming standard optical characteristics, actually, a non-flat gain such as that shown in FIG. 3 may be obtained in a case where a new data transmission system is built and actual optical characteristics of an actual fiber connecting medium differ from the standard ones.

2) Since the above-mentioned ASS noise is in proportion to the Raman gain, the ASS noise varies when the optical characteristics in the fiber connecting medium vary. Therefore, it is difficult to properly estimate the ASS noise, due to variation in the optical characteristics in the fiber connecting medium. As a result, it becomes not possible to properly detect input power of multiple-wavelength light itself. For example, in a case where the optical characteristics in the fiber connecting medium vary while received light power (sum total of multiple-wavelength light power and noise component) is same, as shown in FIGS. 4A and 4B, power of the multiple-wavelength light itself (power of signal light obtained from excluding the noise component) actually differs. If the power of the multiple-wavelength light cannot be detected accurately, accuracy in detection of 'input interruption' which may occur due to a trouble in an upstream station, a cable break or such, may be degraded accordingly. 'Input interruption' means a state in which multiple-wavelength light cannot be received at the relevant Raman amplifier due to a case such as that mentioned above.

Accompanying the above-described problems, the following negative effects may also appear:

1) At a time of installation of the Raman amplifier, when the optical characteristics in the fiber connecting medium are actually measured, and the output of the pumping light source is adjusted manually according to the thus-obtained characteristics, a very large labor and a long time are required.

2) Since the Raman gain characteristics fluctuate depending on aging of the fiber connecting medium, the ambient temperature or such, the Raman amplifier should be designed to have a margin considering the fluctuation. Accordingly, the efficiency in the Raman amplifier cannot be kept high enough in design.

3) In an optical amplifier having an EDFA (Erbium added fiber amplifier) provided subsequent thereto, a gain in the EDFA is controlled in a condition in which the ASS noise amount includes error. Thereby, quality in data transmission characteristics may be degraded.

The variation in the optical characteristics in the fiber connecting medium occurs mainly due to the following causes:

1) An optical loss may occur due to contamination in a connecting point between optical fibers (for example, between a fiber connecting medium and an intra-station fiber, for example) or a bending loss in the optical fiber. Such optical loss may be controlled less than 0.5 dB in a station building in a good condition, while it may amount to more than 2 dB in a station building in a bad condition.

2) Fabrication variation may occur in characteristics (loss coefficient, effective cross-sectional area or such) of the fiber connecting medium itself. Especially, influence by the loss coefficient is serious. For example, the loss coefficient of an optical fiber in a good condition is controlled less than 0.21 dB/km while the same in a bad condition may amount to more than 0.25 dB/km. Accordingly, assuming that the length of a fiber connecting medium is 50 km for example, a variation of more than 2 dB may occur in the bad condition.

3) Generally speaking, a fiber connecting medium is produced by splicing a plurality of optical fibers for every kilometers. A loss inevitably occurs at each splicing point. Such a loss in each splicing point is less than 0.1 dB in a better condition, while it may amount to more than 0.5 dB in a worse condition. In this connection, it is noted that intervals of splicing points and the number of splicing points provided between adjacent stations depend on a particular network system.

4) The ambient temperature or aging of the relevant optical fiber influences the optical characteristics in the fiber connecting medium as mentioned above.

Generally speaking, a bender which manufactures the optical amplifier (Raman amplifier) is different from a bender which manufactures and installs the fiber connecting medium applied thereto. Therefore, the bender of the optical amplifier cannot directly manage the optical characteristics of the fiber connecting medium. Accordingly, it is not possible to reduce the above-mentioned issue concerning 'variation in the optical characteristics in the fiber connecting medium'.

Japanese Laid-open Patent Application No. 2002-296145 (especially, FIG. 1, and paragraphs 0028 through 0040) (parent document #1) discloses an art directed to solving these problems. An apparatus disclosed in this document includes an OTDR (optical time domain reflectometry) measuring function, and, with the use of this function, optical characteristics in a fiber connecting medium are measured. Then, based on the measured optical characteristics, a Raman gain is calculated. However, when the OTDR measuring function is thus provided in the optical amplifier, the optical amplifier should have its size increased, and also, have the costs increased, accordingly.

As such a Raman amplifier, distributed Raman amplification (DRA) modules each including one or a plurality of pumping light sources utilize Raman amplification effect. According to the Raman amplification effect, as a result of pumping light (at high intensity, i.e., more than 100 mW) being input to an optical fiber connecting medium made of silica or such by means of the DRA module, the optical fiber itself acts as an amplification medium.

A gain of the DRA module depends on the pumping light amount input to the optical fiber connecting medium, and therefore, the DRA module should be controlled, in the pumping light amount, according to a signal light level monitored, in order to obtain the signal light at a desired level of gain (output).

However, when pumping light having high intensity is input to the optical fiber connecting medium, while signal light is amplified according to the Raman amplification effect thereof, the above-mentioned ASS light is also generated, which acts as signal noise. A light receiving device (made of a photodetector or such) which monitors the signal light receives not only the signal light itself but also the ASS light, and also, it receives so-called ASE light inevitably (see FIGS. 26 and 27). Therefore, in order to perform control such as to obtain the signal light at a desired constant level accurately, it is necessary to calculate and estimate the ASS light amount generated as a result of the pumping light being input to the optical fiber connecting medium. Especially in a case where the number of wavelengths multiplexed is small, or the signal light level is low, a ratio of the ASS light amount is large with respect to the signal light level, and thus, it is necessary to estimate the ASS light amount more accurately. International Patent Publication No. WO02/019023 (patent document #5) discloses a method for accurately estimating the ASS light amount in which predetermined pumping light is input to a specific fiber, and, while the pumping light amount is monitored in a DRA module, the ASS light amount generated in the fiber is measured. Thereby, a relational expression between the pumping light amount and the ASS light amount is derived, and therewith, the ASS light generation amount is estimated from any particular pumping light amount to supply.

However, as mentioned above, even when a same type of fiber is applied, variation exists in a loss coefficient and an effective core cross-sectional area which influence a Raman gain and an ASS light generation amount, and also, variation exists in an optical loss (local loss) occurring between the DRA module and the fiber connecting medium due to conditions of the connecting medium (transmission line) applied. Therefore, in a case where an actual connecting medium has conditions different from those for which the above-mentioned relational expression was derived, error occurs between the actual ASS light generation amount and the ASS light estimation amount obtained in the optical amplifier itself. Thereby, the accuracy in estimation of ASS light amount may be degraded actually.

Thus, such a factor degrading the ASS light generation amount estimation accuracy may obstruct achievement of a desired signal light constant control result even when signal light constant control is performed for obtaining a desired signal light level. For example, in a case where an ASS estimation amount is smaller than an actual one, control may be made based on erroneous recognition as if a signal light level reaches a desired one even when the actual signal light level is smaller than the desired one (see FIG. 28). Especially in a case of a multi-stage optical transmission apparatus in which many optical amplifiers each including the DRA module are connected in series, degradation in ASE correction accuracy due to ASS light generation amount estimation error may obstruct proper ASE correction in a downstream station, which may result in degradation in a signal-to-noise ratio at a signal receiving station (OSNR).

Further, generally speaking, a DRA module has very large power, and thus, there is dangerousness due to leakage of the pumping light from a fiber terminal end. Therefore, for the purpose of safety, a function of shutdown (forcible output reduction/elimination) of pumping light sources in the DRA module is provided. Specifically, for example, occasion of connector opening, fiber break or such is regarded as an event of 'input interruption' of signal light detected by means of the light receiving device in the DRA module, and it is used as a trigger for the above-mentioned shutdown. However, in a case where such a method is applied, when a threshold light level for determining the input interruption is low, there is a possibility of remarkable degradation in the input interruption accuracy or function, which results in erroneous detection or erroneous non-detection. In a case where input interruption erroneous detection occurs, the pumping light in the DRA module is forcibly turned off and thus, the function of the optical amplifier is turned off although an actual state is a state in which the optical communication apparatus can operate normally. In such a case, a transmission error alarm is generated in a downstream transmission apparatus, and thus, the data transmission quality may be remarkably degraded. On the other hand, in a case where even when connector opening or fiber break actually occurs in an upstream connecting medium, this matter is not detected in the DRA module due to erroneous determination (input interruption non-detection), the above-mentioned shutdown trigger is not applied, and thus, a dangerous state may occur due to pumping light leakage from the fiber terminal end in the DRA module as mentioned above.

SUMMARY OF THE INVENTION

An object of the present invention is to solve the above-described problems, and to provide a Raman amplifier by which, even when it is applied to an optical data transmission system including a fiber connecting medium having different optical characteristics for each particular case, satisfactory gain characteristics can be obtained. Another object of the present invention is to provide a Raman amplifier by which, even when it is applied to an optical data transmission system including a fiber connecting medium having different optical characteristics, net signal light power can be accurately detected.

Further another object of the present invention is to provide a Raman amplifier having a function of correcting an error in an ASS light estimation amount with a simple configuration, which error occurs due to difference in parameters of a fiber connecting medium actually applied, and an adjustment method of the Raman amplifier to properly correct the ASS light estimation amount.

A Raman amplifier according to the present invention amplifying multiple-wavelength light with the use of a fiber connecting medium, includes: a pumping unit supplying pumping light to the fiber connecting medium; a light monitoring unit detecting light power of the multiple-wavelength light; and a control unit controlling the pumping light based on light power detected by the light monitoring unit and connecting medium information indicating optical characteristics of the connecting medium. The above-mentioned connecting medium information includes information indicating a fiber type of the fiber connecting medium, information indicating a length of the fiber connecting medium, an average fiber loss coefficient of the fiber connecting medium and an intra-station loss value.

Optical characteristics of a fiber connecting medium in an optical data transmission system employing a Raman amplifier depend on a particular system. A tilt in a Raman gain occurs when pumping light is controlled with the use of standard values of optical characteristics of a fiber connecting medium, and also, such a tilt in a Raman gain may obstruct accurate detection of signal light power itself. Therefore, according to the present invention, pumping light is controlled in consideration of information indicating a fiber type of the fiber connecting medium, information indicating a length of the fiber connecting medium, an average fiber loss coefficient of the fiber connecting medium and an intra-station loss value. As a result, according to the Raman amplifier according to the present invention, a substantially flat Raman gain can be obtained even it is applied to an optical data transmission system having different optical characteristics in the fiber connecting medium.

A Raman amplifier according to another aspect of the present invention includes: a pumping unit supplying pumping light to a fiber connecting medium; a light monitoring unit detecting light power of multiple-wavelength light; a measuring unit measuring a Raman gain in the fiber connecting medium while changing power of the pumping light; and a determination unit determining power of the pumping light to be supplied based on light power detected by the light monitoring unit and the Raman gain measured by the measuring unit.

In this Raman amplifier, the power of the pumping light is controlled based on the Raman gain actually measured. Accordingly, a substantially flat Raman gain can be obtained and also signal light power can be accurately detected, even it is applied to an optical transmission system having different optical characteristics in the fiber connecting medium.

A Raman amplifier according to further another aspect of the present invention includes: a pumping unit supplying pumping light to a fiber connecting medium; a light monitoring unit detecting light power of multiple-wavelength light; a noise measurement unit measuring ASS noise during the output of an optical amplifier provided in an upstream station with respect to the fiber connecting medium being stopped; a driving unit driving a Raman gain in the fiber connecting medium based on the thus-measured ASS noise; and a determination unit determining power of the pumping light to be supplied based on the light power detected by the light monitoring unit and the Raman gain derived by the driving unit.

In this Raman amplifier, the Raman gain in the fiber connecting medium is derived based on the ASS noise amount actually measured. Accordingly, a substantially flat Raman gain can be obtained and also signal light power can be accurately detected, even it is applied to an optical transmission system having different optical characteristics in the fiber connecting medium.

A Raman amplifier according to further another aspect of the present invention includes: a pumping unit supplying pumping light to a fiber connecting medium; a light monitoring unit detecting light power of multiple-wavelength light; and a control unit controlling the pumping light based on light power detected by the light monitoring unit. The above-mentioned light monitoring unit includes: an ASS noise calculation unit calculating an ASS noise amount; a correction unit correcting the ASS noise amount based on received light power from the fiber connecting medium and a total sum of peak power at respective wavelengths of the multiple-wavelength light; and an operation unit obtaining light power of the multiple-wavelength light by subtracting the thus-corrected ASS noise amount from the received light power.

In this Raman amplifier, the light power of the multiple-wavelength light is obtained from subtracting the noise component from the total received light power. In this system, it is possible to accurately detect the noise component. According to the present invention, the sum total of the peak power of the respective wavelengths of the multiple-wavelength light is obtained, and then, with the use of this value of the sum total, detection error in the light monitoring unit is corrected. Accordingly, it is possible to accurately obtain the noise component, and thus, to accurately detect the signal light power.

A Raman amplifier according to further another aspect of the present invention includes: a pumping unit supplying pumping light to a fiber connecting medium; a light monitoring unit detecting light power of multiple-wavelength light; a control unit controlling the pumping light based on the light power detected by the light monitoring unit; a wavelength filter extracting a predetermined wavelength component from input light; an operation unit subtracting a noise component from the wavelength component extracted by the wavelength filter; and a detecting unit detecting a trouble in an upstream station or in the fiber connecting medium.

In this Raman amplifier, the wavelength filter selects a certain wavelength included in the multiple-wavelength light, and also, excludes almost all of the noise components. Accordingly, a ratio of the noise components included in the thus-extracted wavelength component is small. Therefore, it is possible to accurately detect light power transmitted for the purpose of detecting a trouble in an upstream station or in a fiber connecting medium even with the optical characteristics different in the fiber connecting medium. Thus, it is possible to accurately detect such a trouble in the upstream station or in the fiber connecting medium.

A Raman amplifier according to further another aspect of the present invention amplifying signal light with the use of a fiber connecting medium, includes: a pumping unit supplying pumping light to a fiber connecting medium; a light measurement unit measuring a received light amount; a noise component estimation unit estimating, based on the pumping light amount, a noise component occurring in the fiber connecting medium; and a correction unit comparing between the noise component estimation value obtained from the noise component estimating unit and a noise component measurement value obtained from the light measurement unit, and correcting the noise component estimation amount based on the comparison result.

In this case, for example, after the Raman amplifier is installed in the system, and then, before it is actually operated, a spectrum analyzer or such is connected to an output terminal of the Raman amplifier as shown in FIG. 29. Then, for the purpose of testing, a predetermined signal light is supplied to the system from an upstream end, a received light amount in the Raman amplifier is measured by means of the spectrum analyzer or such, and, then, from the thus-obtained measured waveform, a noise component (for example, in a waveform shown in FIG. 26, a level Ln of a natural Raman scattering and an accumulated ASE light) is detected. Then, the thus-obtained detected noise component value is compared with a noise component estimation value which is previously estimated from various factors of the system (a loss coefficient and an effective cross-sectional area of an upstream-side fiber connecting medium, an optical loss (local loss) from the DRA module to the connecting medium, and so forth). Then, from the thus-obtained comparison result, a correction coefficient (correction value) is obtained. After that, during an actual system operation stage, the above-mentioned noise component estimation value is multiplied by the thus-obtained correction coefficient, and thus, it is possible to obtain a correct noise component estimation value (for example, a value corresponding to the level Ln of the natural Raman scattering light and the accumulated ASE component light shown in FIG. 27) according to the actual system applied. In the example of FIG. 27, it is possible to correctly obtain a signal light level Ls as a result of the noise component estimation value being properly subtracted from the received light level Lr. Then, by controlling the supplying pumping light amount so that the thus-obtained signal light level may become a predetermined level, it is possible to obtain a desired Raman gain.

Thus, according to the present invention, it becomes possible to accurately obtain net light power of a received light signal, and thus, it is possible to achieve accurate control of a Raman amplifier.

BRIEF DESCRIPTION OF THE DRAWINGS

Other objects and further features of the present invention will become more apparent from the following detailed description when read in conjunction with the accompanying drawings:

FIGS. 3, 4A and 4B illustrate a possible problem in a Raman amplifier in the related art;
FIG. 14 shows a pumping ratio table;
FIGS. 16A and 16B illustrate an effect of the second embodiment;
FIG. 18A shows an example of a pumping light/ASS noise table;
FIG. 18B shows an example of an average Raman gain derivation table;
FIG. 23 shows a configuration of a light monitoring part in a Raman amplifier according to the fifth embodiment;
FIGS. 25A and 25B illustrate an effect of the fifth embodiment;
FIGS. 32A and 33B show signals of light received by means of another light receiving device in the seventh embodiment.

FIGS. 42A, 42B and 42C show numeric examples of any one of the sixth through tenth embodiments of the present invention.

DETAILED DESCRIPTION OF THE PREFERRED EMBODIMENTS

Embodiments of the present invention will now be described.

Figure 5:
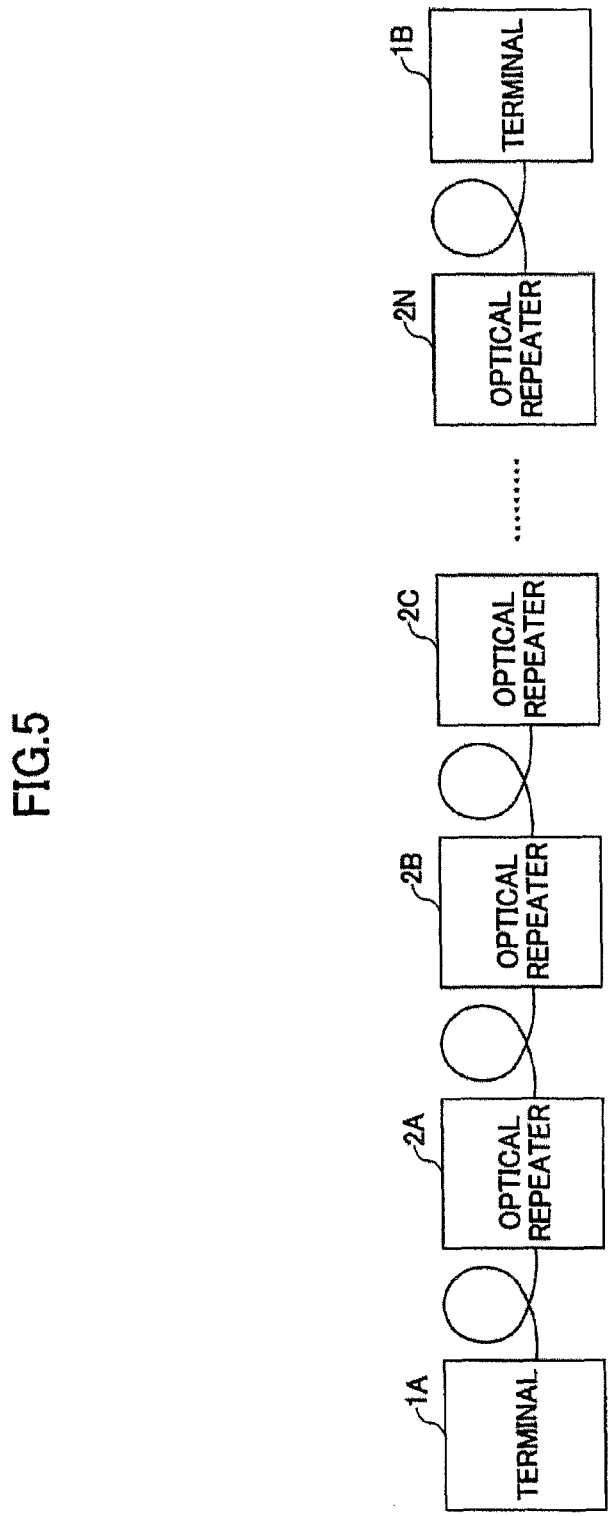
FIG. 5 shows an example of a configuration of an optical data transmission system in which a Raman amplifier according to an embodiment of the present invention is used.
Figure 6:
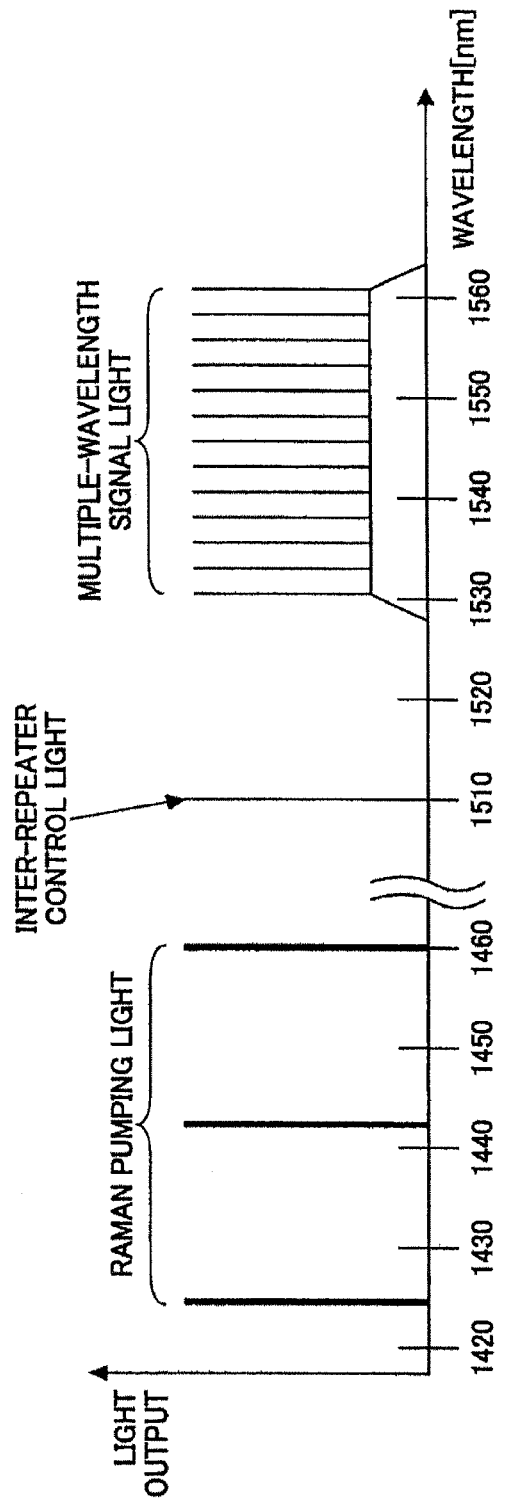
FIG. 6 illustrates wavelengths used in the optical data transmission system according to the embodiment of the present invention.

FIG. 5 shows a configuration of one example of an optical data transmission system in which a Raman amplifier according to any embodiment of the present invention may be used. The system shown is a WDM (wavelength division multiplexing) data transmission system in which multiple-wavelength light is transmitted between a terminal station 1A and a terminal station 1B. Along a connecting medium between the terminal stations 1A and 1B, a plurality of optical repeaters 2A through 2N are provided. Each of these optical repeaters 2A through 2N acts as an optical amplifier which amplifies the multiple-wavelength light in sequence. A facility accommodates each of these optical repeaters 2A through 2N will be referred to as a 'station building' or simply a 'station' hereinafter.

Signal light transmitted between the terminal stations 1A and 1B for the purpose of signal/data communication is disposed in a band between 1530 through 1560 nm. Approximately 80 wavelengths can be disposed as the signal light within this wavelength band, for example. This wavelength band is included in a common EDFA gain band.

In the optical data transmission system according to the embodiment of the present invention, inter-repeater control information is sent/received among the optical repeaters 2A through 2N. Each optical repeater thereof uses the inter-repeater control information to adjust own pumping power to supply so as to amplify the multiple-wavelength light in an optimum condition. The inter-repeater control information is transmitted with the use of inter-repeater control light in a predetermined wavelength. In this example, the inter-repeater control light is light in an OCS (optical service channel) of 1510 nm.

Figure 7:
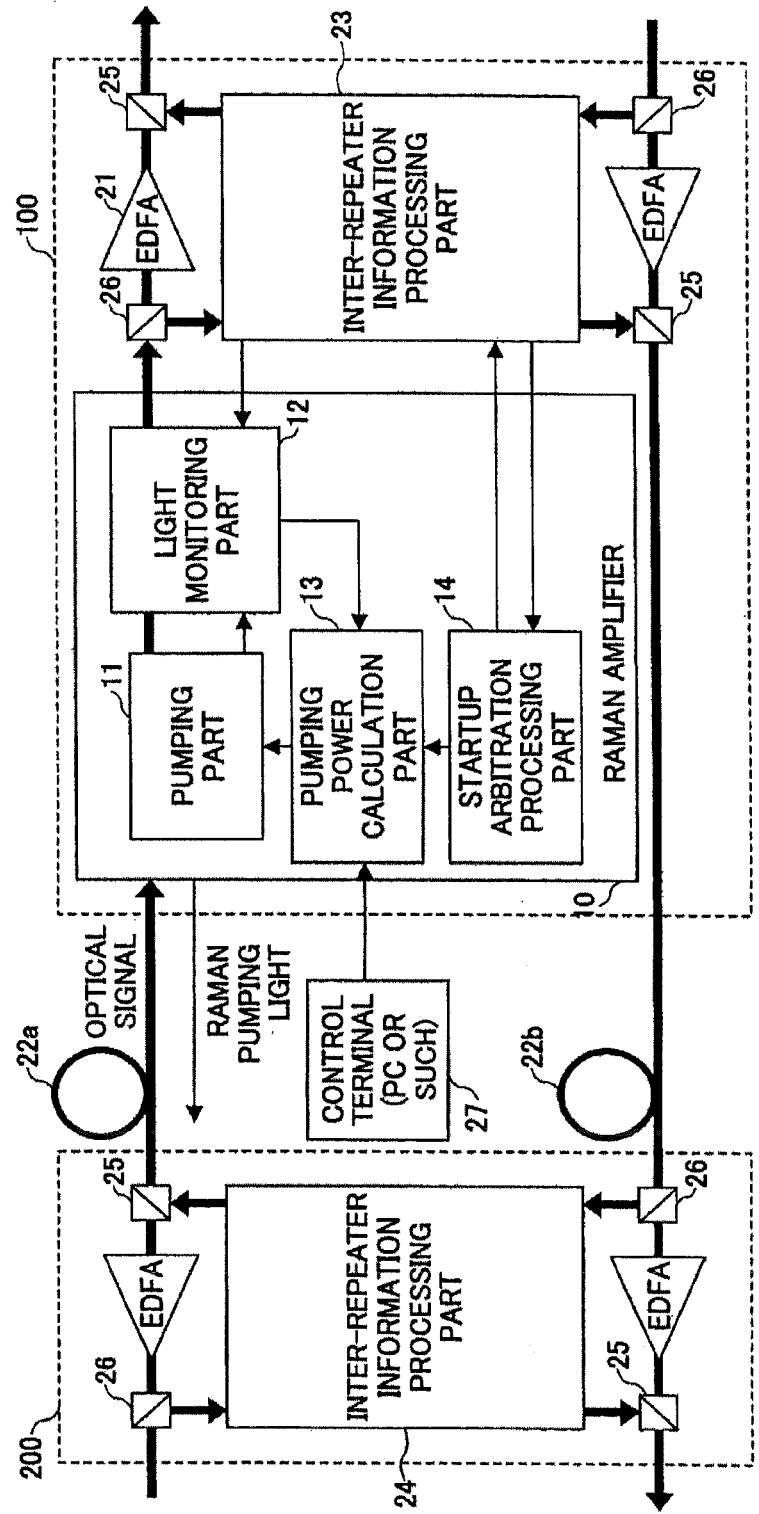
FIG. 7 shows a block diagram of a configuration of an optical repeater.

FIG. 7 shows a block diagram illustrating an example of a configuration of the optical repeater. In FIG. 7, any optical repeater (referred to as an optical repeater 100, hereinafter) of the optical repeaters 2A through 2N shown in FIG. 5, and another optical repeater (referred to as an optical repeater 200, hereinafter) provided adjacent thereto in an upstream direction, are shown. Basically, a configuration and operation of each optical repeater are same thereamong. Further, part of the optical repeater 200 is omitted in the figure.

The optical repeater 100 includes a Raman amplifier 10 and an EDFA 21. The Raman amplifier 10 includes a pumping part 11, a light monitoring part 12, a pumping power calculation part 13 and a startup arbitration processing part 14, and, amplifies the multiple-wavelength light by supplying pumping light. In the present embodiment, the pumping light is input to the fiber connecting medium 22a so that the pumping light is transmitted in a direction opposite to a direction in which the multiple-wavelength light is transmitted there. The EDFA 21 further amplifies the multiple-wavelength light once amplified by the Raman amplifier 10.

Each optical repeater includes an inter-repeater information processing part, specifically, the optical repeater 100 includes an inter-repeater information processing part 23, and the optical repeater 200 includes an inter-repeater information processing part 24. The inter-repeater information processing parts 23 and 24 send/receive the inter-repeater control light. For example, the inter-repeater information processing part 24 in the optical repeater 200 outputs information to be sent to the optical repeater 100 by means of the inter-repeater control light which carries this information. The inter-repeater control light is led to a fiber connecting medium 22a by means of a multiplexing device 25, and is transmitted to the optical repeater 100 together with signal light. Then, a wavelength separation device 26 in the optical repeater 100 separates the inter-repeater control light from the thus-received multiple-wavelength light via the fiber connecting medium 22a, and leads it to the inter-repeater information processing part 23. Thereby, the information is sent to the inter-repeater information processing part 23 in the optical repeater 100 from the inter-repeater information processing part 24 in the optical repeater 200. The basically same manner is applied also when the information is sent to the inter-repeater information processing part 24 in the optical repeater 200 from the inter-repeater information processing part 23 in the optical repeater 100. However, in this case, the inter-repeater control information is transmitted via the fiber connecting medium 22b.

Further, a control terminal 27 is connected to each optical repeater. With the use of the control terminal 27, an operator can set information concerning optical characteristics of the fiber connecting medium (referred to as 'fiber connecting medium information, hereinafter).

Figure 8:
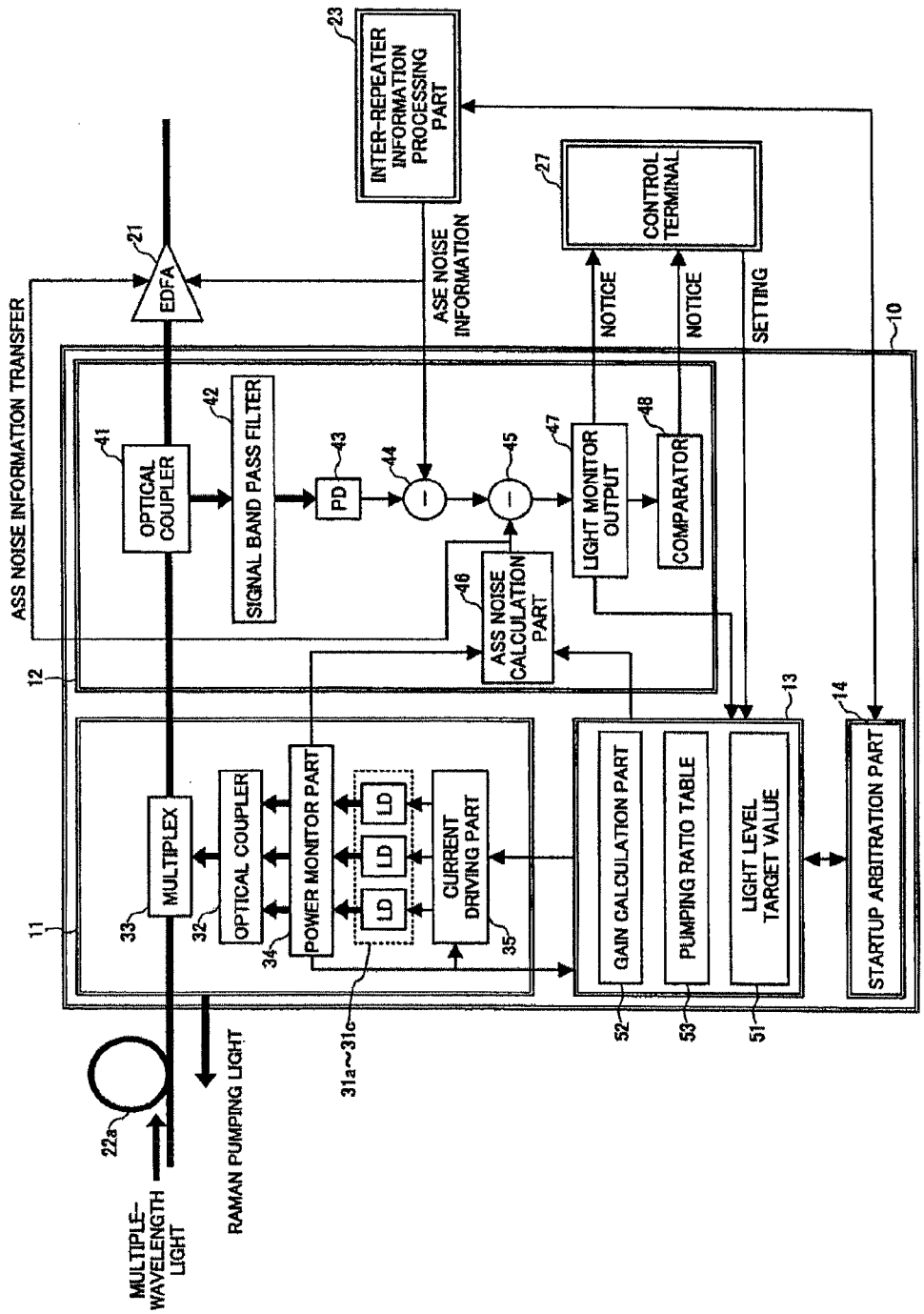
FIG. 8 shows a configuration of the Raman amplifier.

FIG. 8 shows a configuration of the Raman amplifier 10. As mentioned above, the Raman amplifier 10 includes the pumping part 11, the pumping power control part 13 and the startup arbitration processing part 14.

The pumping part 11 includes pumping light sources (LD) 31a through 31c, an optical coupler 32, a multiplexing device 33, a power monitoring part 34 and a current driving part 35. The pumping light sources 31a through 31c are, for example, laser diodes, respectively, and generate pumping light having mutually different wavelengths, respectively. In this embodiment, the wavelength of the pumping light generated by the pumping light source 31c is longest, while the wavelength of the pumping light generated by the pumping light source 31a is shortest. In other words, the pumping light sources 31a, 31b and 31c generates the pumping light 1, the pumping light 2 and the pumping light 3, respectively, shown in FIG. 1. The optical coupler 32 multiplexes the pumping light generated by the pumping light sources 31a, 31b and 31c. The multiplexing device 33 leads input light from the fiber connecting medium 22a to the light monitoring part 12, and also, leads the pumping light multiplexed by the optical coupler 32 to the fiber connecting medium 22a. Thus, the Raman amplifier 10 applies the pumping light in the mutually different wavelengths for the purpose of obtaining a gain substantially flat throughout a wide wavelength band.

The power monitoring part 34 detects light power of the pumping light generated by each of the respective pumping light sources 31a through 31c. The power monitoring part 34 is made of, for example, an optical coupler acting as an optical splitter, and a photodiode. The current driving part 35 drives the pumping light sources 31a through 31c according to instructions from the pumping power calculation part 13.

The light monitoring part 12 includes an optical coupler 41, a signal band pass filter 42, a photodiode (PD) 43, subtractor 44 and 45, a noise calculation part 46, a light monitor output part 47 and a comparator 48.

Figure 9:
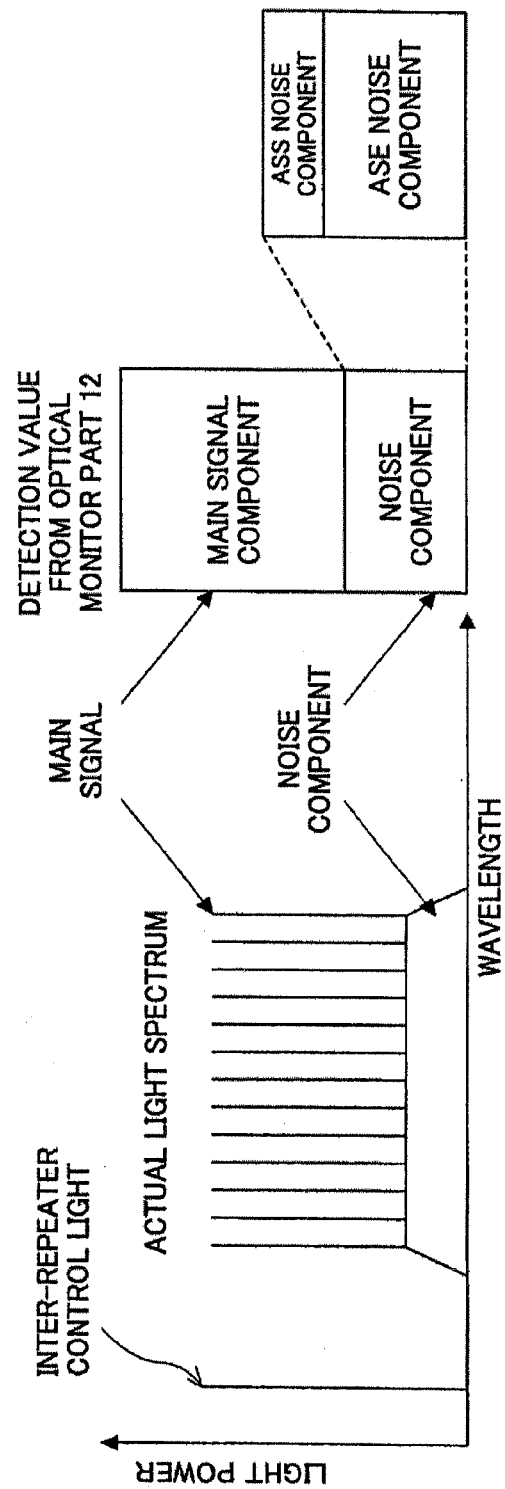
FIG. 9 illustrates noise components.

The optical coupler 41 leads almost all of output light from the Raman amplifier 10 to the EDFA 21, and also, leads a part thereof to a signal band pass filter 42. The output light from the Raman amplifier 10 includes, as shown in FIG. 9, not only signal light, but also a noise component, and the above-mentioned inter-repeater control light. The noise component mainly includes ASS noise and ASE (amplified spontaneous emission) noise. The ASS noise is noise inevitably generated in Raman amplification, while the ASE noise is noise generated in EDFAs.

Figure 10:
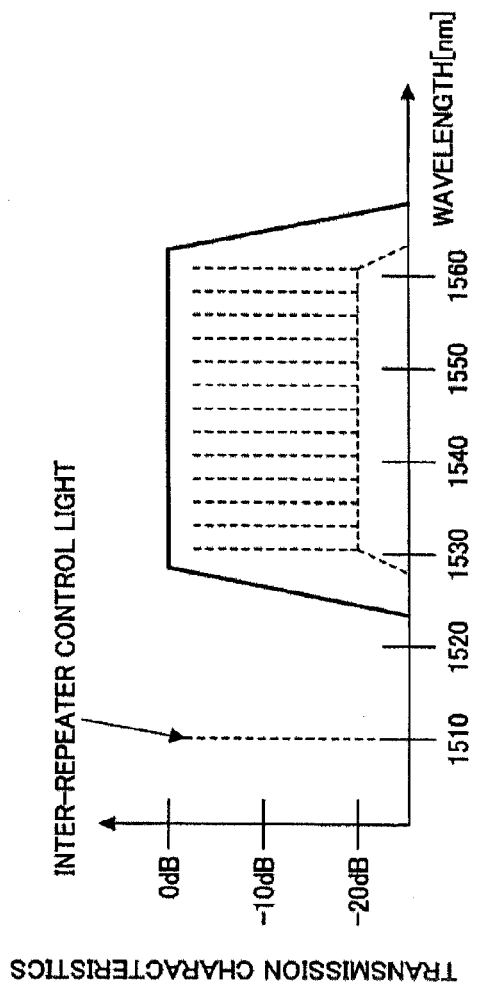
FIG. 10 shows characteristics of a signal band passing filter.

The signal band pass filter 42 blocks the wavelengths other than a band of 1530 through 1560 nm, as shown in FIG. 10. Accordingly, the signal band pass filter 42 allows the signal light to pass therethrough and also blocks the inter-repeater control light and reflected light of the pumping light. The photodiode 43 detects power of light having passed through the signal band pass filter 42. Accordingly, the photodiode 43 detects not only the signal light but also the noise component existing in the band of 1530 through 1560 nm.

The subtractor 44 subtracts an ASE noise value from the light power value detected by means of the photodiode 43. The ASE noise value is a noise amount originating from the EDFA provided in the upstream optical repeater, and can be detected at a time when each repeater is manufactured. In the optical data transmission system, the inter-repeater control light is used among the respective optical repeaters to notify the ASE noise amount of the respective EDFAs thereamong. In other words, the inter-repeater information processing part 23 thus recognizes the ASE noise amount in the relevant upstream optical repeater.

The subtractor 45 subtracts an ASS noise value from the output of the subtractor 44. The ASS noise value is calculated by the ASS noise calculation part 46. The ASS noise calculation part 46 calculates the ASS noise value based on a Raman gain in the fiber connecting medium, or based on the pumping light power detected by the power monitoring part 34. Details of a method of calculating the ASS noise value are described later.

The light monitor output part 47 notifies the control terminal 27 of the light power value output from the subtractor 45. The comparator 48 determines whether or not an 'input interruption' event occurs based on the light power value output from the subtractor 45. 'Input interruption' means a state in which the input power of the signal light is lower than a predetermined threshold value. In other words, the comparator 48 determines whether or not the signal light sent out from the upstream optical repeater is received by the own apparatus. 'Input interruption' occurs when the upstream optical repeater has a trouble, the fiber connecting medium is broken or so.

Thus, the light monitoring part 12 detects light power after the ASE noise and the ASS noise are removed from the input light level. For this purpose, the Raman amplifier 10 should calculate the ASS noise accurately as described later. Accordingly, the light monitoring part 12 can accurately detect the light power of the net signal light. As a result, the pumping light power can be accurately controlled, and a substantially flat gain can be obtained. Furthermore, it can properly detect an 'input interruption' event.

The ASS noise value calculated by the ASS noise calculation part 46 is also sent to the EDFA 21. The EDFA 21 amplifies the multiple-wavelength light in consideration of the thus-obtained ASS noise value. Thereby, also the EDFA 21 can perform amplification on the signal light appropriately. It is possible that this ASS noise amount is also sent to the downstream optical repeater.

The pumping power calculation part 13 determines the pumping power to supply based on the fiber connecting medium information given by the control terminal 27, the signal light power detected by the light monitoring part 12 and the pumping light power detected by the power monitoring part 34, such that the power input to the EDFA 21 may be kept at a predetermined target value. The target value is held in a target value holding part 51. The fiber connecting medium information includes information indicating a type of the fiber connecting medium 22a, information indicating a length of the fiber connecting medium 22a, an average fiber loss coefficient of the fiber connecting medium 22a and an intra-station loss value. However, it is possible that, instead of the combination of the information indicating the length of the fiber connecting medium 22a and the average fiber loss coefficient of the same, information indicating a total loss of the fiber connecting medium 22a is applied.

Further, in order to obtain a flat Raman gain, it is necessary to appropriately control ratios among light power generated by the respective pumping light sources 31a through 31c. For this purpose, the pumping power calculation part 13 has a gain calculation program 52 for calculating an average Raman gain, and a pumping ratio table 53 registering pumping power ratios corresponding to respective average Raman gains.

The startup arbitration processing part 14 cooperates with the inter-repeater information processing part 23, and controls operation of the pumping power calculation part 13 at a time of initial setting of the optical data transmission system. Specifically, for example, instructions for gradually controlling the pumping power are given to the pumping power calculation part 13. Control of the Raman gain uses the input light power of the multiple-wavelength light as feedback information. Accordingly, it is necessary that light output of the upstream optical repeater is stabilized. Therefore, the startup arbitration processing part 14 executes a control flow for sending/receiving information indicating whether or not EDFA output of the upstream optical repeater is stabilized.

Basic operation of the optical repeater described above is described next. That is, the pumping part 11 supplies pumping light to the fiber connecting medium 22a. Thereby, the fiber connecting medium 22a acts as a Raman amplification medium. The light monitoring part 12 monitors power of signal light amplified by this fiber connecting medium 22a. The pumping power calculation part 13 controls the pumping light to supply so that the power of the signal light thus amplified may be kept at a target value and also a flat Raman gain may be obtained. After that, the EDFA 21 further amplifies the thus-Raman-amplified multiple-wavelength light, and sends it to the downstream optical repeater.

The Raman amplifier according to first through fifth embodiments of the present invention determines pumping power (or, light power of the pumping light) at a time o initial setting stage of the optical data transmission system, as is described next.

Figure 11:
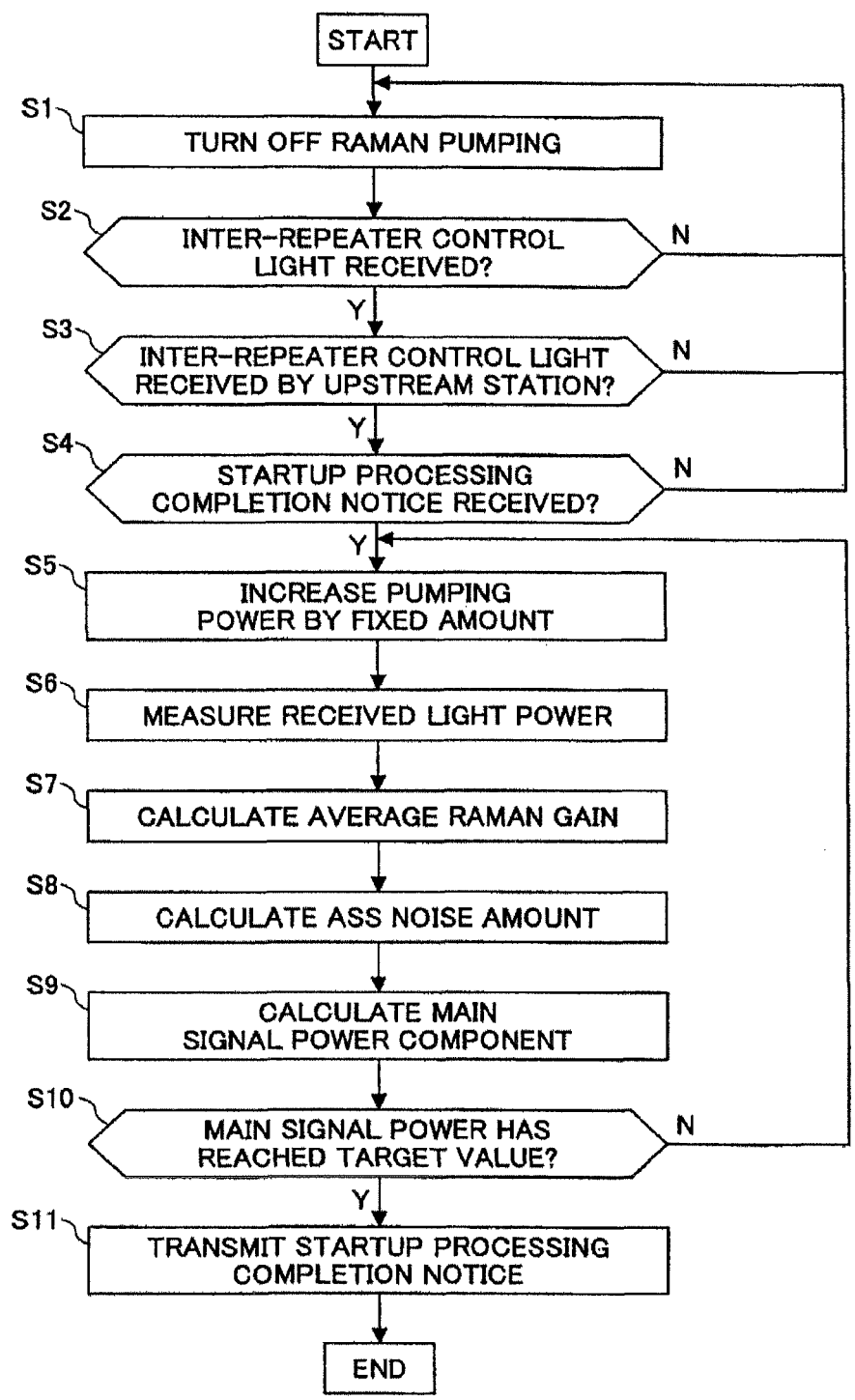
FIG. 11 shows a flow chart of processing of starting up of a Raman amplifier according to a first embodiment of the present invention.

FIG. 11 shows a flow chart illustrating startup processing in a Raman amplifier according to a first embodiment of the present invention. The processing of this flow chart is performed at a time of establishing the light transmission system, at a time of restoration from a shutdown event, or such, for example.

In Step S1, Raman pumping is stopped. In other words, output of each of the pumping light sources 31a through 31c is made to be zero (0 mW). Instructions therefor are given to the pumping part 11 from the startup arbitration processing part 14.

In Step S2, it is determined whether or not inter-repeater control light is received from the upstream optical repeater (optical repeater 200 in the example of FIG. 7). As described above, the inter-repeater control light is led to the inter-repeater information processing part 23 after being separated from the multiple-wavelength light by means of the wavelength separation part 26. Thus, the determination in Step S2 is performed by the inter-repeater information processing part 23.

In Step S3, it is determined whether or not inter-repeater control light sent out from the own optical repeater is received by the upstream optical repeater. When receiving the inter-repeater control light thus sent out from the relevant optical repeater, the upstream optical repeater returns inter-repeater control information indicating this matter to the relevant optical repeater. This inter-repeater control information is sent to the downstream relevant optical repeater by means of inter-repeater control light which carries this information. Thus, also the determination in Step S3 is performed by the inter-repeater information processing part 23.

In Step S4, it is determined whether or not startup processing completion notice has been received from the upstream optical repeater. Each optical repeater is configured so that, when the own EDFA is stabilized to generate an optical signal at predetermined power, this matter is notified of to the downstream optical repeater. Also this notification information is sent through inter-repeater control light. Thus also the determination in Step S4 is performed by the inter-repeater information processing part 23, the same as in Steps S2 and S4.

When the inter-repeater control light from the upstream optical repeater is received by the relevant optical repeater, the inter-repeater control light from the relevant optical repeater is received by the upstream optical repeater and also the startup processing completion notice is received from the upstream optical repeater (Yes in each of Step S2 through S4), processing in Steps S5 through S11 is then performed.

In Step S5, the pumping power in the pumping light sources 31a through 31c is increased by a predetermined amount. The predetermined amount to increase at this time is, for example, 10 mW. In a case where processing in Step S5 is first performed immediately after the execution of Steps S1 through S4, instructions are given such that the pumping power in the pumping light sources 31a, 31b and 31c may have ratios of '1:1:1'. In other words, the pumping power of each of the pumping light sources 31a, 31b and 31c is set as a uniform value of '3.3 mW'.

The processing in Steps S5 through S9 is repeated until light power of a main signal reaches a target value. When the processing of Step S5 is performed after the first time of the same, it is performed in a somewhat different manner from the first time, as described later.

In Step S6, the light monitoring part monitors received light power. The received light power is detected by the photodiode 43, and includes not only light power of the main signal but also a noise component.

In Step S7, an average Raman gain is calculated by the following formula (1):

$$\text{'Average Raman gain'} = A \cdot G_{31a} + B \cdot G_{31b} + C \cdot G_{31c} \quad (1)$$

There, 'A', 'B' and 'C' are average Raman gain calculation coefficients assigned for the respective pumping light sources 31a, 31b and 31c, and are constants previously obtained by means of experimentation, simulation or such. $G_{31a}$, $G_{31b}$ and $G_{31c}$ are Raman gains originating from the pumping light output from the pumping light sources 31a, 31b and 31c, respectively, and expressed by the following formulas (2), (3) and (4):

$$G_{31a} = \quad (2)$$
$$G3_{31a} \cdot (P_{31a} - \text{Loss})^3 + G2_{31a} \cdot (P_{31a} - \text{Loss})^2 + G1_{31a} \cdot (P_{31a} - \text{Loss})$$

There, '$G3_{31a}$', '$G2_{31a}$', and '$G1_{31a}$' are a cubic coefficient, a quadratic coefficient and a linear coefficient, respectively, for calculating the Raman gain originating from the pumping light emitted from the pumping light source 31a. '$P_{31a}$' is light power of the pumping light emitted from the exaction light source 31a, and is detected by the power monitoring part 34.

$$G_{31b} = \quad (3)$$
$$G3_{31b} \cdot (P_{31b} - \text{Loss})^3 + G2_{31b} \cdot (P_{31b} - \text{Loss})^2 + G1_{31b} \cdot (P_{31b} - \text{Loss})$$

Similarly, '$G3_{31b}$', '$G2_{31b}$', and '$G1_{31b}$' are a cubic coefficient, a quadratic coefficient and a linear coefficient, respectively, for calculating the Raman gain originating from the pumping light emitted from the pumping light source 31b. '$P_{31b}$' is light power of the pumping light emitted from the exaction light source 31b, and is detected by the power monitoring part 34.

$$G_{31c} = \quad (4)$$
$$G3_{31c} \cdot (P_{31c} - \text{Loss})^3 + G2_{31c} \cdot (P_{31c} - \text{Loss})^2 + G1_{31c} \cdot (P_{31c} - \text{Loss})$$

There, '$G3_{31c}$', '$G2_{31c}$', and '$G1_{31c}$' are a cubic coefficient, a quadratic coefficient and a linear coefficient, respectively, for calculating the remain gain originating from the pumping light emitted from the pumping light source 31c. '$P_{31c}$' is light power of the pumping light emitted from the exaction light source 31c, and is detected by the power monitoring part 34.

The above-mentioned coefficients '$G3_{31a}$' through '$G1_{31c}$' are previously determined by means of experimentation (or simulation) based on a type of a fiber used as the fiber connecting medium and an average fiber loss coefficient of the fiber so that optimum Raman gain characteristics may be obtained, or, accurate nose calculation may be performed. The 'type of a fiber' is identified by a manufacturer of the fiber and specification of the fiber (core diameter, effective core cross-sectional area, material, etc.). The 'average fiber loss coefficient (dB/km)' means an average loss per unit length, and, for example, is measured by means of an OTDR measuring device for the actually installed fiber connecting medium.

Figure 12:
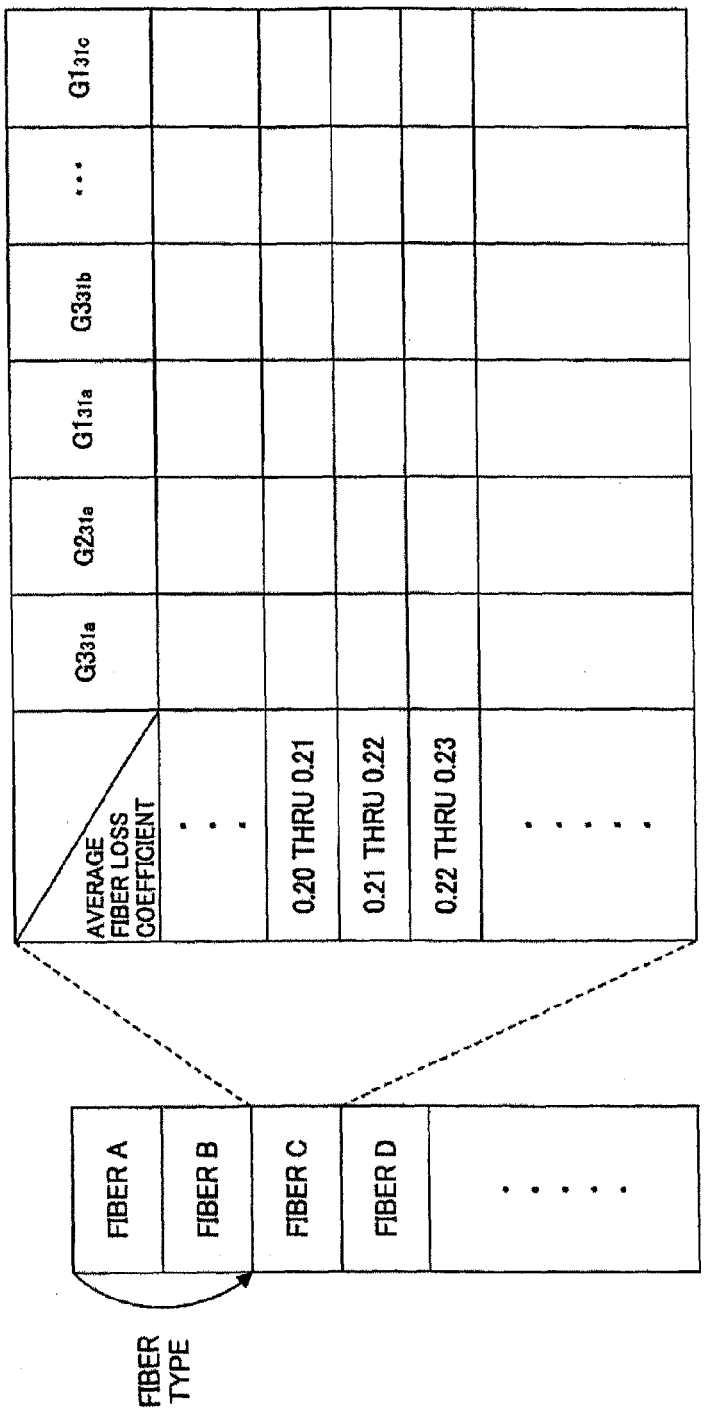
FIG. 12 shows one example of a gain coefficient table.

These coefficients '$G3_{31a}$' through '$G1_{31c}$' are stored in a gain coefficient table shown in FIG. 12. The 'type of a fiber' and the 'average fiber loss coefficient' are given to the pumping calculation part 13 from the control terminal 27. Then, these coefficients are applied to the above-mentioned formulas (2) through (4).

Instead of the 'type of a fiber' and the 'average fiber loss coefficient' in the above-mentioned example, it is also possible to determine the gain coefficients based on the 'type of a fiber', the 'average fiber loss coefficient' and the 'fiber length'. There, a total loss of the fiber connecting medium can be obtained from the 'average fiber loss coefficient' and the 'fiber length'.

Figure 13:
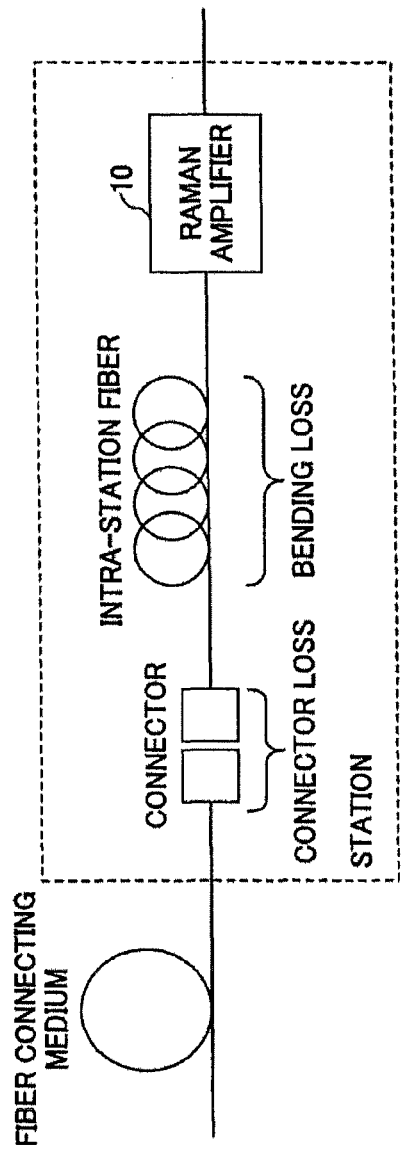
FIG. 13 illustrates an intra-station optical loss.

'Loss' in the above-mentioned formulas (2) through (4) means an optical loss inside the station building accommodating the relevant optical repeater. The optical loss inside the station building is an optical loss between an output end of the fiber connecting medium and an input end of the Raman amplifier 10 shown in FIG. 13, for example, and thus, includes a connector loss in a connector used for connecting the fiber connecting medium to the intra-station fiber and a bending loss occurring when the intra-station fiber is bent with a small curvature in installation thereof there. The optical loss inside the station building may be measured with the use of an OTDR measuring device, for example, previously.

The 'Loss' is given to the pumping power calculation part 13 from the control terminal 27, and is applied to the formulas (2) through (4).

Thus, in Step S7, the average Raman gain is calculated based on the fiber connecting medium information given from the control terminal 27. This processing is performed by the pumping power calculation part 13.

In Step S8, ASS noise is calculated by the following formula (5):

$$'ASS\text{ noise}' = ASS3 \cdot G_{31a}^3 + ASS2 \cdot G_{31a}^2 + ASS1 \cdot G_{31a} + ASS3 \cdot G_{31b}^3 + \quad (5)$$
$$ASS2 \cdot G_{31b}^3 + ASS1 \cdot G_{31b} + ASS3 \cdot G_{31c}^3 + ASS2 \cdot G_{31c}^2 + ASS1 \cdot G_{31c}$$

There, the '$G_{31a}$' through the '$G_{31c}$' are the Raman gains originating from the pumping light output from the respective pumping light sources 31a through 31c, and are calculated with the use of the above-mentioned formulas (2) through (4). 'ASS3', 'ASS2' and 'ASS3' are a cubic coefficient, a quadratic coefficient and a linear coefficient, respectively, for calculating the ASS noise, and, are previously determined by means of experimentation (or simulation) so that accurate ASS noise may be calculated. These coefficients are prepared for each particular type of the fiber connecting medium. The ASS noise calculation part 46 receives these coefficients as the fiber connecting medium information from the control terminal 27. Then, based on the 'type of a fiber' and the Raman gains originating from the respective pumping light sources 31a through 31c calculated by the pumping power calculation part 13, the ASS noise is calculated according to the above-mentioned formula (5).

In Step S9, the main signal (signal light) power component is calculated by the following formula:

'Main signal power component'='received light power'−'noise component'='received light power'−'ASE noise'−'ASS noise'

The 'received light power' is detected by the photodetector 43. The 'ASE noise' is notified of by the optical repeater in the upstream station. The 'ASS noise' is calculated by the ASS noise calculation part 46. As a result, the light power only of the signal light without including the nose components is calculated. For example, it is assumed that the received light power is '−24 dBm', while each of the ASE noise and the ASS noise is '−30 dBm'. In this assumption, since the sum total of the noise components is '−27 dBm', the main signal power is '−27 dBm'.

In Step S10, it is determined whether or not the thus-obtained main signal power reaches a target value. The target value means an optimum input power for the EDFA 21, and is previously held in the target value holding part 51 in the pumping power calculation part 13. When the main signal power has reached the target value, a notice that startup processing has been completed is given to the optical repeater in the downstream station in Step S11. On the other hand, when the main signal power has not reached the target value yet, the processing is returned to Step S5.

In Step S5, the pumping power in the pumping light sources 31a through 31c is determined as described above. However, in Step S5, the following processing is performed when it is executed after the first time of the same.

That is, first, the pumping power in the pumping light sources 31a through 31c is increased by a predetermined amount, and the average Raman gain is calculated according to the above-mentioned formula (1). Then, with reference to the pumping ratio table, the ratios in the pumping power for driving the respective pumping light sources 31a through 31c are obtained. In the pumping ratio table, as shown in FIG. 14, information indicating the optimum pumping power ratios determined for the average Raman gain is registered for each fiber type. These ratios are determined by means of experimentation (or simulation) or such so that a flat Raman gain may be obtained.

For example, it is assumed that 'fiber A' is used as the fiber connecting medium, the pumping power is '100 mW', and the average Raman gain is '2 dB'. In this assumption, the pumping power ratios among the pumping light sources 31a through 31c are '1:0.9:1' according to the pumping ratio table shown in FIG. 14. Accordingly, the pumping power in the pumping light sources 31a through 31c is determined as '34.5 mW', '31.0 mW' and '34.5 mW'.

Thus, in the Raman amplifier according to the first embodiment of the present invention, the pumping power is gradually increased until the input power to the EDFA 21 reaches the target value. In each stage thereof, the main signal power is calculated from subtracting the ASE noise and ASS noise from the received light power. There, in order to obtain a flat Raman gain, and in order to accurately detect the light power of the signal light itself, it is necessary to properly detect the average Raman gain and the ASS noise in the fiber connecting medium.

For this purpose, in the Raman amplifier according to the first embodiment, as the parameters applied in calculating the average Raman gain and the ASS noise, 'fiber type', 'average fiber loss coefficient' (and 'fiber length'), and 'intra-station loss' are used. 'Average fiber loss coefficient' largely depends on the number of splicing points existing in the fiber connecting medium, a loss at each splicing point, the number of connectors used there, a loss at each connector, and so forth. 'Intra-station loss' depends on each particular optical data transmission system, according to losses at connectors connecting between the fiber connecting medium and the intra-station fiber, bending loss in the intra-station fiber and so forth. Accordingly, when calculating the ASS noise, it is important to consider these parameters. In other words, by accurately detecting these parameters in the actual optical data transmission system and calculating the ASS noise or so with the use thereof, it is possible to obtain a flat Raman gain and to accurately detect the light power of the signal light itself.

A second embodiment of the present invention is described next.

Figure 15:
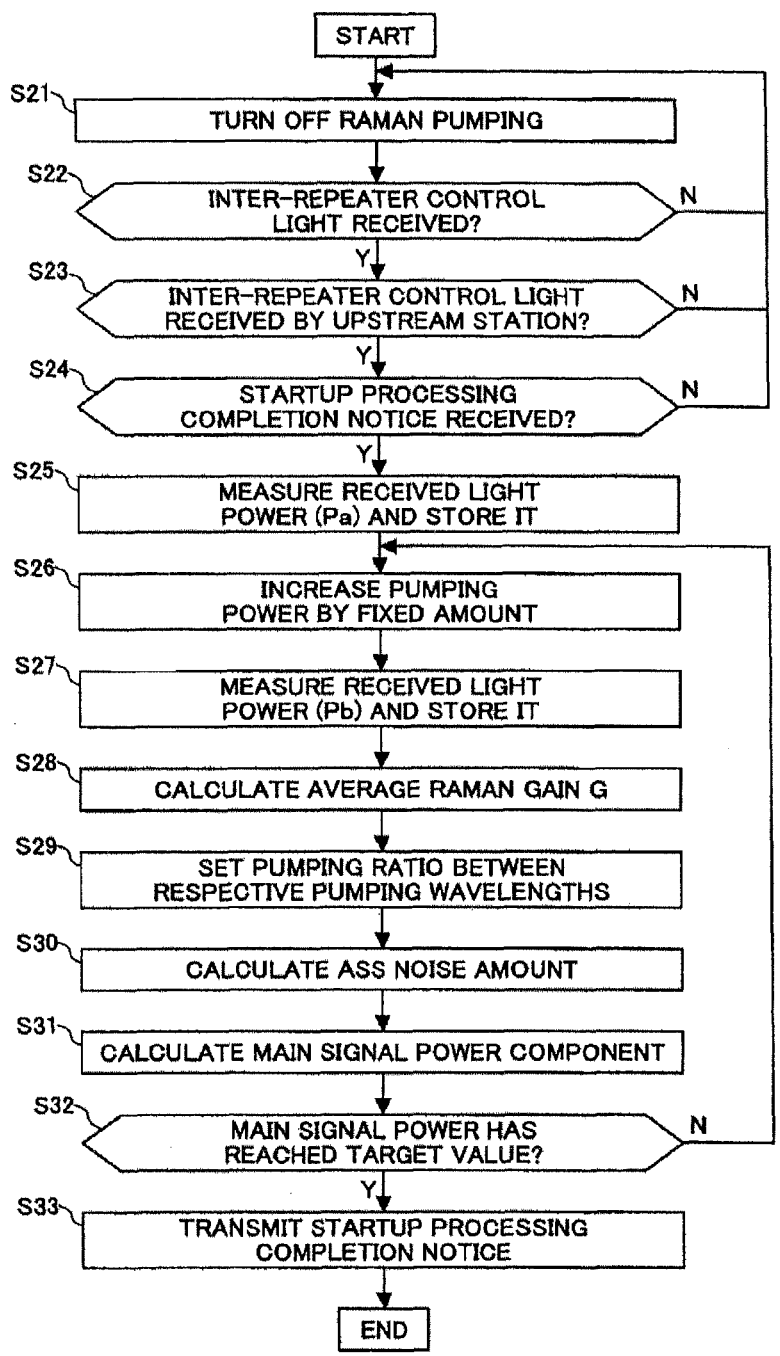
FIG. 15 shows a flow chart of processing for starting up a Raman amplifier according to a second embodiment of the present invention.

FIG. 15 shows a flow chart of startup processing in a Raman amplifier according to the second embodiment of the present invention. The processing according to this flow chart is performed at a time of establishing an optical data transmission system or restoration of the same. Other than the operation according to the flow chart, the second embodiment is same as the first embodiment described above, and duplicated description thereof is omitted.

Steps S21 through S24 are same as Steps S1 through S4 in the first embodiment described above with reference to FIG. 11. That is, during the processing, it is determined whether or not an optical repeater in an upstream station operates properly.

In Step S25, received light power (Pa) is detected in a condition in which the pumping light is stopped. At this time, output of the photodiode 43 is stored in the pumping power calculation part 13.

Step S26 is same as Step S6 in the first embodiment described above with reference to FIG. 11. That is, in this processing, the pumping power is increased by a predetermined amount. Processing in Steps S26 through S32 is repeated until input power to the EDFA 21 reaches a target value. Accordingly, since Step S26 is thus executed repeatedly, the light power in the pumping light increases gradually. Ratios in the pumping power among the pumping light sources 31a through 31c are '1:1:1' when Step S26 is executed first. On the other hand, when Step S26 is executed after the first time, ratios in the pumping power among the pumping light sources 31a through 31c applied are those which are determined in Step S29 in the previous processing stage.

In Step S27, received light power (Pb) is detected in a condition in which the pumping light determined in Step S26 is supplied to the fiber connecting medium. At this time, output of the photodetector 43 is stored by the pumping power calculation part 13.

In Step S28, an average Raman gain is calculated. Specifically, the average Raman gain is obtained from subtracting the received light power (Pa) detected in Step S25 from the received light power (Pb) detected in Step S27. Thus, in Step S28, the average Raman gain is directly obtained. For example, in a case where the received light power Pa is '−27 dBm' while the received light power Pb is '−26.9 dBm', 'average Raman gain=0.1 dB' is obtained.

In Step S29, ratios in the pumping power among the pumping light sources 31a through 31c are determined based on the average Raman gain obtained in Step S28. Then, the fiber type of the fiber connecting medium and the average Raman gain are used as search keys, the pumping ratio table shown in FIG. 14 is searched, and thus, relevant ratios in the pumping power are obtained. The thus-obtained ratios are used when Step S26 is newly performed after determination of 'No' is obtained in Step S32.

In Step S30, ASS noise is calculated. According to the second embodiment, the ASS noise is calculated by the following formula:

$$\text{`ASS noise'} = ASS3 \cdot G^3 + ASS2 \cdot G^2 + ASS1 \cdot G$$

There, 'G' is the average Raman gain obtained in Step S28. 'ASS3', 'ASS2' and 'ASS1' are a cubic coefficient, a quadratic coefficient and a linear coefficient for calculating the ASS noise, respectively, and are previously determined by means of experimentation (or simulation) or such, so that the ASS noise may be accurately calculated. These coefficients are prepared for each fiber type of the fiber concerting medium.

In Step S31, the same as in Step S9 in the first embodiment, the main signal power component is calculated by the following formula:

'Main signal power component'='received light power'−'ASE noise'−'ASS noise'

'Received light power' is detected in Step S27. 'ASE noise' is notified of from an optical repeater in an upstream station. 'ASS noise' is obtained in Step S30.

Steps S32 and S33 are same as Step S10 and S11 in the first embodiment. That is, Step S26 is returned to when the thus-obtained main signal power has not reached the target value yet, while, startup processing completion notice is sent to an optical repeater in a downstream station when the main signal power has reached the target value.

Thus, in the Raman amplifier according to the second embodiment, the average Raman gain is directly measured. Thereby, the ASS noise amount calculated based on the average Raman gain is accurate. Furthermore, light power in the signal light itself is obtained from subtracting the noise components from the received light power. Accordingly, the light power in the signal light itself can also be accurately obtained when the ASS noise amount can be accurately obtained.

Figure 16B:
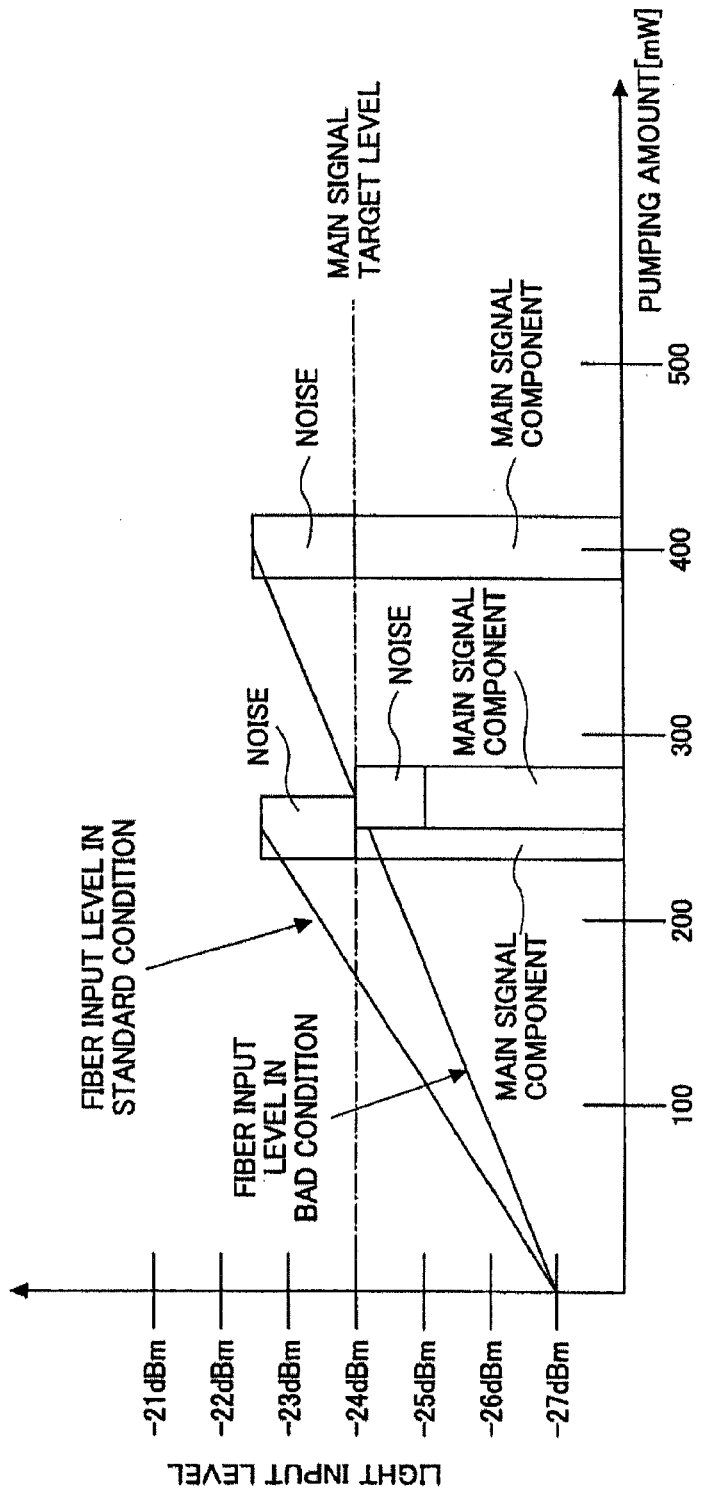

FIGS. 16A and 16B illustrate an effect of the above-described second embodiment. FIG. 16A shows characteristics in a Raman amplifier according to the relate art, while FIG. 16B shows characteristics in the Raman amplifier according to the second embodiment of the present invention. The Raman amplifier according to the related art is the Raman amplifier in the above-mentioned first embodiment in which, however, the 'average gain coefficient' and the 'intra-station loss' are not considered as parameters concerning the fiber connecting medium applied. Further, the following conditions are assumed for illustration purpose:

Received light power when the pumping light is stopped (input level to the EDFA 21): −27 dBm;

Target value for the main signal power: −24 dBm;

Standard value of fiber loss coefficient: 0.23 dBm/km (@1550 nm);

Standard value of fiber effective cross-sectional area: 85 $\mu m^2/nm$ (@1550 nm).

Assuming that actual optical characteristics of the fiber connecting medium coincide with the standard values, an ASS noise value obtained based on calculation formulas previously prepared are approximately accurate values. Accordingly, in this assumption, light power of signal light itself obtained from subtracting the noise components from the received light power can also be accurately detected. In the examples shown in FIGS. 16A and 16B, in a condition where the pumping power is 250 mW, the light power (main signal power) in the signal light has reached the target value as shown.

However, actually, fabrication variation may occur in optical characteristics of the fiber connecting medium. Further, the optical characteristics depend on the number of splicing points, a loss at each splicing point, the number of connectors, a loss at each connector, and so forth, as mentioned above. In other words, the optical characteristics of the fiber connecting medium depend on a particular optical data transmission system. On the other hand, the ASS noise depends on the Raman gain, which depends on the optical characteristics of the fiber connecting medium. Accordingly, it is not possible to accurately obtain the ASS noise unless the actual Raman gain of the fiber connecting medium applied is properly considered.

According to the Raman amplifier in the second embodiment of the present invention, the average Raman gain in the fiber connecting medium is actually measured, and, based thereon, the ASS noise amount is accurately obtained. As a result, it is possible to accurately detect the light power of the signal light (main signal component). In the example shown in FIG. 16B, in a case where the conditions in the fiber connecting medium are bad, the light power in the signal light reaches the target value when the pumping power is increased to 400 mW.

On the other hand, in the Raman amplifier in the related art, since an actual Raman gain in the fiber connecting medium is not considered and the ASS noise or such is calculated with the use of the standard values of the optical characteristics for the fiber connecting medium, it may not be possible to accurately obtain the ASS nose amount when the optical characteristics in the fiber connecting medium differ from the standard ones. As a result, light power in the signal light may not be detected accurately. In the example shown in FIG. 16A, in a case where the optical characteristics in the fiber connecting medium are bad, apparently, the light power in the signal light reaches the target value when the pumping power is increased to 500 mW.

Thus, in the Raman amplifier in the related art, the ASS noise may not be detected accurately when the characteristics in the fiber connecting medium change. Accordingly, in comparison to the Raman amplifier according to the present invention, power in the pumping light may be increased unnecessarily.

A third embodiment of the present invention is described next.

A Raman amplifier according to the third embodiment of the present invention previously measures the ASS noise in a condition in which no signal light is received from an upstream station, and, after that, pumping power is adjusted based on the thus-measured noise value.

Figure 17:
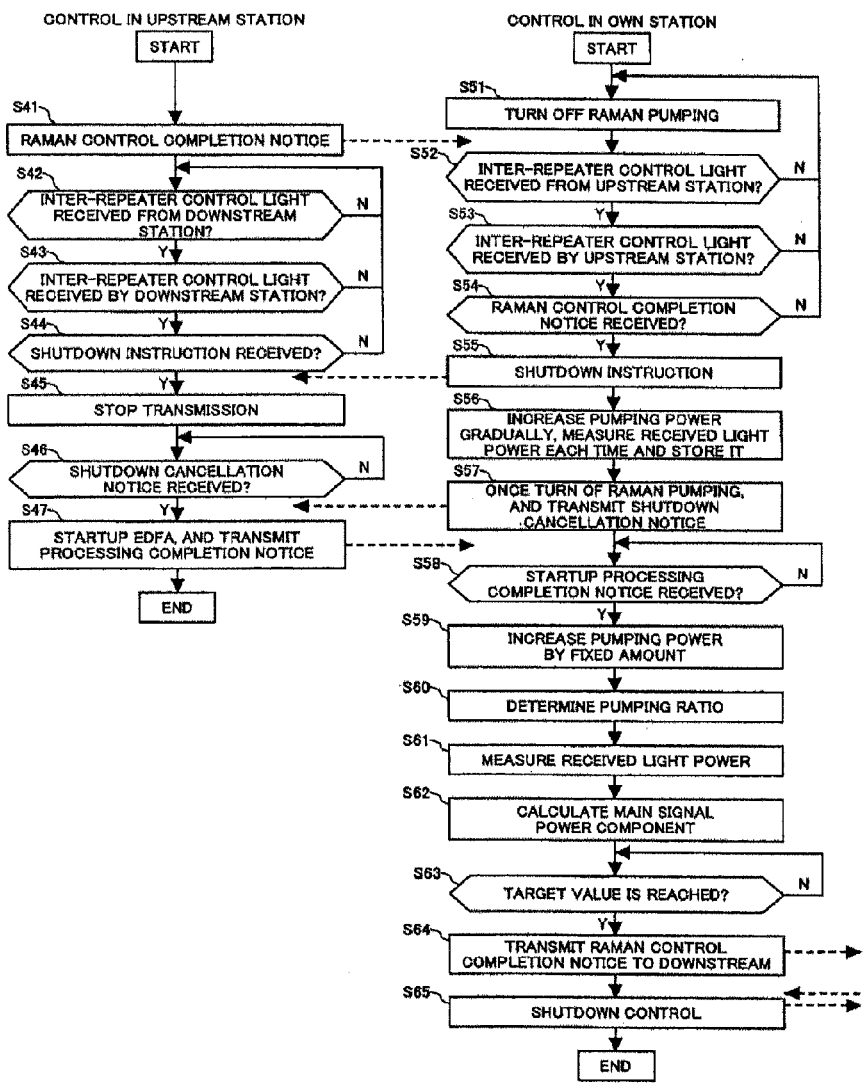
FIG. 17 shows a flow chart of processing of starting up of a Raman amplifier according to a third embodiment of the present invention.

FIG. 17 shows a flow chart of startup processing in the Raman amplifier according to the third embodiment. Other than the processing shown in this flow chart, the third embodiment is same as the first embodiment described above. The processing of this flow chart is performed at a time of establishing the optical data transmission system or at a time of restoration of the same. In the flow chart, Steps S41 through S47 are executed by the optical repeater in the upstream station while Steps S51 through S65 are performed by the relevant optical repeater.

After the completion of setting of a Raman amplifier, the optical repeater in the upstream station notifies the optical repeater (relevant optical repeater) in the downstream station of this matter in Step S41. Subsequently, in Steps S42 through S44, the optical repeater in the upstream station waits for instructions of shutdown from the optical repeater in the downstream station. When receiving the instructions of shutdown, the optical repeater in the upstream station stops transmission of signal light in Step S45. At this time, it is not necessary to stop transmission of inter-repeater control light. In Step S46, the optical repeater in the upstream station waits for instructions of cancellation of the shutdown in Step S47. Then, when receiving the instructions of cancellation of the shutdown, the optical repeater in the upstream station again starts transmission of signal light, and returns startup processing completion notice.

Steps S51 through S54 are basically same as Steps S1 through S4 in the first embodiment described above with reference to FIG. 11. That is, it is determined whether or not the optical repeater in the upstream station operates properly.

In Step S55, the relevant optical repeater (on the downstream side) sends the instructions of shutdown to the optical repeater in the upstream station for requesting it to stop transmission of signal light. The optical repeater in the upstream station stops transmission of signal light when receiving the instructions in Step S45 as mentioned above.

In Step S56, the relevant optical repeater (on the downstream side) gradually increases the pumping power up to a maximum pumping output (for example, 500 mW), 10 mW by 10 mW, while it measures received light power at each time in sequence. At this time, pumping ratios between the pumping light sources 31a through 31c are '1:1:1'.

At this time, the optical repeater in the upstream station has stopped transmission of signal light. In a case where inter-repeater control light is transmitted, the control light is sufficiently attenuated by means of the signal band pass filter 42. Accordingly, it is possible to regard the received light power detected in Step S56 as the ASS noise amount generated depending on the light power of the pumping light supplied. The received light power (i.e., the ASS noise amount) is detected by means of the photodiode 43, and is stored in a pumping light/ASS noise table shown in FIG. 18A.

In Steps S57 through S58, the pumping light is once stopped, and the instructions of cancellation of the shutdown are sent to the optical repeater in the upstream station for requesting it to again start transmission of signal light. Receiving the instructions, the optical repeater in the upstream station again starts transmission of signal light in Step S47 as mentioned above, and returns the startup processing completion notice. When receiving this notice from the optical repeater in the upstream station, the relevant optical repeater executes processing starting from Step S59.

In Steps S59 through S69, the relevant optical repeater gradually increases input power to the EDFA 21, 10 mW by 10 mW, until it reaches a target value. At this time, based on the ASS noise amount measured in Step S56 and an average Raman gain derivation table shown in FIG. 18B, pumping ratios among the pumping light sources 31a through 31c are determined in Step S60. The average Raman gain derivation table is produced previously based on experimentation (or simulation) or such. As well known in the art, the ASS noise amount is approximately in proportion to the Raman gain.

An example thereof is described next. In the example, it is assumed that the fiber connecting medium is of 'fiber type A' shown in FIG. 18B. In this case in the example shown in FIG. 18A, the ASS noise amount is '−35.3 dBm' when the pumping power is '10 mW' as shown. Then, according to the average Raman gain derivation table shown in FIG. 18B, '1.5 dB' is obtained therefrom as the average Raman gain when the pumping power is '10 mW'.

In Steps S61 through S62, received light power is measured, and, signal light power is obtained from subtracting an ASE noise amount and an ASS noise amount from the thus-obtained received light power value. At this time, the ASE noise amount is notified of by the optical repeater in the upstream station. The ASS noise amount is measured in Step S56.

Then, after the input light power to the EDFA 21 reaches the target value, the relevant optical repeater sends Raman control completion notice indicating that adjustment of the pumping light for Raman amplification has been completed, to an optical repeater at a terminal station or at a downstream station in Step S64. Then, when the apparatus (the optical repeater or the terminal station) in the downstream station performs Raman amplification, the relevant optical repeater (upstream thereof) performs processing same as that in Steps S41 through S47 for the apparatus at the downstream station or the terminal station.

Thus, according to the Raman amplifier in the third embodiment of the present invention, the ASS noise is not calculated from parameters, but is actually measured. Accordingly, the ASS noise includes no error substantially. As a result, even when the optical characteristics in the fiber connecting medium include variation, it is possible to accurately obtain the ASS noise amount, and thus, it is possible to effectively reduce various errors. Specifically, it is possible to accurately detect light power of signal light.

A fourth embodiment of the present invention is described next.

A Raman amplifier according to the fourth embodiment has a function of correcting a value calculated in the ASS noise calculation part for the purpose of improving detection accuracy in the ASS noise amount. By improving the detection accuracy in the ASS noise amount, it is possible to accurately control light power in signal light as described above, and also, to improve detection accuracy for detecting an occasion of 'input interruption'.

Figure 19:
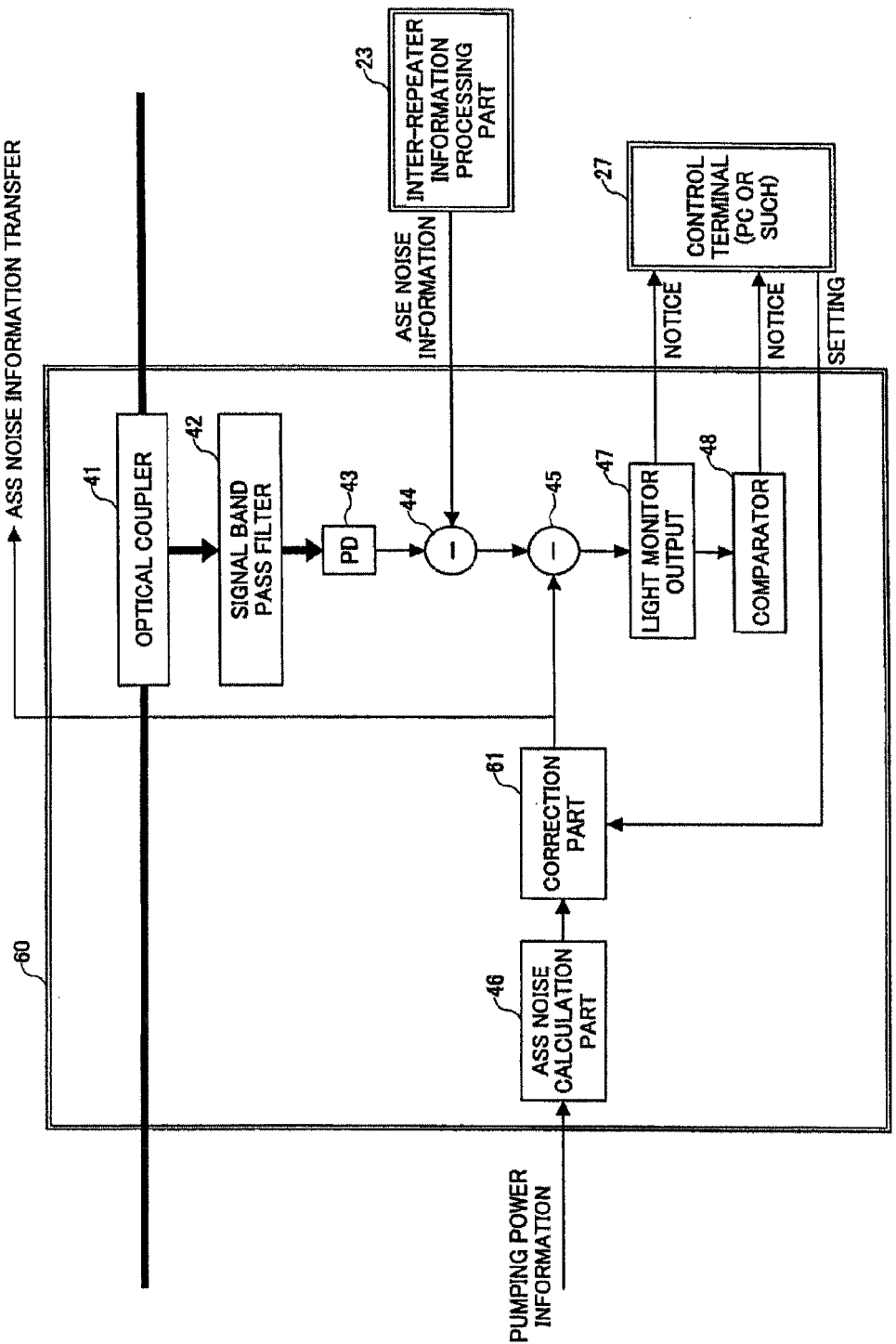
FIG. 19 shows a light monitoring part in a Raman amplifier according to a fourth embodiment of the present invention.

FIG. 19 shows a configuration of a light monitoring part in the Raman amplifier according to the fourth embodiment. There, a pumping part 11, a pumping power calculation part 13, a startup arbitration processing part 14 and an inter-repeater information processing part 23 are same as those described above with reference to FIG. 8.

The light monitoring part 60 in the Raman amplifier according to the fourth embodiment is configured as a result of adding a correction part 61 to the light monitoring part 12 described above with reference to FIG. 8. Other then this configuration and function thereof, the fourth embodiment is same as the first embodiment described above. The correction part 61 corrects the ASS noise amount once calculated by the ASS noise calculation part 46 with the use of a correction value given by the control terminal 27. Specifically, a correction value given from the control terminal 27 is used to multiply the ASS noise amount calculated by the ASS noise calculation part 46. The subtractor 45 subtracts, from output of the subtractor 44, the ASS noise amount thus corrected by the correction part 61.

Figure 20A:
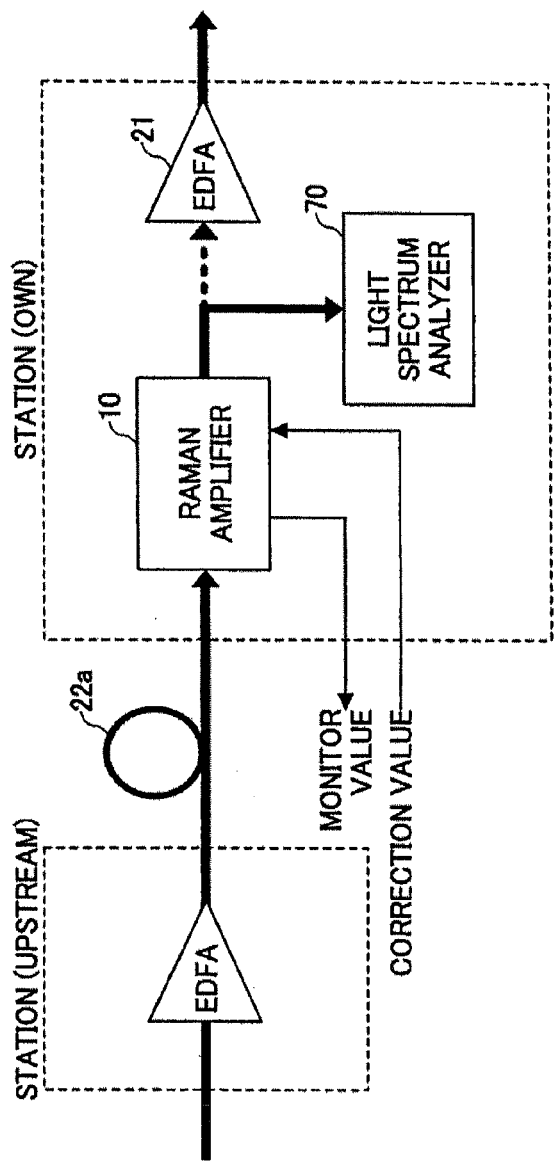
FIGS. 20A and 20B illustrate a process of calculating and setting a correction value.
Figure 20B:
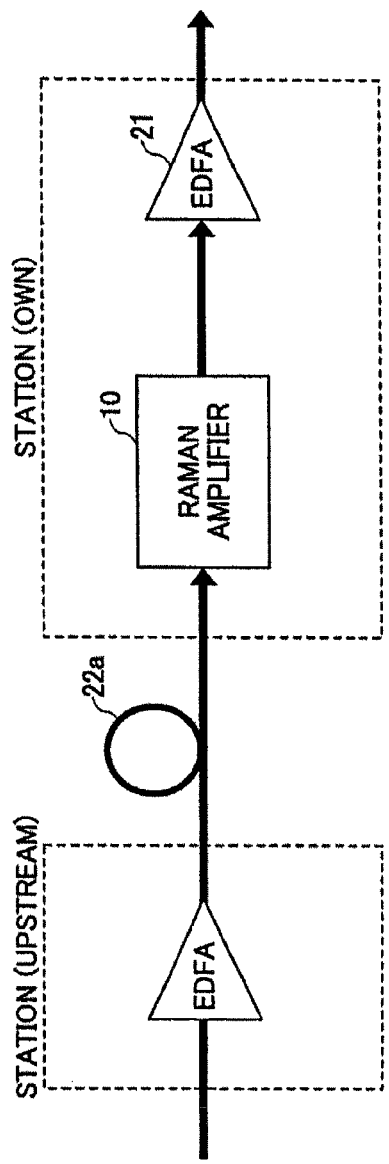

FIGS. 20A and 20B illustrate a procedure of calculating the above-mentioned correction value and setting the same. There, it is assumed that an optical repeater in an upstream station sends out multiple-wavelength light.

In a first step, a signal light monitor value Pa is detected, and is held. The signal light monitor value Pa is obtained from subtracting an ASS noise amount and an ASE noise amount Pass from a received light power value. The received light power value is obtained by means of the photodiode 43. The ASE noise amount is notified of from the upstream station. As the ASS noise amount Pass, a value calculated by the ASS noise calculation part 46 is used as it is, at this time.

In a second step, connection by means of an optical fiber between the Raman amplifier 10 and the EDFA 21 is changed so that the Raman amplifier 10 is connected to and thus, output light from the Raman amplifier 10 is led to a light spectrum analyzer 70, as shown in FIG. 20A.

In a third step, with the use of the light spectrum analyzer 70, peak power of each of all the signal light amplified by the Raman amplifier 10 is directly measured, and, total power Pb which is a total sum of the respective ones of the thus-measured peak power values is obtained.

In a fourth step, the correction value is calculated according to the following formula, and is set in the correction part 61:

'Correction value'=(Pass+(Pb−Pa))/Pass

In a fifth step, connection is made between the Raman amplifier 10 and the EDFA 21 by means of the optical fiber so that output light from the Raman amplifier 10 is led to the EDFA 21, as shown in FIG. 20B (original state).

Through the first through fifth steps described above, the correction value is set in the correction part 61. Calculation of the correction value may be either performed by the Raman amplifier 10 or by the control terminal 27. Then, after that, the correction part 61 performs correction such as to multiply the ASS noise amount calculated by the ASS noise calculation part 46 with this correction value.

By multiplying the ASS noise amount calculated by the ASS noise calculation part 46 with the above-mentioned correction value, 'Pass+(Pb−Pa)' is obtained as a result. In other words, a detection error in the photodiode 43 is corrected with the use of the detection value with the use of the light spectrum analyzer 70.

The ASS noise hardly changes even when the number of wavelengths multiplexed is changed as long as the conditions in the fiber connecting medium do not change. Accordingly, when once the above-mentioned correction value is set at a time of establishing the optical data transmission system, this correction value should not be changed basically even when a new wavelength is added to be multiplexed in future.

Thus, according to the Raman amplifier in the fourth embodiment, as a result of light power of signal light being directly detected with the use of the light spectrum analyzer, error in the light detection system in the Raman amplifier can be estimated. Then, the correction value for correcting the thus-estimated error is set at a time of startup of the Raman amplifier. Thereby, it is possible to accurately obtain the ASS noise amount, and thus to accurately detect light power in signal light.

A fifth embodiment of the present invention is described next.

A Raman amplifier according to the fifth embodiment of the present invention is assumed to be applied to an optical data transmission system in which special light (referred to as 'probe light', hereinafter) is transmitted other than signal light assigned as a main signal, and 'input interruption' detection is performed with the use of the probe light in the Raman amplifier.

Figure 21:
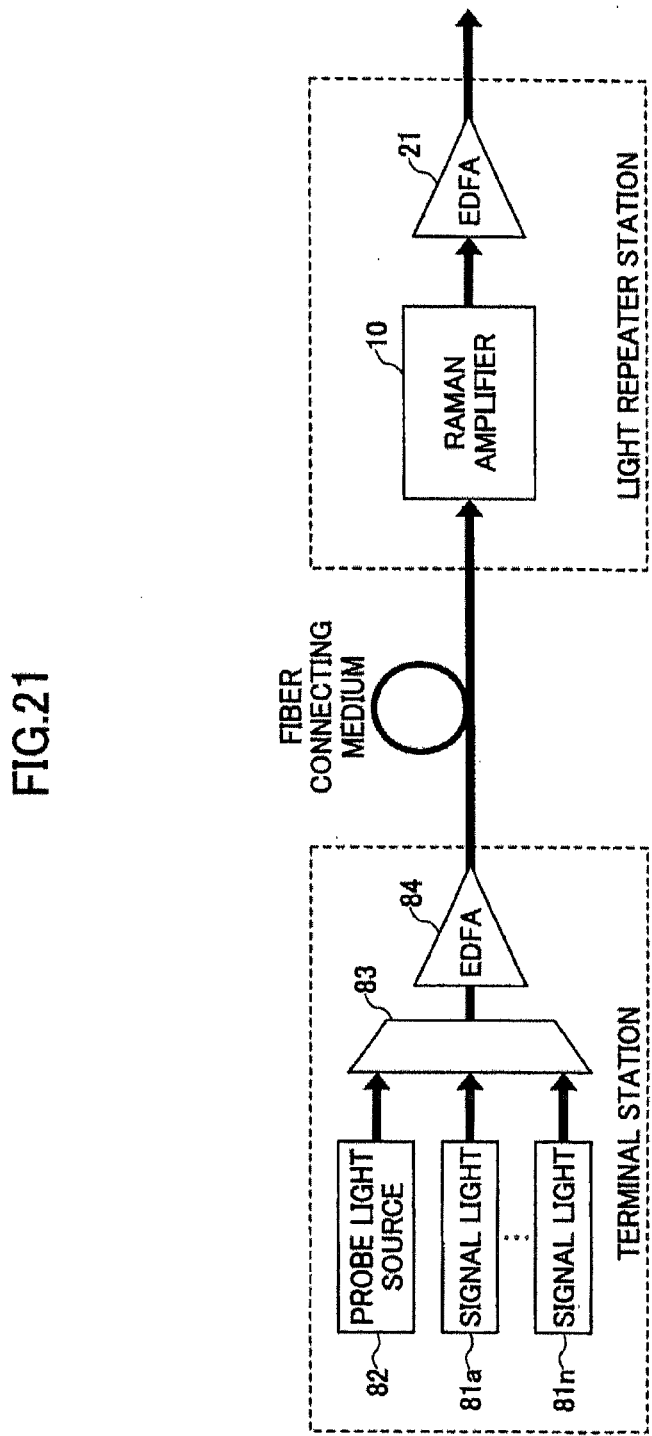
FIG. 21 shows a system configuration to which a fifth embodiment of the present invention is applied.
Figure 22:
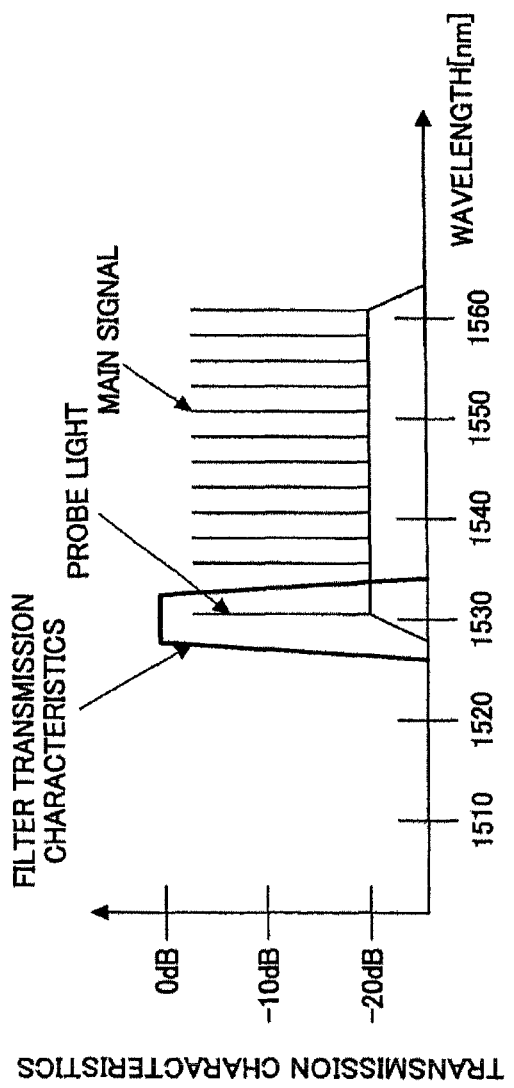
FIG. 22 shows an arrangement of signal light and probe light.

FIG. 21 shows a system configuration in which the fifth embodiment is applied. A terminal station at a transmission end includes signal light sources 81a through 81n generating a plurality of sorts of signal light and a probe light source 82 generating probe light. The sorts of signal light generated by the signal light sources 81a through 81n have mutually different wavelengths. A wavelength of the probe light is different from any of these sorts of signal light as shown in FIG. 22. The probe light may be disposed within a gain range of an EDFA 21 or may be disposed out of the gain range of the EDFA 21.

FIG. 23 shows a configuration of a light monitor in the Raman amplifier according to the fifth embodiment. There, a pumping part 11, a pumping power calculation part 13, a startup arbitration processing part 14 and an inter-repeater information processing part 23 are same as those described above with reference to FIG. 8.

Multiple-wavelength light amplified by a fiber connecting medium input is caused to branch off by means of an optical coupler 41, and is led to a probe light separation filter 91. There, the multiple-wavelength light includes the signal light and the probe light as described above.

Figure 24A:
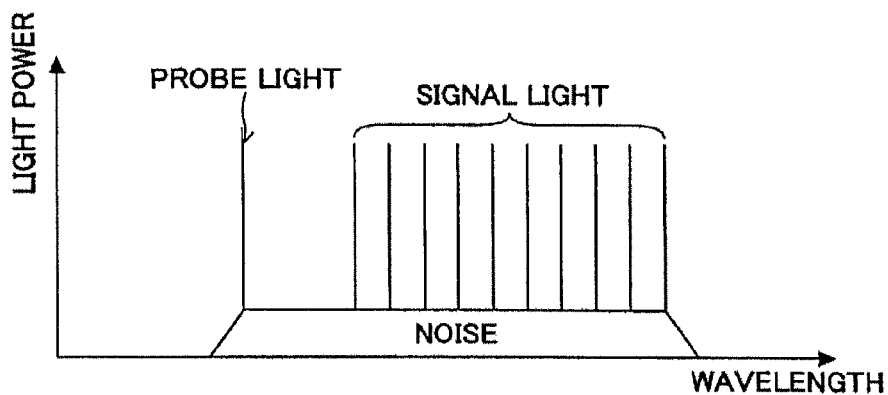
FIGS. 24A, 24B and 24C show characteristics of probe light separating filter.

The probe light separation filter 91 includes a filter which selectively transmits the wavelength component of the probe light, as shown in FIG. 22. When multiple-wavelength light such as that shown in FIG. 24A is input to the probe light separation filter 91, the probe light separation filter 91 thus leads the wavelength component including the probe light (see FIG. 24B) to a photodiode 92, and at the same time, leads the other wavelength components (see FIG. 24C) to a signal band pass filter 42.

The photodiode 92 detects light power in the wavelength led from the probe light separation filter 91. At this time, this wavelength component includes not only the probe light but also a noise component. Therefore, in order to detect light power of the probe light itself, it is necessary to subtract the noise component from the output of the photodiode 92.

Figure 24B:
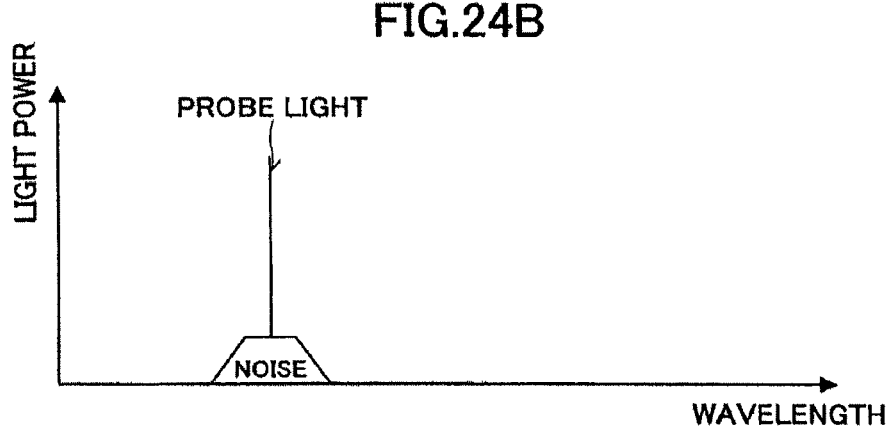
Figure 24C:
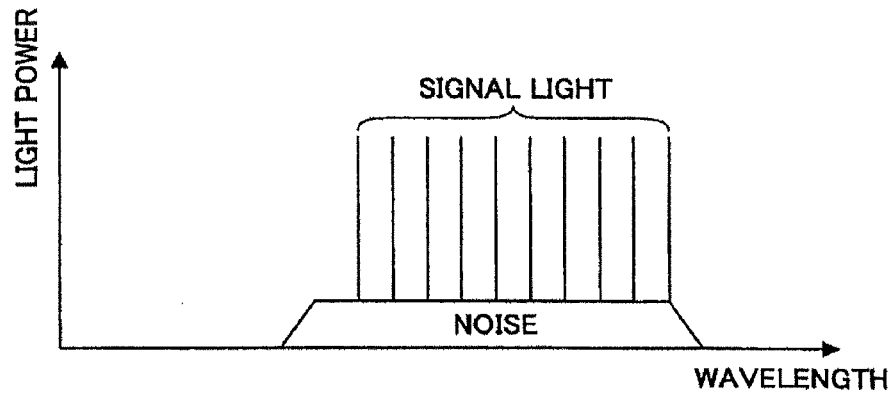

A multiplier 93 multiplies an ASE noise value by a predetermined filter coefficient, and thereby obtains an ASE noise component of a noise component shown in FIG. 24B. This ASE noise component is obtained as a result of being notified of from an upstream station. The above-mentioned filter coefficient is a value expressing an 'ASE noise amount led to the photodiode 92 after passing through the probe light separation filter 91' with respect to 'the entire ASE noise amount', and is determined, for example, from a ratio between 'the width of the band passed by the signal band pass filter 42' and 'the width of the band passed by the probe light separation filter 91'. A subtractor 94 subtracts the output of the multiplier 93 from the output of the photodiode 92.

On the other hand, a multiplier 95 multiplies an ASS noise value by a predetermined filter coefficient, and thus, to obtain an ASS noise component of the noise component shown in FIG. 24B. The ASS noise value is calculated by means of an ASS noise calculation part 46. The filter coefficient is a value expressing an 'ASS noise amount led to the photodiode 92 after passing through the probe light separation filter 91' with respect to 'the entire ASS noise amount', and is determined, for example, from a ratio between 'the width of the band passed by the signal band pass filter 42' and 'the width of the band passed by the probe light separation filter 91'. A subtractor 96 subtracts the output of the multiplier 95 from the output of the subtractor 94.

As a result, the output of the subtractor 96 thus obtained is one obtained from removing the ASE noise and the ASS noise from the light components shown in FIG. 24B. In other words, the light power of the probe light itself can be thus detected.

A comparator 97 compares the output of the subtractor 96 with a predetermined threshold value, and notifies a control terminal 27 of a result of the comparison. The predetermined threshold value is a value for determining whether or not input to the relevant optical repeater is in an input interruption state.

The signal band pass filter 42, the photodiode 93, the subtractor 44 and 45 and the light monitor output 47 are same as those described above with reference to FIG. 8, detect signal power in the signal light, and notifies the control terminal 27 thereof.

Figure 25A:
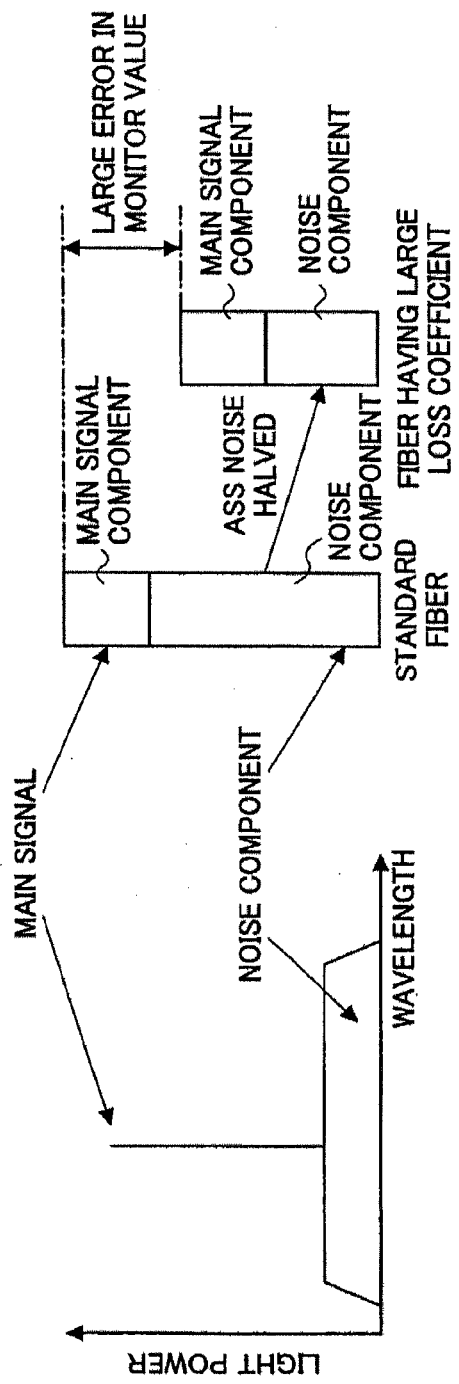

FIGS. 25A and 25B illustrate an effect of the fifth embodiment described above. FIG. 25A illustrates the related art in which input interruption is detected with the use of signal light. On the other hand, FIG. 25B illustrates the fifth embodiment of the present invention in which the probe light provided separately from the signal light is used for detecting input interruption. The effect of the present embodiment becomes remarkable especially in a case where the number of wavelengths multiplexed is relatively small. Thus, for the purpose of achieving clear explanation of the effect of the present embodiment, a case where the number of wavelengths of signal light is 1 is assumed for explanation purpose.

According to the related art (see FIG. 25A), for detecting input interruption with the use of signal light, a value (referred to as a monitor value, hereinafter) obtained from subtracting a noise component from a received light power value is compared with a predetermined value. As described above, ASS noise in a noise component varies depending on optical characteristics in a fiber connecting medium. However, as shown in FIG. 25A, in a case where the number of wavelengths of the signal light is small, a ratio of the signal light power with respect to the entire light power is small while the ratio of the noise component is large accordingly. Thereby, when the optical characteristics in the fiber connecting medium changes, error in the monitor value increases accordingly. As a result, there occurs a possibility that input interruption cannot be properly detected.

On the other hand, according to the fifth embodiment of the present invention, input interruption is detected with the use of probe light. There, a value (referred to as a monitor value) obtained from subtracting a noise component from a wavelength component separated by means of the probe light separation filter 91 is compared with a threshold value. There, with respect to a signal band in which signal light is disposed, a band passed by the probe light separation filter is small sufficiently. For example, while the band in which signal light is allocated is '30 through 40 nm', the band passed by the probe light separation filter 91 is on the order of '1 nm'.

Therefore, while light power of the probe light shown in FIG. 25B is approximately same as light power in the signal light shown in FIG. 25A, a noise component shown in FIG. 25B is $1/30$ through $1/40$ times a noise component shown in FIG. 25A. In other words, according to the present embodiment, as shown in FIG. 25B, the ratio of the light power of the probe light with respect to the entire power input to the photodiode 92 is relatively large, and the ratio of the noise component is relatively small. Thereby, even when the optical characteristics in the fiber connecting medium change, error in the monitor value is relatively small. In other words, it is possible to properly detect input interruption by applying the above-described scheme with the use of the probe light according to the fifth embodiment of the present invention.

CH1, which is a channel having the shortest wavelength in a system in which 80 channels can be allocated in a transmission band, is used as the probe light, for example. In this case, the other 79 channels can be used as channels as the signal light. However, in a case where the width of the band passed by the probe light separation filter 91 is wider than the channel wavelength interval, the signal light is allocated only to CH3 through CH80 while CH2 is not used.

Further, in the above-described example, the probe light prepared separately from the signal light is used for detecting input interruption. However, the present invention is not limited to such a configuration. That is, it is also possible to detect input interruption with the use of a sort of signal light having any one wavelength selected from among the plurality of sorts of signal light having mutually different wavelengths.

A sixth embodiment of the present invention is described next.

Figure 29:
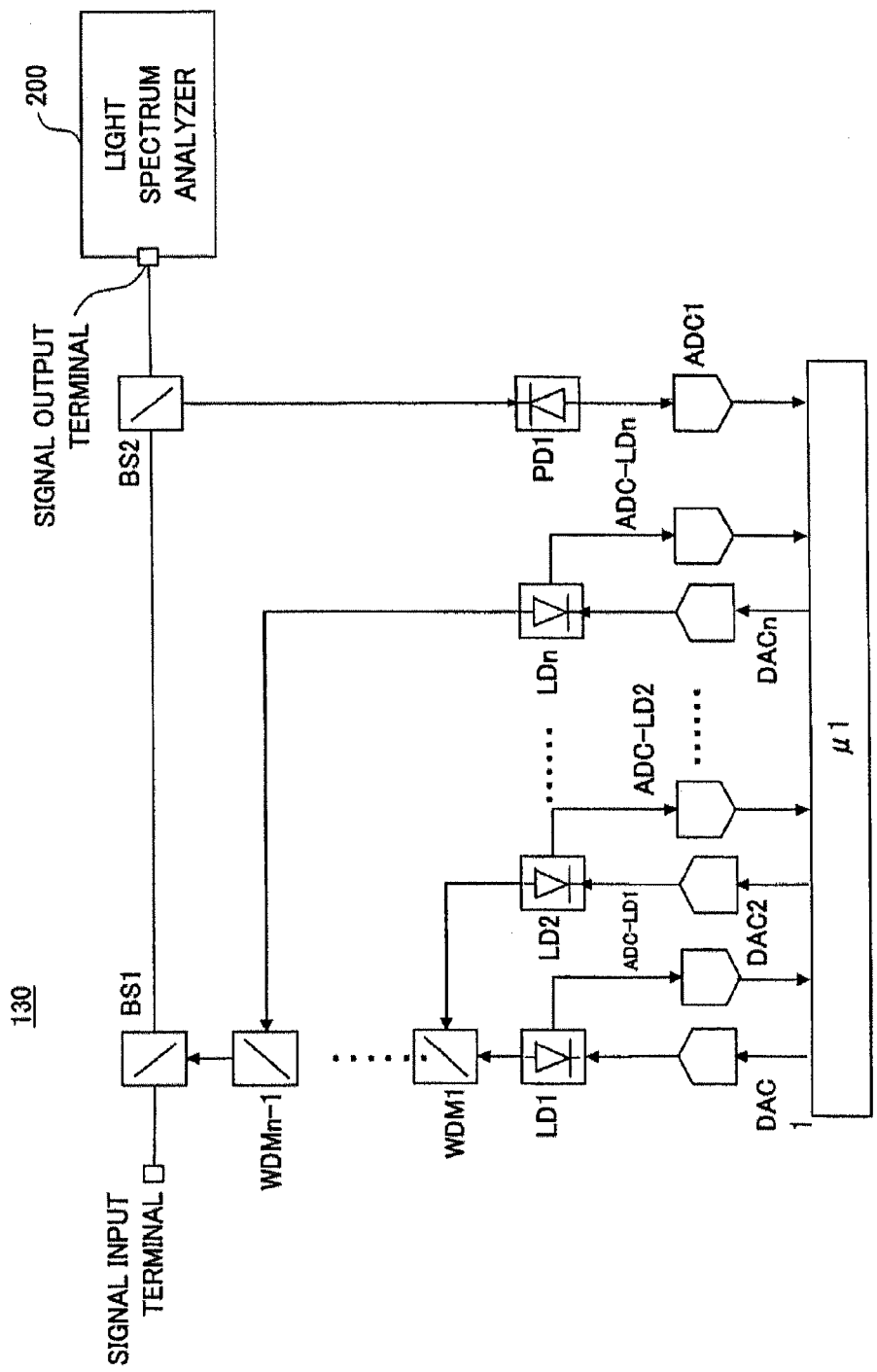
FIG. 29 shows a block diagram of a Raman amplifier according to a sixth embodiment.

FIG. 29 shows an internal configuration of a Raman amplifier embodying an ASS estimation amount correcting method (corresponding to a Raman amplifier adjustment method) according to the sixth embodiment of the present invention. This amplifier includes pumping light sources LD1, LD2, LD3, LDn (n≥1) having one or a plurality of lasing wavelength bands. Light emitted by these pumping light sources is multiplexed by means of optical multiplexers WDM1, WDM2, WDM3, WDMn−1 also provided in the amplifier, and, pumping light thus obtained is supplied to a fiber connecting medium (corresponding to a fiber connecting medium 120 connected to the Raman amplifier 130 shown in FIG. 38) via an optical multiplexer BS1. Then, as mentioned above, according to a well-known Raman amplification principle, signal light propagated by the fiber connecting medium is amplified in which the fiber connecting medium is used as an amplification medium therefor.

Figure 38:
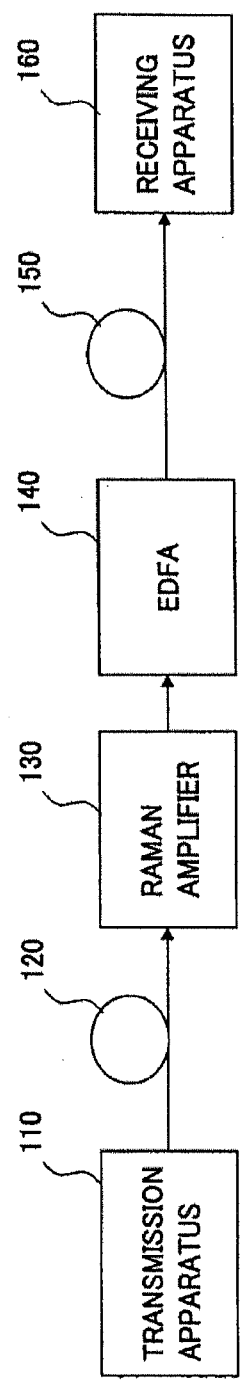
FIG. 38 shows the entire system block diagram to which any of the sixth through tenth embodiments of the present invention is applicable.

FIG. 38 shows an entire configuration of an optical signal transmission system employing the Raman amplifier 130 according to any of the sixth through tenth embodiments of the present invention. In the figure, an optical signal transmitted from an optical signal transmitting apparatus 110 is propagated by the fiber connecting medium 120, and reaches the Raman amplifier 130. As in the above-described embodiments, an EDFA 140 is connected to the Raman amplifier 130. By means of this configuration, the signal light is amplified, is propagated by a fiber connecting medium 150 after that, and then, finally, it reaches a receiving apparatus 160.

Returning to FIG. 29, light emission amounts of the respective pumping light sources LD1, LD2, . . . , LDn are controlled by a central processing unit µ1 via pumping light driving circuits DAC1, DAC2, . . . , DACn, respectively. Part of the light emission amounts of the respective pumping light sources LD1, LD2, . . . , LDn are taken by the central processing unit µ1 via light receiving devices for pumping light monitoring (not shown) and pumping light amount monitoring circuits ADC-LD1, ADC-LD2, . . . , ADC-LDn which transmit the received light signals to the central processing unit µ1. Each of the above-mentioned light receiving devices for detecting the light emission amount may be configured as a form of a back power light receiving device which takes part of pumping light in each pumping light source, or as a form of a light receiving device which receives part of light output from each pumping light source or output from each plurality thereof, after the light is caused to branch off by means of a light branching device also provided for this purpose.

Figure 26:
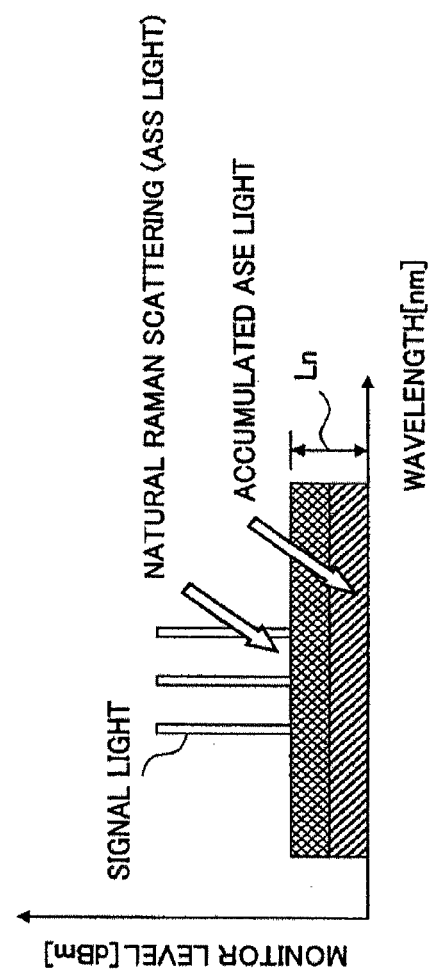
FIG. 26 shows signal light and noise components in a received light signal in a DRA module.

Signal light amplified by means of Raman amplification and including ASS light and accumulated ASE light (corresponding to a part of a level Ln in FIG. 26) is received by an optical coupler (light branching device) BS2 via a signal input terminal from the fiber connecting medium, part of the signal light is caused to branch off by means of the optical coupler BS2, and is detected by the central processing unit µ1 via a light reviving device PD1 and an signal light monitoring circuit ADC1 which transmits the received light signal from the light receiving device to the central processing unit µ1.

It is possible to create an approximation formula expressing a relationship between the pumping light source light emission amount and the ASS light generation amount, from a relationship between the ASS light generation amount generated by means of the Raman amplification and the light emission amount monitor values of the pumping light sources LD1, LD2, . . . , LDn which supply the pumping light to the fiber connecting medium as mentioned above. Such an approximation formula is previously obtained from measurement values of the light emission amounts of the pumping light sources and the ASS light generation amount obtained for a case of employing a predetermined specific optical fiber as an amplification medium. This approximation formula corresponds to the above-mentioned formulas (2) through (4) and (5) described above for the above-mentioned first embodiment of the present invention.

As mentioned above, a fiber connecting medium to which an optical amplifier such as a Raman amplifier is connected has variation in a loss coefficient, an effective core cross-sectional area, and an optical loss (local loss) between a DRA module and a transmission line (optical fiber connecting medium), even an optical fiber in a fiber type same as that for which the above-mentioned approximation formula is prepared. Due to such difference in the characteristics in the fiber connecting medium, optimum light emission amounts in the pumping light sources and ASS light generation amount depending thereon differ for obtaining a desired Raman gain. Thereby, the following relational expression (6) holds between an ASS estimation amount estimated from the above-mentioned approximation formula and an ASS light amount actually generated in the optical fiber connecting medium connected to the optical amplifier (Raman amplifier):

$$\text{'ASS light generation amount [mW]'}=\text{'ASS light estimation amount [mW]'}\times \alpha \quad (6)$$

According to the sixth embodiment of the present invention, after the Raman amplifier is actually installed in the system and before it is actually operated, the ratio (α) between the 'ASS light estimation amount' and the actual 'ASS light generation amount' in this expression (6), i.e., a value indicating an error amount in or a correcting amount for the ASS light estimation amount is obtained. Specifically, as shown in FIG. 29, the ASS generation amount is measured by means of a light spectrum analyzer 200 or a light level measurement device which is externally connected to a signal output terminal of the relevant optical amplifier (Raman amplifier) 130, the thus-obtained measurement value is then compared with the ASS light amount estimated as mentioned above according to a predetermined way by means of the central processing unit µ1 in the optical amplifier, and thus, the above-mentioned ratio (α) is obtained. This correction value α is, more specifically, derived by the first step, the second step and the third step in the fourth embodiment of the present invention described above with reference to FIGS. 20A and 20B, for example.

That is, this value α is obtained from the following formula (7) with the use of the ASS light estimation amount and the actually measured ASS light generation amount:

$$\alpha = \text{'ASS light generation amount [mW]'} / \text{'ASS light estimation amount [mW]'} \quad (7)$$

Such a process of deriving the correction value α based on the actual measurement should be performed only once before the actual operation as long as the optical fiber connecting medium in the system is not changed. After that, even when the ASS light generation amount changes due to change in the light emission amounts in the pumping light sources, it is possible to obtain the proper ASS light estimation value by multiplying the ASS light estimation amount calculated by the above-mentioned formula (5), for example, by the above-mentioned correction value α, thus performing correction so as to obtain the proper (corrected) ASS light estimation amount. In other words, with the use of an approximation formula (8) below, the ASS estimation amount obtained in response to the above-mentioned pumping light amounts according to the above-mentioned formulas (2) through (4) and (5) for example is corrected, and thus, it is possible to properly perform ASS correction for properly obtaining the net signal light power by properly removing influence of noise components:

$$\text{'Corrected ASS light estimation amount [mW]'} = \text{'original ASS light estimation amount [mW]'} \times \alpha \quad (8)$$

In the above description, correction of the ASS estimation amount is performed with the use of a parameter α, which is a linear coefficient. However, it is also possible to instead apply a higher-order correction parameter (correction value) derived according to the ASS light estimation amount or the pumping light amount for performing ASS light amount correction in the same way.

Figure 1:
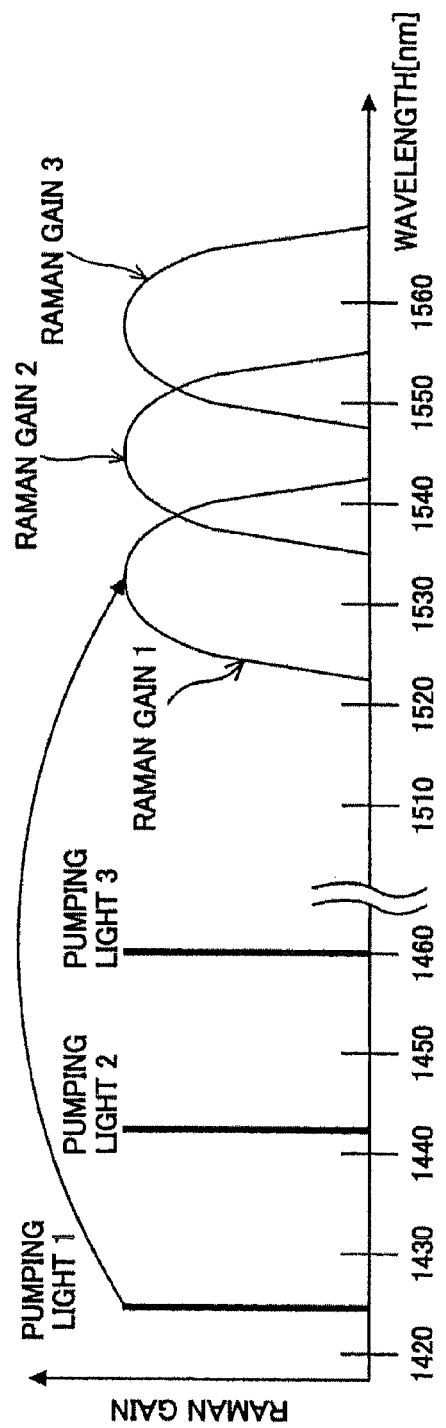
FIG. 1 illustrates a Raman gain.
Figure 2:
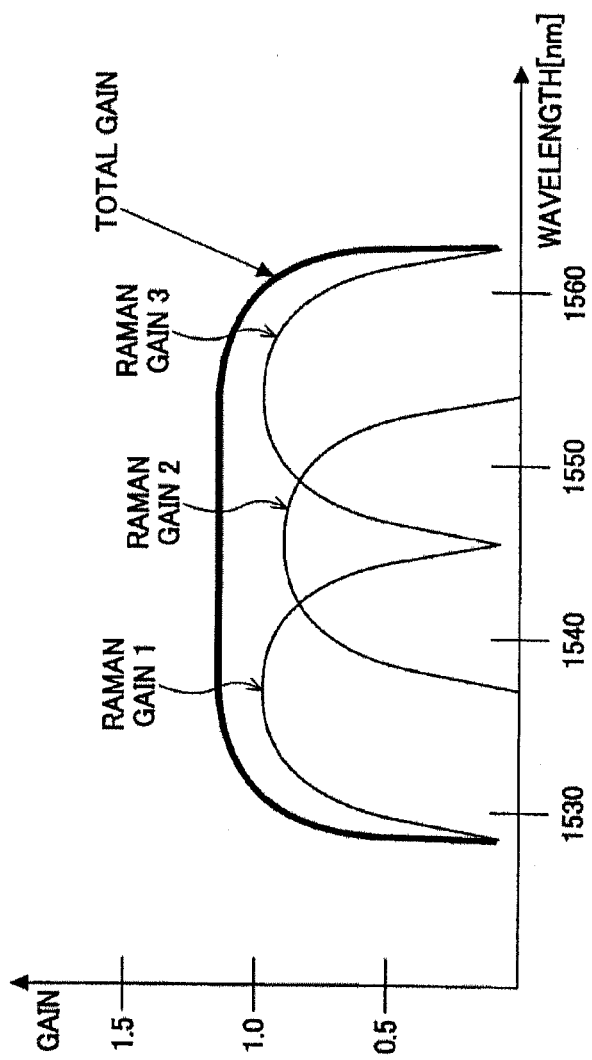
FIG. 2 shows a Raman gain obtained from pumping light in a plurality of wavelengths.
Figure 4A:
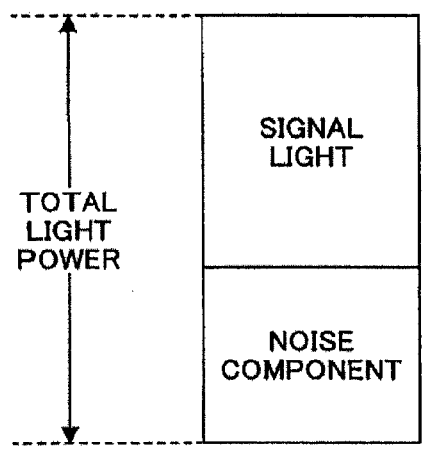
Figure 4B:
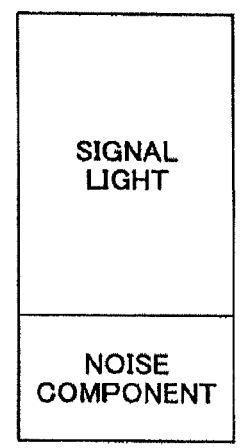

Then, correction is performed on the light monitor value detected by means of a signal light receiving device PD1 shown in FIG. 1 according to the following formula (9). Thus, it is possible to obtain a signal light level at high accuracy:

'Signal light level for one wavelength [mW]'=('PD1 monitor light level [mW]'−'corrected ASS light estimation amount [mW]'−'accumulated ASE light amount [mW]')/'the number of wavelengths multiplexed'    (9)

There, in the above formula (9), the 'accumulated ASE amount' (corresponding to the ASE noise component) to be applied is one which is notified of by an upward station with respect to the relevant Raman amplifier 130, as in the above-mentioned embodiments of the present invention.

By controlling the pumping light source driving circuits DAC1, DAC2, DACn so that the 'signal light level for one wavelength' thus obtained agrees with a target light level control value, it is possible to effectively reduce degradation in the signal light level control accuracy which degradation would otherwise occur due to estimation error in ASS light, i.e., the ASS noise according to the embodiment of the present invention.

A specific setting process for correcting the estimation amount of the ASS light generation amount is described next.

1) Difference in characteristics (loss coefficient, local loss, effective core sectional area and so forth) between a specific optical fiber for which a relational expression between the supplying pumping light amount and the ASS light generation amount derived therefrom is previously obtained and an optical fiber which is connected to the Raman amplifier in an actually operation system is obtained from measurement performed with the use of the above-mentioned spectrum analyzer 200 or such, as error in the ASS light estimation amount (corresponding to α in the above-mentioned formula (7)). Then, the characteristics in the optical fiber which is actually connected to the optical amplifier 130, or the characteristic difference between the fiber characteristics for which the above-mentioned relational expression is previously prepared and the fiber characteristics of the optical fiber actually connected to the optical amplifier in a form of a parameter (for example, the above-mentioned correction value α) is set in the optical amplifier 130, and correction of ASS light generation amount estimation is performed with the use thereof during the actual system operation.

2) Alternatively, in order to correct error between the ASS estimation amount thus obtained from calculation performed in response to the supplying pumping light amounts and the ASS light generation amount actually obtained as a result of the light spectrum analyzer 200 or such connected to the Raman amplifier 130 as mentioned above, the ASS light estimation amount and the actual ASS light generation amount are compared with one another. Thus, the ratio therebetween is obtained as a correction value α for the above-mentioned estimation value, for example, and this value is directly set in the optical amplifier 130 for the use in the actual system operation. Further alternatively, an alternative parameter of the above-mentioned correction value α for the ASS light estimation amount is prepared and set in the optical amplifier 130, and, inside of the optical amplifier 130, a calculation formula is provided for converting the alternative parameter into the correction value which is then actually applied for the relevant ASS estimation amount correction operation. Thus, in the latter case, with the use of the calculation formula, the ASS light estimation correction value α is calculated, and, with the use thereof, the relevant operation of correcting estimation of ASS light generation amount is performed.

Figure 27:
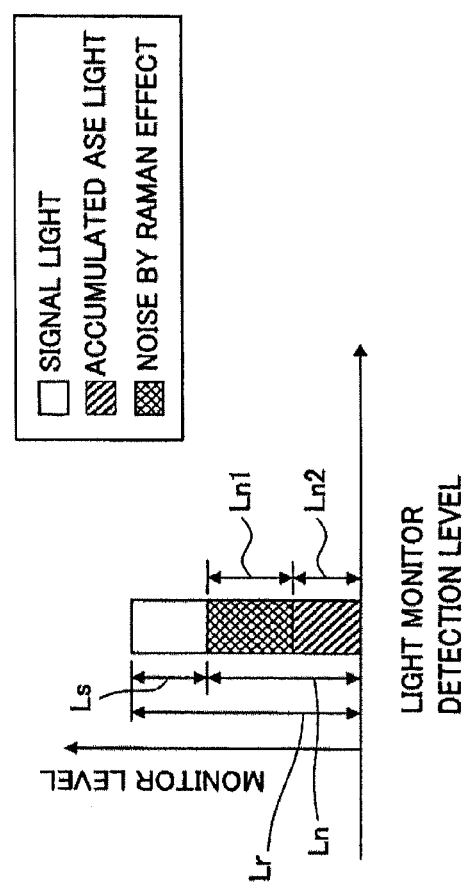
FIG. 27 shows signal light and noise components in a received light signal in a light monitoring part.
Figure 28:
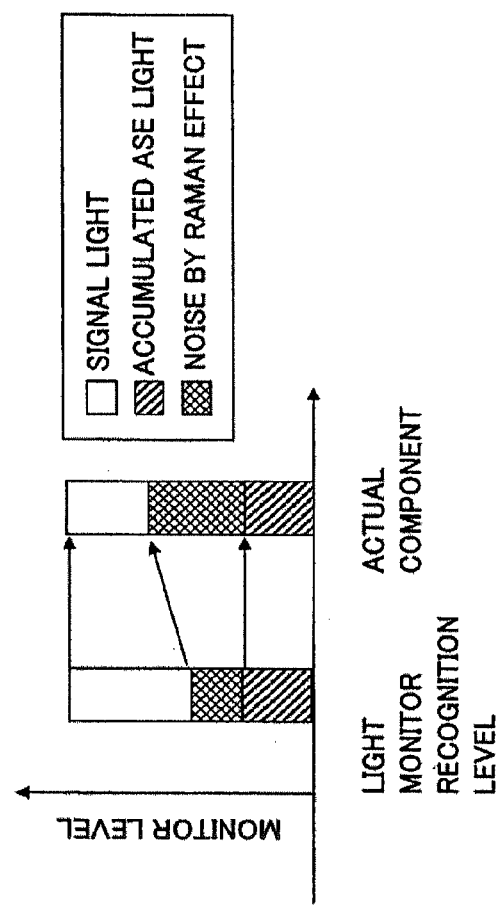
FIG. 28 illustrates an influence of ASS light estimation error.

A variant embodiment of the above-described sixth embodiment of the present invention is described next. In this variant embodiment, a hardware configuration may be same as that in the sixth embodiment described above with reference to FIG. 29. In this case, the contents of a light level Lr received by means of the light receiving device PD1 is, as shown in FIG. 27, 1) signal light Ls amplified by means of Raman amplification; 2) ASS light Ln1 generated by means of the Raman amplification; and 3) accumulated ASE light Ln2. Then, the signal light level Ls is obtained from subtracting the above-mentioned components Ln1 and Ln2, 2) and 3), from the received light signal level Lr. Then, the ASS light estimation amount to be applied to the actual system operation is obtained such that each of both the thus-obtained signal light level Ls and the signal light level which is directly read out from a waveform shown in FIG. 26, for example, by means of the light spectrum analyzer 200 or such may coincide with a desired signal light level. Specifically, in this case, the final ASS estimation amount is obtained, for example, directly from reverse calculation. Alternatively, it is obtained from gradually changing a correction value α so as to finally reach a point of the above-mentioned coincidence (specifically, by means of a loop of Steps S109 through S112 in a flow chart shown in FIG. 40 described later, for example), or such.

Figure 30:
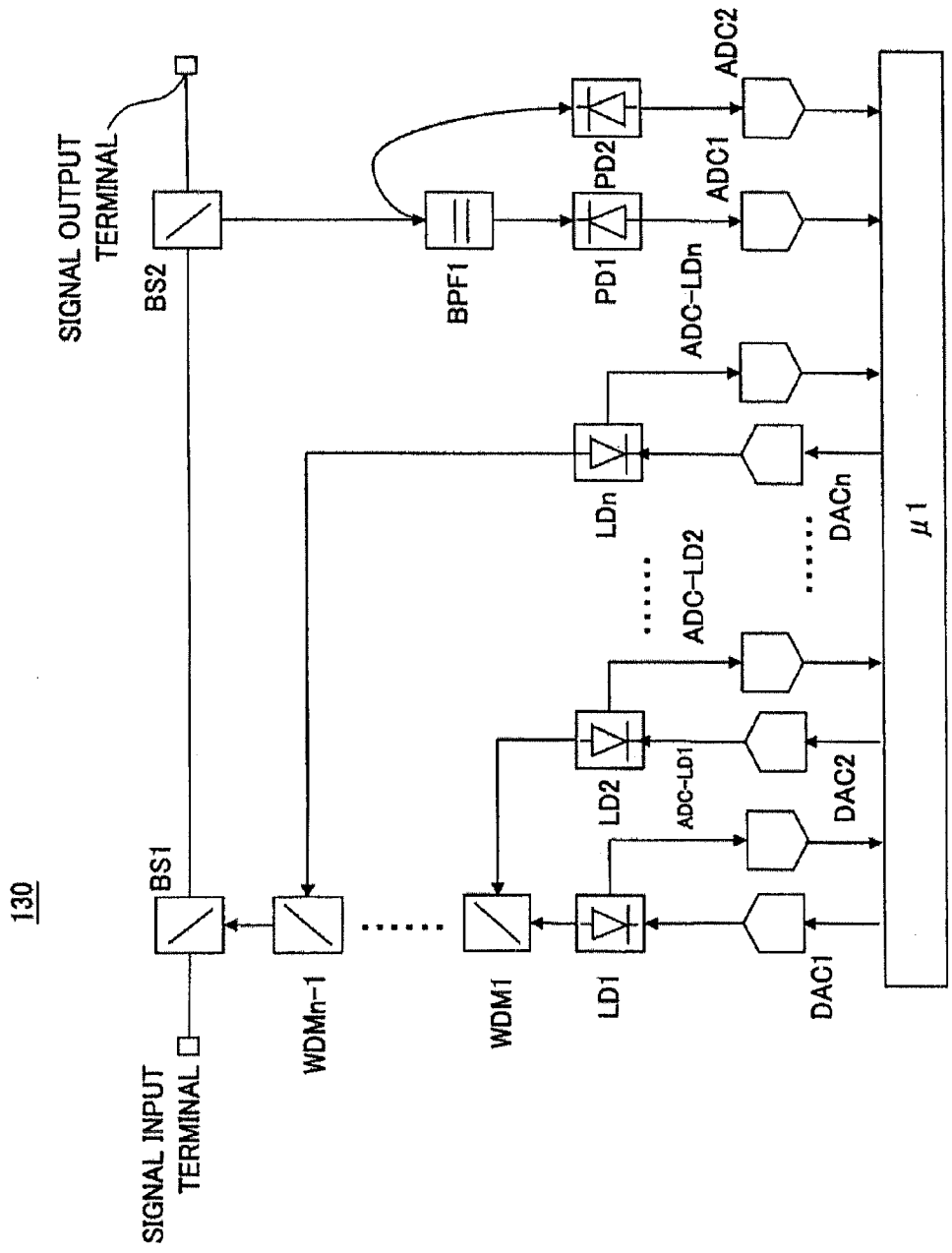
FIG. 30 shows a block diagram of a Raman amplifier according to a seventh embodiment.
Figures 31A, 31B:
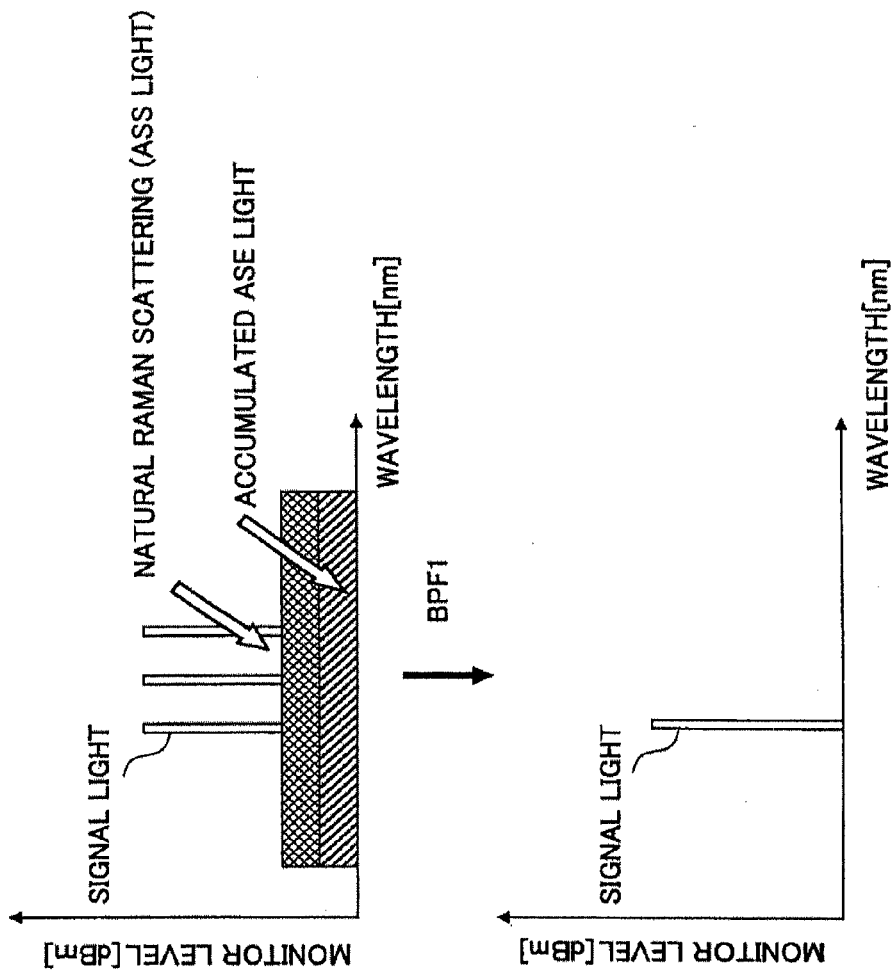
FIGS. 31A and 31B show signals of light received by means of a light receiving device in the seventh embodiment.

A seventh embodiment of the present invention is described next. FIG. 30 shows a configuration of a Raman amplifier 130 which embodies an ASS light estimation amount correcting method in the seventh embodiment. The same as the above-mentioned sixth embodiment, part of signal light as well as ASS light and accumulated ASE light generated along therewith amplified by means of Raman amplification with the use of a fiber connecting medium connected to a signal input terminal of the Raman amplifier 130 as an amplification medium also with the use of pumping light emitted by pumping light sources LD1, LD2, . . ., LDn (n≥1) is caused to branch off by means of an optical coupler BS2 after passing through the multiplexer BS1. Then, by means of a reflection-type optical demultiplexer BPF1 made of a band pass filter which transmits only a specific wavelength band, light in the specific wavelength band is extracted, and then is received by a light receiving device PD1. FIG. 31A illustrates a spectrum of an optical signal received by the Raman amplifier 130, while FIG. 31B illustrates a spectrum obtained from extracting the part thereof in the specific wavelength band by means of the above-mentioned reflection-type optical demultiplexer BPF1.

Figure 32A:
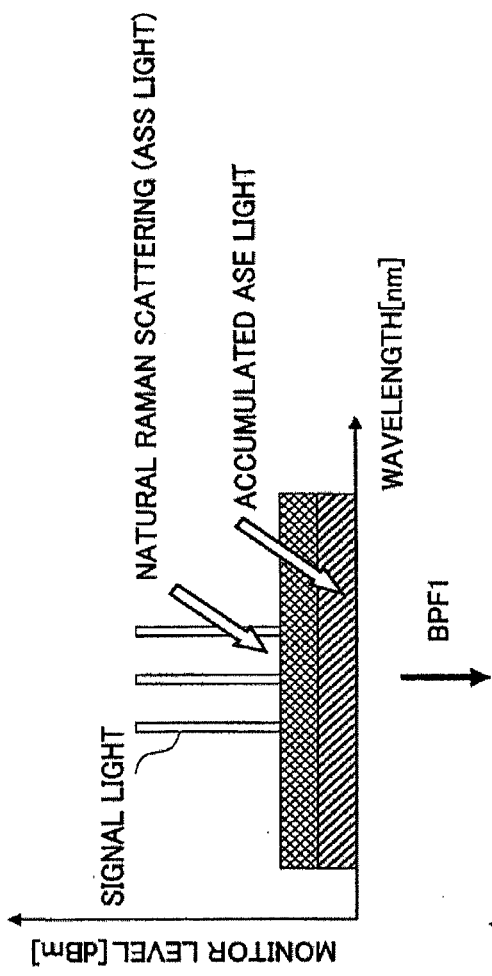

On the other hand, the part of the light in the other wavelength band which is reflected by the reflection-type band pass filter BPF1 is received by a light receiving device PD2. FIG. 32A illustrates a spectrum of an optical signal received by the Raman amplifier 130, while FIG. 32B illustrates a spectrum obtained from excluding the light part in the above-mentioned specific wavelength band (shown in FIG. 31B) as a result of the relevant other light part being reflected by the reflection-type optical demultiplexer BPF1.

Figure 32B:
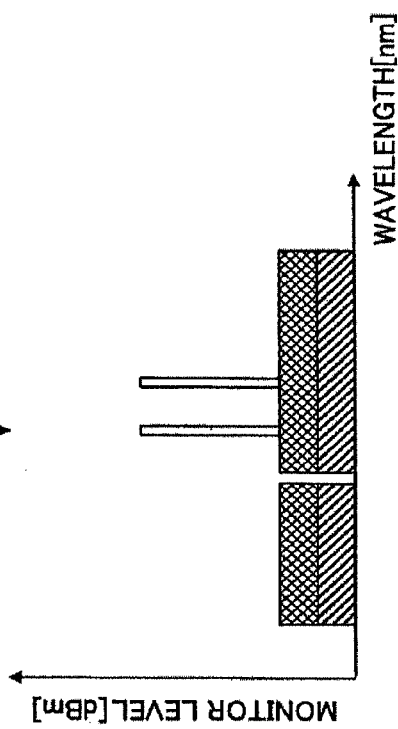

These light levels received by the light receiving devices PD1 and PD2, i.e., light amounts of signals having the spectra shown in FIGS. 31B and 32B, respectively, are then taken by the central processing unit μ1 via signal light monitoring circuits ADC1 and ADC2, respectively.

The contents of the light received by the light receiving device PD1 is 1) signal light in the above-mentioned transmission wavelength band; 2) ASS light in the transmission wavelength band; and 3) ASE light in the transmission wavelength band. By providing a configuration such that the width of the transmission wavelength band of the reflection-type optical demultiplexer BPF1 is made narrow, a ratio of the light amounts of the above-mentioned noise components 2) and 3) becomes so small that it can be ignored. Accordingly, it is possible to regard in an approximation manner that the received light signal in the PD1 only includes the signal light. Then, a light amount for one wavelength in many wavelengths multiplexed in the multiple-wavelength light in the optical signal, received by the PD1 can be expressed by the following formula (10):

'Signal light level for one wavelength in PD1 [mW]
≈'PD1 monitor light level [mW]'/'the number of wavelengths included in PD1 transmitted signal' (10)

There, 'the number of wavelengths included in PD1 transmitted signal' means the number of signal wavelengths transmitted by the reflection-type optical demultiplexer BPF1.

On the other hand, a signal light level for one wavelength included in the optical signal received by the PD2 can be approximated by the following formula (11):

'Signal light level for one wavelength in PD2 [mW]'=
('PD2 monitor light level [mW]'−'corrected ASS light estimation amount [mW]'−'accumulated ASE light amount [mW]')/('the number of all wavelengths multiplexed'−'the number of wavelengths included in PD1 transmitted signal') (11)

Then, it can be said that, in a condition in which the signal light level for one wavelength in PD2 thus obtained agrees with the signal light level for one wavelength in PD1 obtained from the above-mentioned formula (10), the 'corrected ASS light estimation amount' applied in the above-mentioned formula (11) should agree with the actual ASS light generation amount. Thus, it is possible to obtain the proper corrected ASS light estimation amount. After that the thus-obtained proper corrected ASS light estimation amount is compared with the original ASS light estimation amount, it is possible to obtain the above-mentioned correction value $\alpha$. Thus, it is possible to easily obtain the ratio $\alpha$ (correction value) between the corrected ASS light estimation amount thus obtained based on the actual measurement with the use of the above-mentioned formulas (10) and (11) and the original ASS estimation amount which is obtained only from factors in the system (optical characteristics in the fiber connecting medium or such) which are previously set. Then, by setting this value $\alpha$ in the process 1) or 2) in the Raman amplifier as described above for the sixth embodiment of the present invention, it is possible to achieve correction of the ASS light estimation amount, and, as a result, it is possible to improve the accuracy in control of making the signal light constant in the actual system operation.

It is also possible to obtain the above-mentioned corrected ASS light estimation amount in a condition in which the signal light level in PD2 obtained from the above-mentioned formula (11) agrees with the signal light level in PD1 obtained from the above-mentioned formula (10) by the following method: For the corrected ASS light estimation amount obtained by means of the above-mentioned formula (8) for example, $\alpha$ in this formula is gradually changed, $\alpha$ being used for obtaining the corrected ASS light estimation amount from the formula (8) which is then applied in the formula (11), while the calculation in the above-mentioned formulas (10) and (11) are repeated for each time (as in the loop of Steps S109 through S112 in the flow chart of FIG. 40). Then, $\alpha$ applied at a time at which the signal light level in PD2 obtained by the formula (11) agrees with the signal light level in PD1 obtained by the formula (10) is adopted as the proper final correction value.

A variant embodiment of the above-described seventh embodiment of the present invention is described next. Also in this case, a hardware configuration may be the same as that in the seventh embodiment described above with reference to FIG. 30. The same as in the above-mentioned case, the contents of light received by the light receiving device PD1 is 1) signal light in the transmission wavelength band; 2) ASS light in the transmission wavelength band; and 3) accumulated ASE light in the transmission wavelength band. Then, a signal light level obtained from subtracting light levels of the above-mentioned component 2) (estimated by means of the central processing unit μ1 initially from the system factors as mentioned above) and component 3) (notified of from the upstream station) from the light level including the ASS light and the ASE light received by the light receiving device PD1 can be expressed by the following formula (12):

'Signal light level for one wavelength in PD1 [mW]'=
('PD1 monitor light level [mW]'−'ASS light estimation amount transmitted by BPF1 [mW]'−'accumulated ASE light amount transmitted by BPF1/'the number of wavelengths included in PD1 transmitted signal' (12)

There, the 'ASS light estimation amount transmitted by BPF1 and the 'accumulated ASE light amount transmitted by BPF1' in the above-mentioned formula (12) can be obtained by the following process, for example:

1) That is, a ratio of the ASS light generation amount and the accumulated ASE light amount passing through the BPF1 with respect to the ASS light generation amount and the accumulated ASE light amount in the entire signal wavelength band is previously obtained by means of actual measurement in a predetermined condition in an experimental basis for example.

2) Then, the ratio obtained in the above-mentioned step 1) is applied to the ASS light estimation amount (obtained from the above-mentioned formulas (2) through (4) and (5), for example) and the accumulated ASE light amount (informed of by the upstream station) in the entire signal wavelength band in the actual condition. Thus, the 'ASS light estimation amount transmitted by BPF1 and the 'accumulated ASE light amount transmitted by BPF1' in the above-mentioned formula (12) are estimated.

Then, the same as in the above-described case, it can be said that, while the thus-obtained 'ASS light estimation amount transmitted by BPF1 and 'accumulated ASE light amount transmitted by BPF1' are applied in the formula (12), in a condition in which the signal light level for one wavelength in PD1 obtained from the above-mentioned formula (12) agrees with the signal light level for one wavelength in PD2 obtained from the above-mentioned formula (11), the corrected ASS light estimation amount agrees with the actual ASS light generation amount. Then, by setting the ASS light estimation amount at this time (or, the correction value $\alpha$ obtained therefrom or such) so as to apply the same in the actual operation of the system, it is possible to improve the accuracy in control of making the signal light constant in the actual system operation.

Figure 33:
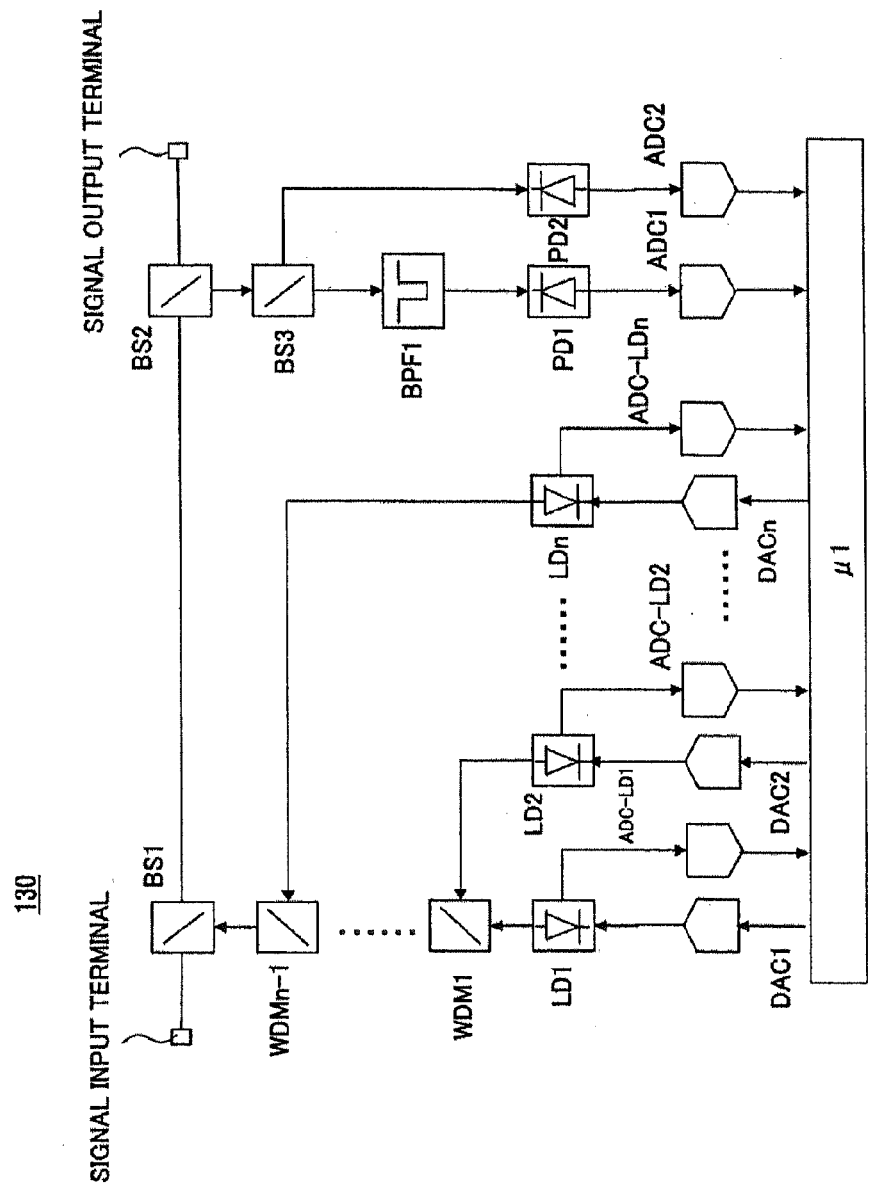
FIG. 33 shows a block diagram of a Raman amplifier according to an eighth embodiment.
Figures 34A, 34B:
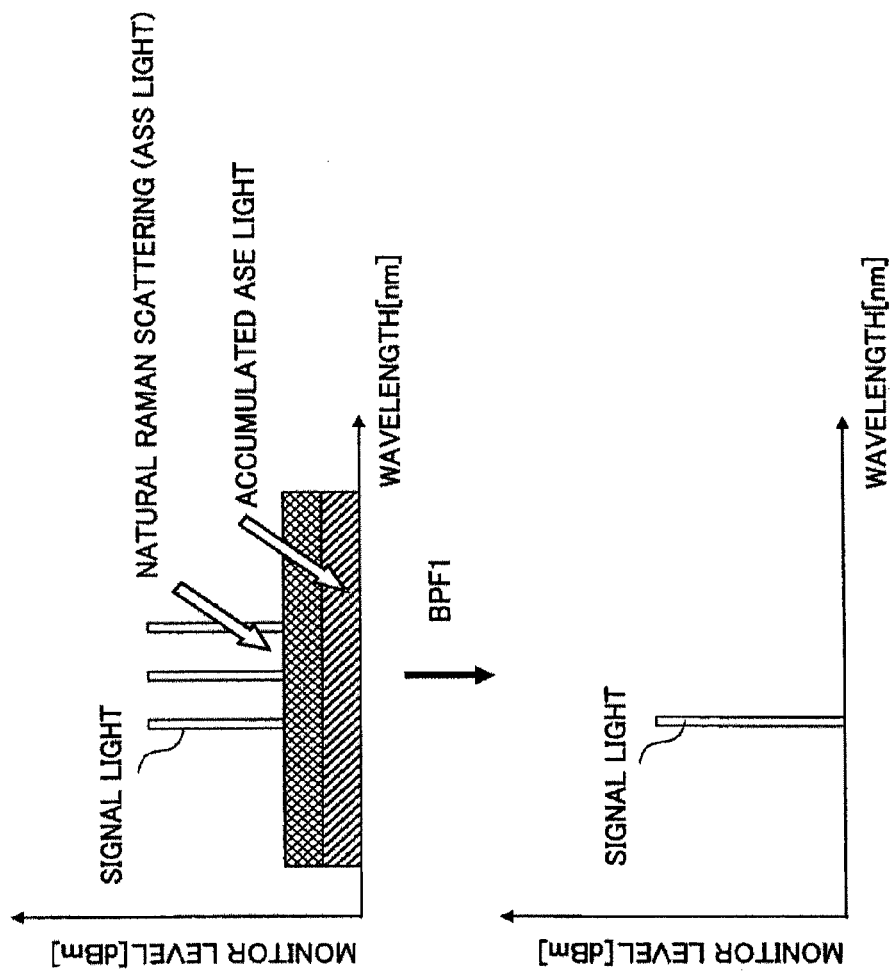
FIGS. 34A and 34B show signals of light received by means of a light receiving device in the eighth embodiment.

An eighth embodiment of the present invention is described next. FIG. 33 shows a hardware configuration of a Raman amplifier 130 which embodies an ASS light estimation amount correcting method in the eighth embodiment. In this configuration, part of signal light as well as ASS light and accumulated ASE light generated along therewith amplified by means of Raman amplification with the use of a fiber connecting medium connected to a signal input terminal of the Raman amplifier 130 as an amplification medium and pumping light emitted by pumping light sources LD1, LD2, . . . , LDn (n≥1) is caused to branch off by means of optical couplers BS2 and BS3, respectively. Furthermore, by means of a band pass filter (or demultiplexer) BPF1 which transmits only a specific wavelength band, light in the specific wavelength band is extracted, and is received by a light receiving device PD1. FIG. 34A illustrates a spectrum of an optical signal received by the Raman amplifier 130, while FIG. 34B illustrates a spectrum of part of the same optical signal passing through the band pass filter BPF1.

From the other output terminal of the optical coupler BS3, the entirety of the received signal wavelength band is output, and is received by a light receiving device PD2. In this case, different from the case shown in FIG. 32B in which a specific wavelength band is excluded, light including the components in the entire wavelength band is received by the light receiving device PD2. These light levels received by the light receiving devices PD1 and PD2 are then taken by the central processing unit μ1 via signal light monitoring circuits ADC1 and ADC2.

The same as the above-mentioned seventh embodiment, by providing a configuration such that the width of the transmission wavelength band of the demultiplexer (band pas filter) BPF1 is made sufficiently narrow, a ratio of the light amounts of the above-mentioned noise components 2) and 3) becomes so small that it can be ignored with respect to the signal light component. Accordingly, it is possible to regard in an approximation manner that the received light signal in the PD1 only includes the signal light. Then, a light amount for one wavelength in many wavelengths multiplexed in the multiple-wavelength light in the optical signal, received by the PD1, can be expressed by the above-mentioned formula (10). On the other hand, the same as the above, a signal light level for one wavelength included in the optical signal received by the PD2 can be approximated by the following formula (13):

'Signal light level for one wavelength in PD2 [mW]'=
('PD2 monitor light level [mW]'−'corrected ASS light estimation amount [mW]'−'accumulated ASE light amount [mW]')/'the number of all the wavelengths multiplexed'     (13)

Then, the same as in the above-described case, it can be said that, in a condition in which the signal light level for one wavelength in PD2 obtained from this formula (13) agrees with the signal light level for one wavelength in PD1 obtained from the above-mentioned formula (10), the corrected ASS light estimation amount agrees with the actual ASS light generation amount. Then, by setting the corrected ASS light estimation amount in the condition (or, the correction value α obtained therefrom or such) and applying the same in the actual operation of the system, it is possible to improve the accuracy in control of making the signal light constant.

A variant embodiment of the above-described eighth embodiment of the present invention is described next. Also in this case, a hardware configuration may be the same as that in the eighth embodiment described above with reference to FIG. 33. The same as in the above-mentioned case, the contents of light received by the light receiving device PD1 is 1) signal light in the transmission wavelength band; 2) ASS light in the transmission wavelength band; and 3) accumulated ASE light in the transmission wavelength band. Then, a signal light level obtained from subtracting light levels of the above-mentioned component 2) (estimated by means of the central processing unit μ1 initially from the system factors as mentioned above) and component 3) (notified of from the upstream station) from the light level including the ASS light and the ASE light received by the light receiving device PD1 can be expressed by the following formula (14):

'Signal light level for one wavelength in PD1 [mW]'=
('PD1 monitor light level [mW]'−'ASS light estimation amount transmitted by BPF1 [mW]'−'accumulated ASE light amount transmitted by BPF1/'the number of wavelengths included in PD1 transmitted signal'     (14)

There, the 'ASS light estimation amount transmitted by BPF1 and the 'accumulated ASE light amount transmitted by BPF1' in the above-mentioned formula (12) can be obtained by the process described above for the variant embodiment of the seventh embodiment. Then, the same as in the above-described case, it can be said that, while the thus-obtained 'ASS light estimation amount transmitted by BPF1 and 'accumulated ASE light amount transmitted by BPF1' are applied, in a condition in which the signal light level for one wavelength in PD1 obtained from the above-mentioned formula (14) agrees with the signal light level for one wavelength in PD2 obtained from the above-mentioned formula (13), the corrected ASS light estimation amount agrees with the actual ASS light generation amount. Then, by setting the ASS light estimation amount at this time (or, the correction value α obtained therefrom or such) and applying the same in the actual operation of the system, it is possible to improve the accuracy in control of making the signal light constant.

An ASS light estimation amount correcting method according to a ninth embodiment of the present invention is described next. The hardware configuration shown in FIG. 30 also shows a hardware configuration of a Raman amplifier 130 which embodies an ASS light estimation amount correcting method in the ninth embodiment. In this configuration, a part of signal light as well as ASS light and accumulated ASE light generated along therewith amplified by means of Raman amplification with the use of a fiber connecting medium connected to a signal input terminal of the Raman amplifier 130 as an amplification medium and pumping light emitted by pumping light sources LD1, LD2, . . . , LDn (n≥1) is caused to branch off by means of the optical coupler BS2. Furthermore, by means of the band pass filter BPF1 which transmits only a specific wavelength band, light in the specific wavelength band is extracted, and is received by a light receiving device PD1.

Figures 35A, 35B:
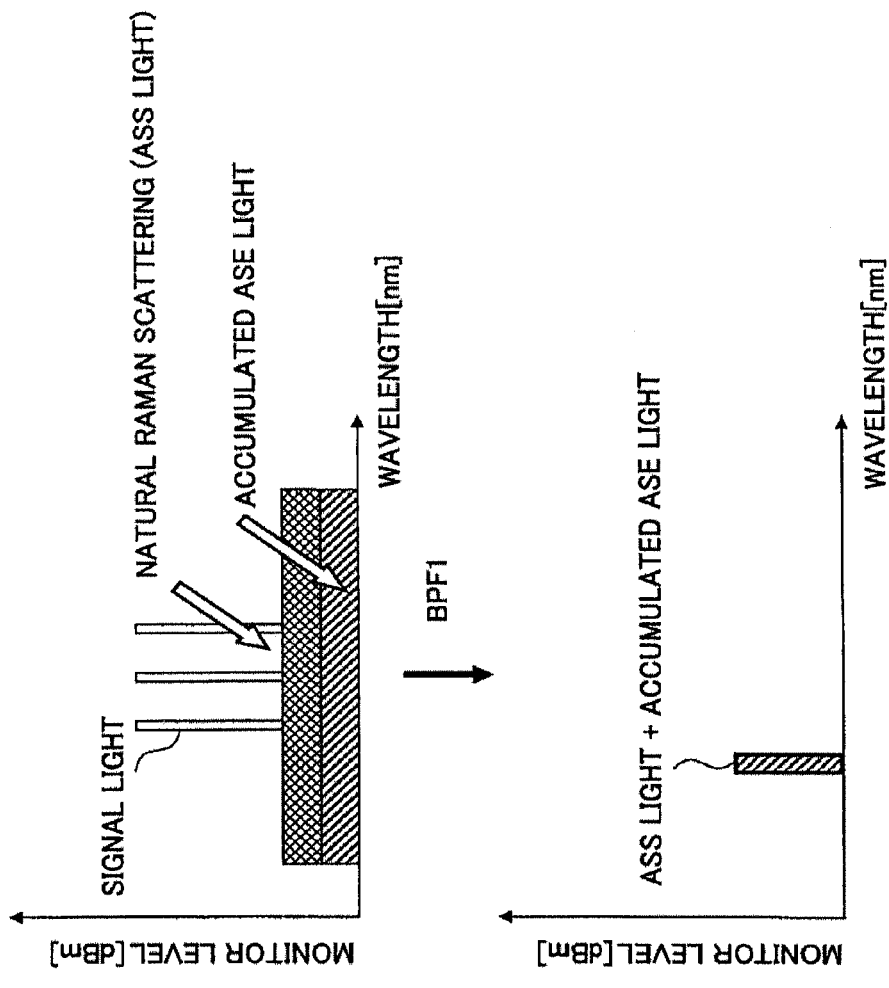
FIGS. 35A and 35B show signals of light received by means of a light receiving device in a ninth embodiment.
Figures 36A, 36B:
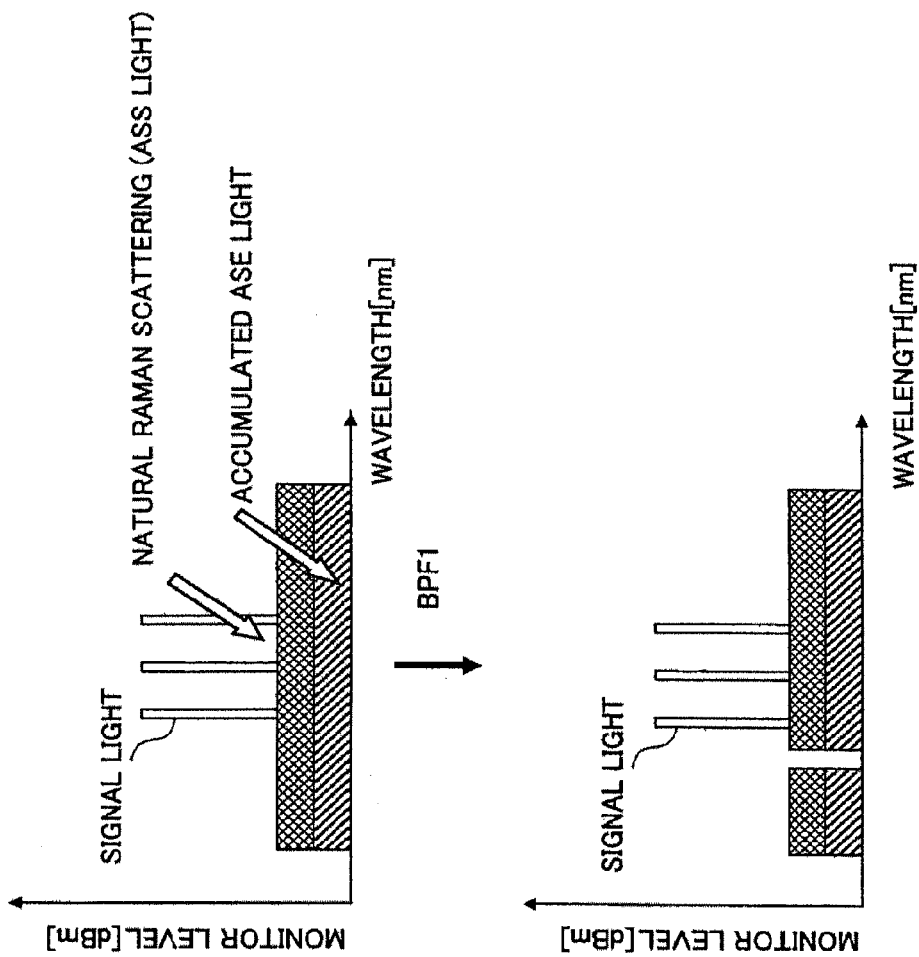
FIGS. 36A and 36B show signals of light received by means of another light receiving device in the ninth embodiment.

In this case, the transmission band of the demultiplexer BPF1 is set different from the band of the signal light, so that no signal light component is transmitted by the BPF1, as shown in FIGS. 35A and 35B. In other words, the light transmitted by the BPF1 only includes, as shown in FIG. 35B, noise components (ASS light and accumulated ASE light). On the other hand, light reflected by the demultiplexer BPF1 having the other wavelength band as shown in FIG. 36B is received by a light receiving device PD2. Light levels of the optical signals thus received by the light receiving devices PD1 and PD2 are then taken by the central processing unit μ1 via signal light monitoring circuits ADC1 and ADC2.

The light received by the light receiving device PD1 is part of the ASS light and the accumulated ASE light without including the signal light as mentioned above. Therefore, the amount of the ASS light input to the light receiving device PD2 can be obtained from the following formula (15) in an approximation basis, for example, from the sum of the ASS light amount and the accumulated ASE light amount transmitted by the BPF1 (the light level received by the light receiving device PD1) and information of the accumulated ASE light amount notified of from the optical amplifier in the upstream station which is accumulated before the relevant optical amplifier (Raman amplifier) 130:

'Corrected ASS light estimation amount [mW]'≈'PD1 monitor light level [mW]'×β−'accumulated ASE light amount [mW]'     (15)

A coefficient β in the above formula (15) can be obtained by the following steps 1) through 3):

1) In the configuration shown in FIG. 30, a ratio of the ASS light generation amount and the accumulated ASE light amount in the wavelength band input to the light receiving device PD2 (in other words, reflected by the BPF1) with respect to the ASS light generation amount and the accumulated ASE light amount in the wavelength band transmitted by the BPF1 is previously obtained by means of actual measurement (in an experimental basis or such), and is applied as the above-mentioned coefficient β.

2) Then, the above-mentioned coefficient β, which is the ratio obtained through the actual measurement, is applied to the sum of the BPF1 transmitted ASS light generation amount and the BPF1 transmitted accumulated ASE light amount, and thus, the value of the sum of the ASS light generation amount and the accumulated ASE light amount in the wavelength band reflected by the demultiplexer BPF1 and thus received by the light receiving device PD2 is calculated as shown in the first term in the right side of the formula (15).

3) From the value (PD1 monitor light level×β) of the sum of the noise components calculated in the above-described step 2) as shown in the first term in the right side of the formula (15), the accumulated ASE light amount accumulated in the optical amplifier of the upstream station and notified of therefrom is subtracted, and thus, the ASS light amount of the ASE light generated in the optical fiber connected to the relevant optical amplifier (Raman amplifier) is calculated as shown in the formula (15).

Further, by subtracting the corrected ASS light estimation amount thus calculated by means of the formula (15) as well as the above-mentioned accumulated ASE light amount from the light level detected by the light receiving device PD2, and dividing the result of the subtraction by the number of wavelengths multiplexed, the signal light level for one wavelength can be obtained in an approximation basis as shown in the following formula (16):

'Signal light level for one wavelength [mW]'≈('PD2 monitor light level [mW]'−'corrected ASS light estimation amount [mW]'−'accumulated ASE light amount [mW]')/'the number of wavelengths multiplexed' (16)

The above-described process of the steps 1) through 3) for obtaining the ASS light amount in the wavelength band received by the PD2 and then the correction processing according to the formulas (15) and (16) may be performed at any timing during the actual operation of the system. Furthermore, it is possible to first obtain the correction value α with the use of the above-mentioned formulas (6) through (9) applying the thus-obtained ASS light generation amount, and after that, calculate the corrected ASS light estimation amount with the use of the thus-obtained correction value α.

It is noted that, by setting the band width of the BPF1 in the circuit configuration shown in FIG. 30 in this case for example to be sufficiently narrow, the ASS light amount and the ASE light amount shown in FIG. 36A may be regarded equal to those shown in FIG. 36A, even in which the specific band is excluded by means of BPF1, respectively.

An ASS light estimation amount correcting method according to a tenth embodiment of the present invention is described next. This embodiment is same as the above-described ninth embodiment of the present invention except that the Raman amplifier 130 in the configuration described above with reference to FIG. 33 is applied instead of the configuration of FIG. 30. In this case, part of signal light as well as ASS light and accumulated ASE light generated along therewith amplified by means of Raman amplification with the use of a fiber connecting medium connected to a signal input terminal of the Raman amplifier 130 as an amplification medium and pumping light emitted by pumping light sources LD1, LD2, . . . , LDn (n≥1) is caused to branch off by means of optical couplers BS2 and BS3. Furthermore, by means of a band pass filter BPF1 which transmits a specific wavelength band, light in the specific wavelength band is extracted, and is received by a light receiving device PD1.

Figures 37A, 37B:
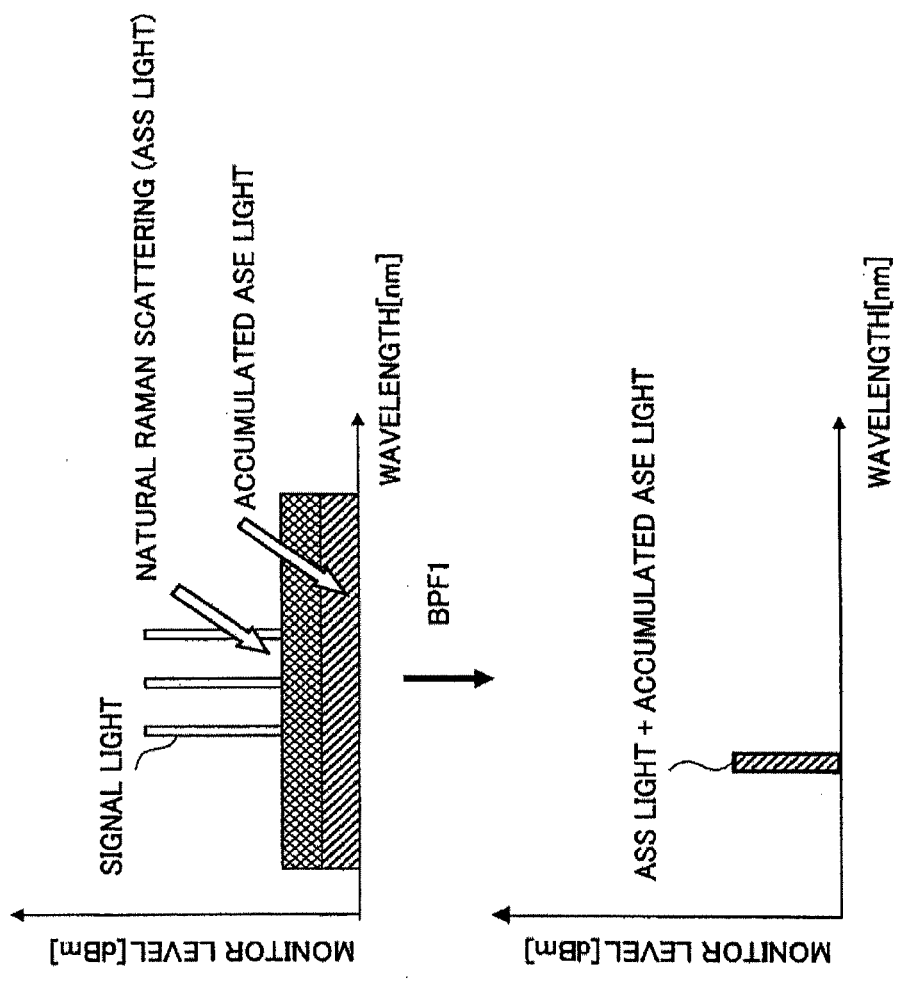
FIGS. 37A and 37B show signals of light received by means of a light receiving device in a tenth embodiment.

Also in this case, the same as in the above-described ninth embodiment, the transmission band of the demultiplexer BPF1 is set different from the band of the signal light, and thus, no signal light component exits in light transmitted by the BPF1, as shown in FIGS. 37A and 37B. Thus, the light transmitted by the BPF1 only includes, as shown in FIG. 37B, noise components (ASS light and accumulated ASE light). On the other hand, the entirety of the received light signal's wavelength band is output from the other output terminal of the BS3, and is received by a light receiving device PD2.

Light levels of the optical signals thus received by the light receiving devices PD1 and PD2 are then taken by the central processing unit μ1 via signal light monitoring circuits ADC1 and ADC2.

The light received by the light receiving device PD1 is part of the ASS light and the accumulated ASE light without including the signal light. Therefore, the amount of the ASS light input to the light receiving device PD2 can be obtained from the following formula (17) in an approximation basis, for example, from the sum of the ASS light amount and the accumulated ASE light amount transmitted by the BPF1 (the light level received by the light receiving device PD1) and information of the accumulated ASE light amount notified of from the optical amplifier in the upstream station which is accumulated before the relevant optical amplifier 130:

'Corrected ASS light estimation amount [mW]'≈'PD1 monitor light level [mW]'×β−'accumulated ASE light amount [mW]' (17)

The coefficient β in the above formula (17) is obtained by the following steps 1) through 3):

1) In the configuration shown in FIG. 33, a ratio of the ASS light generation amount and the accumulated ASE light amount in the wavelength band caused to branch off by the optical coupler BS3 and input to the light receiving device PD2 with respect to the ASS light generation amount and the accumulated ASE light amount in the wavelength band transmitted by the BPF1 is previously obtained by means of actual measurement, and is used as the above-mentioned coefficient β.

2) Then, the above-mentioned coefficient β, which is the ratio obtained as described above through the actual measurement, is applied to the sum of the BPF1 transmitted ASS light generation amount and the BPF1 transmitted accumulated ASE light amount, and thus, the value of the sum of the ASS light generation amount and the accumulated ASE light amount in the wavelength band caused to branch off by means of the optical coupler BS3 and thus received by the light receiving device PD2 is calculated as shown in the first term in the right side of the formula (17).

3) From the value (PD1 monitor light level×β) of the sum of the noise components calculated in the above-described step 2) as shown in the first term in the right side of the formula (17), the accumulated ASE light amount accumulated in the optical amplifier of the upstream station and notified of therefrom is subtracted, and thus, the ASS light amount of the ASE light generated in the optical fiber connected to the relevant optical amplifier (Raman amplifier) is calculated as shown in the formula (17).

Further, by subtracting the corrected ASS light estimation amount thus calculated by means of the formula (17) as well as the above-mentioned accumulated ASE light amount from the light level detected by the light receiving device PD2, and dividing the result of the subtraction by the number of wavelengths multiplexed, the signal light level for one wavelength can be obtained in an approximation basis as shown in the following formula (18):

'Signal light level for one wavelength [mW]'≈('PD2 monitor light level [mW]'−'corrected ASS light estimation amount [mW]'−'accumulated ASE light amount [mW]')/'the number of wavelengths multiplexed' (18)

The above-described process of the steps 1) through 3) for obtaining the ASS light amount in the wavelength band received by the PD2 and the correction processing according to the formulas (17) and (18) may be performed at any timing during the operation of the system. Furthermore, it is possible to first obtain the correction value α with the use of the above-mentioned formulas (6) through (9) applying the thus-obtained ASS light generation amount, and after that, calculate the corrected ASS light estimation amount with the use of the thus-obtained correction value α.

Figure 39:
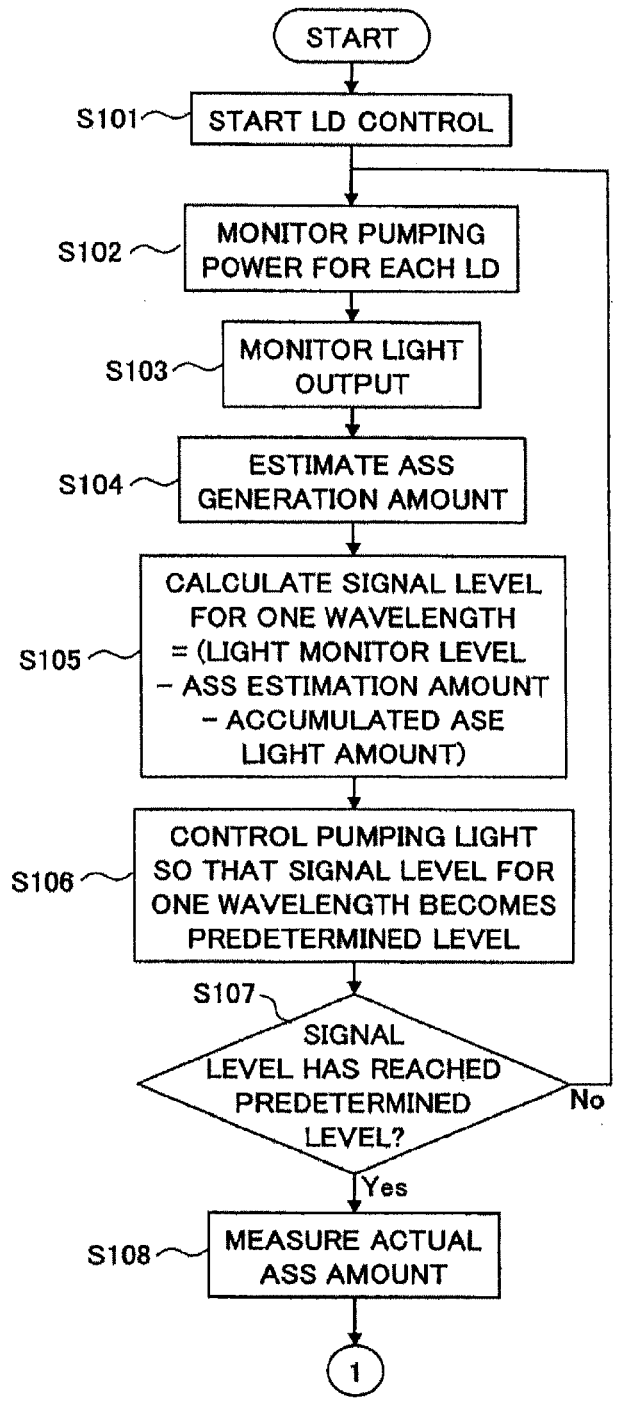
FIGS. 39, 40 and 41 shows a flow chart illustrating operation in a Raman amplifier adjustment method according to any one of the sixth through tenth embodiments of the present invention.
Figure 40:
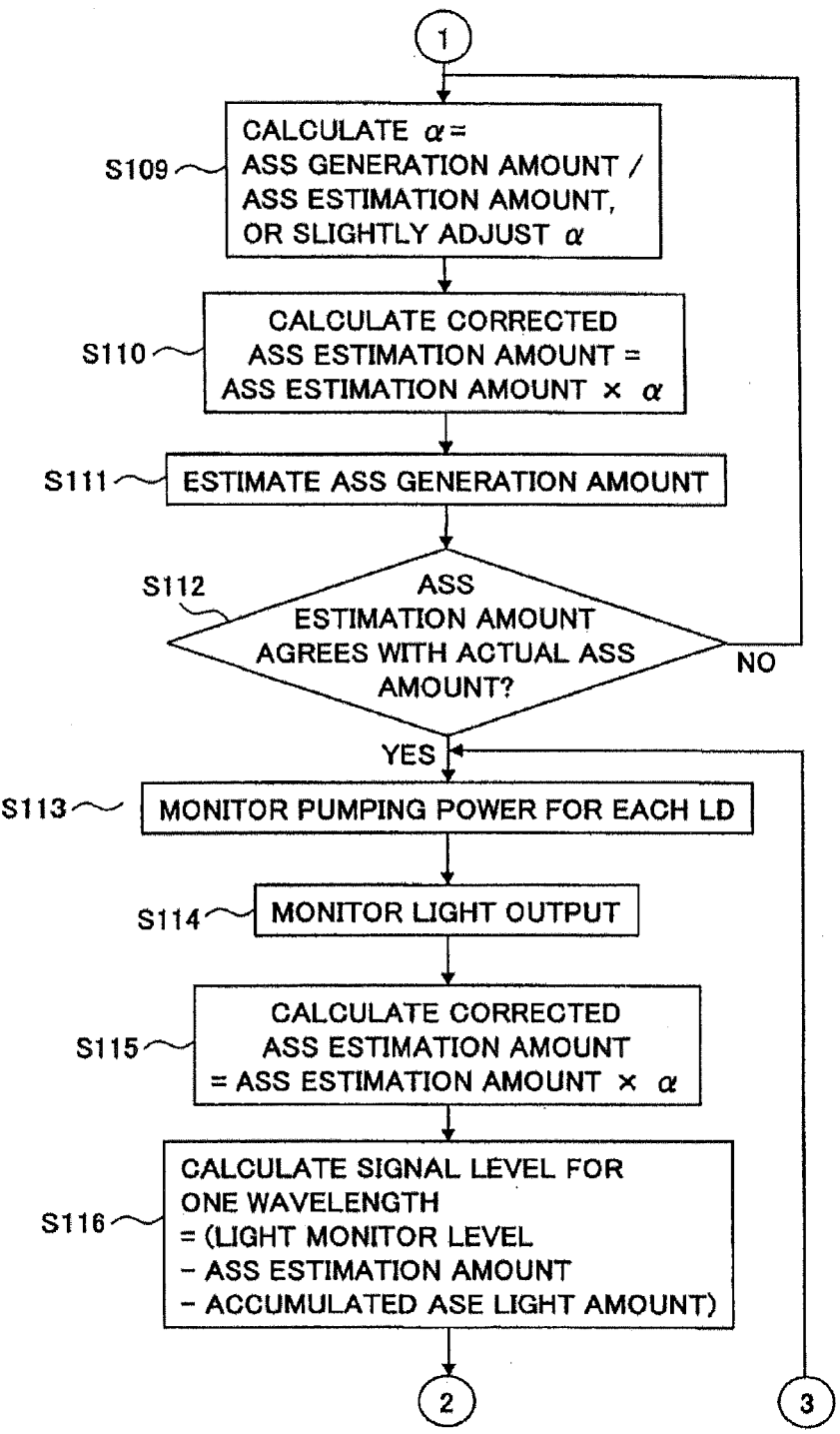
Figure 41:
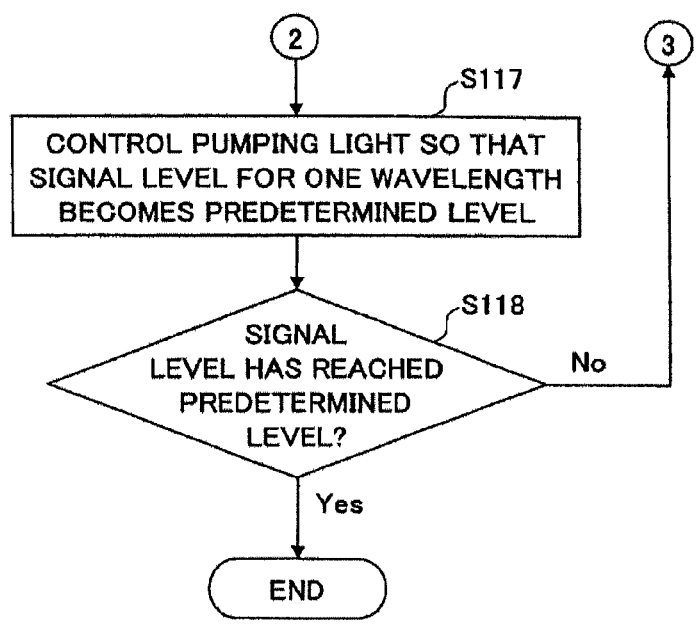

With reference to FIGS. 39 through 41, a procedure of starting up of the Raman amplifier 130 according to any one of the above-described sixth through tenth embodiments of the present invention, and placing it in an operating state is described next. In Step S101, pumping light source control operation is started, and then, in Step S102, pumping light amounts thus obtained are detected. After that, in Step S103, optical output obtained from Raman amplification thanks to the above-mentioned pumping light generation is detected. In any of the above-described seventh through tenth embodiments, optical output of the entirety of optical signal can be calculated from optical output detected by means of the PD1 and the PD2.

In Step S104, with the use of various factors (optical characteristics of the optical fiber connecting medium) of a system including an optical fiber applied as well as the pumping light amounts detected in Step S102, a relevant ASS generation amount (estimation amount at an initial stage) is calculated according to the way applying the formulas (2), (3), (4) and (5) described above, for example.

Then, in Step S105, a signal light level for one wavelength from among a plurality of wavelengths multiplexed in multiple-wavelength light thus received is obtained from the optical output detected in Step S103. Specifically, the ASS generation amount calculated in step S104 and the accumulated ASE light amount notified of by the upstream station are subtracted from the optical output, and the subtraction result is divided by the number of wavelengths multiplexed. It is also possible that only one wavelength is applied instead of the above-mentioned plurality of wavelengths multiplexed for the purpose of testing or initial setting. In this case, the ASS generation amount calculated in step S104 and the accumulated ASE light amount notified of by the upstream station are subtracted from the optical output, and thus, the signal light level for one wavelength can be obtained in a simple way.

After that, in Step S106, the pumping light amounts supplied to the fiber connecting medium is controlled so that the thus-obtained signal light level for one wavelength may coincide with a predetermined target level. Then, the Steps S102 through S107 are repeated until the predetermined target signal light level is obtained (Yes in Step S107). Then, after that, in Step S108, measurement of an actual ASS generation amount is performed.

Specifically, in Step S109, first, a correction value α is obtained by means of actual measurement with the use of a light spectrum analyzer (200) or such as described above with reference to FIG. 29, or a predetermined initial value is prepared. Then, applying this correction value α, the ASS light generation amount estimated in Step S104 is corrected in Step S110, and thus, a corrected ASS light generation amount (estimation amount) is obtained in Step S111. Then, by applying this ASS light estimation amount, for example with the use of the above-mentioned formulas (10) and (11), it is determined whether or not the actual ASS generation amount agrees with the current ASS light estimation amount therefor, in Step S112.

Then, until the determination result in Step S112 becomes 'agreement', a loop of the Steps S109 through S112 is repeated. A specific manner in this loop of processing differs for each of the respective ones of the above-described sixth through tenth embodiments. That is, in a case where the spectrum analyzer (200, shown in FIG. 29, for example) is used for actually measuring the actual ASS light amount, the correction value α obtained therefrom by means of the formula (7), for example, may be directly applied for processing starting from Steps S113 without performing Step S112 for determination.

After the correction value α by which the ASS light estimation amount coincident with the actual ASS light generation amount is thus obtained, the pumping light amounts of the pumping light sources are detected in Step S113, and optical output obtained by means of Raman amplification in response to the pumping light generation is detected in Step S114. Then, the same as Step S104, the initial ASS light estimation amount is calculated based on the various factors of the system including the optical fiber applied and the pumping light amounts detected in Step S113. After that, in Step S115, the ASS light estimation amount thus calculated is corrected with the use of the correction value α obtained by the loop of processing in Steps S109 through S112 by which the ASS light estimation amount coincident with the actual ASS light generation amount is obtained.

Then, in Step S116, the same as Step S105, a signal light level for one wavelength in the multiple-wavelength light received is obtained from the optical output detected in Step S114. Specifically, for this purpose, the ASS light estimation amount calculated in step S115 and the accumulated ASE light amount notified of by the upstream station are subtracted from the optical output, and the subtraction result is divided by the number of wavelengths multiplexed. After that, in Step S117, the pumping light amounts supplied to the fiber connecting medium are controlled so that the thus-obtained signal light level for one wavelength may coincide with a predetermined target level. Then, the Steps S113 through S118 are repeated until the predetermined target signal light level is obtained (Yes in Step S118). Thus, Raman amplification control is performed properly.

FIGS. 42A, 42B and 42C show numeric examples for the sixth through tenth embodiments of the present invention. FIG. 42A shows system conditions applied. In this case, as an example, fiber parameters and input/output requirements of the Raman amplifier in a case of applying a DSF are applied. FIG. 42B shows parameters of a reference fiber used in ASS light generation amount estimation calculation. FIG. 42C shows ASS light generation amounts and ASS light estimation amounts actually obtained under these conditions. In this case, as an example, numeric examples of an ASS light generation amount, an ASS light estimation amount and a correction value α are shown while a lump loss and a loss coefficient are changed. By calculating the ASS light estimation amount again with the use of the correction value α, it is possible to obtain further accurate estimation for the ASS light generation amount.

Thus, according to the embodiments of the present invention, by performing correction of an ASS light estimation amount estimated by means of a CPU in a Raman amplifier with the use of a correction value α, it is possible to effectively reduce error otherwise occurring between an actual ASS light generation amount and an ASS light estimation amount actually applied due to variation in characteristics (loss coefficient, local loss, effective core cross-sectional area and so forth) of an optical fiber connecting medium actually connected to this optical amplifier (Raman amplifier), and thus to improve accuracy in the ASS light estimation. As a result, it is possible to improve accuracy in signal light constant control, and to avoid degradation in a received signal to noise ratio (OSNR), which degradation otherwise would occur due to accumulated error in the ASE correction operation.

Further, even in a case where an input interruption event is determined when signal light does not reach due to an event of connector opening, fiber break or such, and output of pumping light sources of a Raman amplifier is to be forcibly broken (shutdown) regarding the determination as a trigger, it is possible to improve accuracy in signal light input interruption detection by improving accuracy in the ASS light estimation by means of ASS light estimation amount correction processing according to any embodiment of the present invention. As a result, it is possible to avoid degradation in quaintly of the optical communication apparatus, which degradation would otherwise occur due to inaccurate input interruption detection by the optical amplifier.

Further, it is possible to prepare a program including instructions for causing a computer to execute the respective steps of the Raman amplifier adjustment method (ASS light estimation amount correction method) in any of the embodiments of the present invention described above, load the program to the computer with the use of a carriable information recording medium such as a CD-ROM or such, or with the use of a communication network such as the Internet, LAN, or such, cause the computer to execute the respective instructions included in the program, and thus, embody the relevant Raman amplifier adjustment method.

Further, the present invention is not limited to the above-described embodiments, and variations and modifications may be made without departing from the basic concept of the present invention claimed below.

The present application is based on Japanese priority applications Nos. PCT/JP03/09820 and 2004-089672, filed on Aug. 1, 2003 and Mar. 25, 2004, respectively, the entire contents of which are hereby incorporated by reference.

What is claimed is:

1. A Raman amplifier amplifying signal light with the use of a fiber connecting medium, comprising:
   a pumping unit supplying pumping light to the fiber connecting medium;
   a noise component estimation unit estimating, from the pumping light amount, a noise component generated in the fiber connecting medium;
   an extracting unit extracting a predetermined wavelength band including signal light from a received light signal, and causing a wavelength band other than said predetermined wavelength band to branch off;
   a first monitoring unit detecting a light amount of a received light signal in the predetermined wavelength band extracted by said extracting unit;
   a second monitoring unit detecting a light amount of the received light signal in the wavelength band other than the predetermined wavelength band having branched off by said extracting unit;
   a control unit controlling said pumping unit based on the received light amounts detected by said first and second monitoring units and the noise component estimation value obtained by said noise component estimation unit;
   a first signal light amount calculating unit calculating a signal light amount based on the detection result by said first monitoring unit;
   a second signal light amount calculating unit calculating a signal light amount by correcting the detection result from said second monitoring unit with the use of the noise component estimation value by said noise component estimation unit; and
   a correcting unit correcting the noise component estimation value by comparing between respective calculation values by said first signal light amount calculating unit and said second signal light amount calculating unit.

2. A Raman amplifier amplifying signal light with the use of a fiber connecting medium, comprising:
   a pumping unit supplying pumping light to the fiber connecting medium;
   a noise component estimation unit estimating, from the pumping light amount, a noise component generated in the fiber connecting medium;
   an extracting unit extracting a predetermined wavelength band including signal light from a received light signal, and causing a wavelength band other than said predetermined wavelength band to branch off;
   a first monitoring unit detecting a light amount of a received light signal in the predetermined wavelength band extracted by said extracting unit;
   a second monitoring unit detecting a light amount of the received light signal in the wavelength band other than the predetermined wavelength band having branched by said extracting unit;
   a control unit controlling said pumping unit based on the received light amounts detected by said first and second monitoring units and the noise component estimation value obtained by said noise component estimation unit;
   a first signal light amount calculating unit calculating a signal light amount without correcting the detection result by said first monitoring unit with the use of the noise component estimation value by said noise component estimation unit; and
   a second signal light amount calculating unit calculating a signal light amount by correcting the detection result from said second monitoring unit with the use of the noise component estimation value by said noise component estimation unit; and
   a correcting unit correcting the noise component estimation value by comparing between respective calculation values by said first signal light amount calculating unit and said second signal light amount calculating unit.

3. A Raman amplifier amplifying signal light with the use of a fiber connecting medium, comprising:
   a pumping unit supplying pumping light to the fiber connecting medium;
   a noise component unit obtaining, from an amount of the pumping light, a value of a noise component generated in the fiber connecting medium;
   an extracting unit extracting a first wavelength band including signal light from a received light signal, and causing a second wavelength band other than said first wavelength band to branch off;
   a control unit controlling said pumping unit based on a light amount of the received light signal in the first wavelength band, a light amount of the received light signal in the second wavelength band, and the value of the noise component;

a first unit obtaining a signal light amount without correcting the light amount of the received light signal in the first wavelength band with the use of the noise component value; and a second unit obtaining a signal light amount by correcting the light amount of the received light signal in the first wavelength band with the use of the noise component value, wherein the Raman amplifier corrects the noise component value by comparing between the light signal amount obtained by said first unit and the light signal amount obtained by said second unit.

* * * * *